US007747145B2

(12) United States Patent
Oshima et al.

(10) Patent No.: US 7,747,145 B2
(45) Date of Patent: Jun. 29, 2010

(54) HIGH-RESOLUTION OPTICAL DISK FOR RECORDING STEREOSCOPIC VIDEO, OPTICAL DISK REPRODUCING DEVICE, AND OPTICAL DISK RECORDING DEVICE

(75) Inventors: Mitsuaki Oshima, Kyoto (JP); Yoshiichiro Kashiwagi, Yawata (JP); Takumi Hasebe, Yawata (JP); Kazuhiro Tsuga, Takarazuka (JP); Kazuhiko Nakamura, Hirakata (JP); Yoshihiro Mori, Hirakata (JP); Masayuki Kozuka, Neyagawa (JP); Yoshihisa Fukushima, Osaka (JP); Toshiyuki Kawara, Hirakata (JP); Yasushi Azumatani, Takatsuki (JP); Tomoyuki Okada, Katano (JP); Kenichi Matsui, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1894 days.

(21) Appl. No.: 10/284,727

(22) Filed: Oct. 31, 2002

(65) Prior Publication Data
US 2003/0053797 A1 Mar. 20, 2003

Related U.S. Application Data

(62) Division of application No. 09/125,885, filed as application No. PCT/JP97/00615 on Feb. 28, 1997, now Pat. No. 6,574,423.

(30) Foreign Application Priority Data

Feb. 28, 1996 (JP) ................................. 8-041583
Dec. 4, 1996 (JP) ................................. 8-323770
Dec. 26, 1996 (JP) ................................. 8-347284

(51) Int. Cl.
H04N 5/00 (2006.01)
H04N 7/00 (2006.01)
(52) U.S. Cl. ......................................... 386/126; 386/95
(58) Field of Classification Search .................. 386/95, 386/98, 125–126, 105, 109, 46, 96
See application file for complete search history.

(56) References Cited

U.S. PATENT DOCUMENTS 4,739,418 A * 4/1988 Iwahara et al. ................. 348/43

(Continued)

FOREIGN PATENT DOCUMENTS

EP 0501699 A2 2/1992

OTHER PUBLICATIONS

Japanese language search report for Int'l Application No. PCT/JP97/00615 dated Jun. 10, 1997.

(Continued)

*Primary Examiner*—Thai Tran
*Assistant Examiner*—Tat Chio
(74) *Attorney, Agent, or Firm*—RatnerPrestia

(57) ABSTRACT

An optical disk for recording stereoscopic videos and high-quality video signals and a system for reproducing the videos and signals from the optical disk are made compatible with the conventional video reproducing system. A reproducing device which is used for reproducing stereoscopic videos and high-quality videos obtains stereoscopic video or high-quality videos by reproducing both first and second interleaved blocks on the optical disk in which first and second video signals are alternately recorded on the left and right sides by dividing the first and second video signals into frame groups of one GOP or more and a reproducing device which is not used for reproducing the stereoscopic videos and high-quality videos obtains ordinary videos by only reproducing either the first or second interleaved block by jumping tracks.

3 Claims, 55 Drawing Sheets

U.S. PATENT DOCUMENTS

| | | | |
|---|---|---|---|
| 4,743,964 A | 5/1988 | Allard et al. | |
| 5,142,357 A | 8/1992 | Lipton et al. | |
| 5,416,510 A | 5/1995 | Lipton et al. | |
| 5,442,455 A | 8/1995 | Hioki et al. | |
| 5,521,922 A | 5/1996 | Fujinami et al. | |
| 5,568,274 A | 10/1996 | Fujinami et al. | |
| 5,596,421 A * | 1/1997 | Shibata et al. | 348/42 |
| 5,630,006 A * | 5/1997 | Hirayama et al. | 386/92 |
| 5,649,048 A | 7/1997 | Tomita et al. | |
| 5,661,518 A | 8/1997 | Palm et al. | |
| 5,734,743 A | 3/1998 | Matsugu et al. | |
| 5,745,645 A * | 4/1998 | Nakamura et al. | 386/131 |
| 5,748,865 A | 5/1998 | Yamamoto et al. | |
| 5,767,898 A * | 6/1998 | Urano et al. | 348/43 |
| 5,808,617 A * | 9/1998 | Kenworthy et al. | 345/421 |
| 5,884,004 A * | 3/1999 | Sato et al. | 386/98 |
| 5,886,736 A | 3/1999 | Chen | |
| 5,907,364 A | 5/1999 | Furuhata et al. | |
| 6,040,852 A | 3/2000 | Stuettler | |
| 6,049,352 A | 4/2000 | Allio | |
| 6,097,676 A * | 8/2000 | Fujinami | 369/30.04 |
| 6,122,000 A | 9/2000 | Yee et al. | |
| 6,141,036 A | 10/2000 | Katayama et al. | |
| 6,163,337 A | 12/2000 | Azuma et al. | |
| 6,195,726 B1 | 2/2001 | Hogan | |
| 6,236,428 B1 | 5/2001 | Fukushima | |

FOREIGN PATENT DOCUMENTS

| | | |
|---|---|---|
| EP | 0 655 869 A | 5/1995 |
| EP | 06 011 611.8 | 10/2009 |
| EP | 09 16 4211 | 10/2009 |
| JP | 05-176291 | 7/1993 |
| JP | 6-38244 | 2/1994 |
| JP | 06-133280 | 5/1994 |
| JP | 06-261286 | 9/1994 |
| JP | 6-302103 | 10/1994 |
| JP | 06-350968 | 12/1994 |
| JP | 6-350968 | 12/1994 |
| JP | 07-013544 A | 1/1995 |
| JP | 7-30925 | 1/1995 |
| JP | 7-143443 | 6/1995 |
| JP | 07-288850 A | 10/1995 |
| JP | 07-298311 A | 11/1995 |
| JP | 08-045249 A | 2/1996 |
| JP | 08-149511 A | 6/1996 |
| JP | 08-307901 A | 11/1996 |
| JP | 11-191895 | 7/1999 |
| WO | 95/18511 | 7/1995 |
| WO | WO 97/32437 | 9/1997 |

OTHER PUBLICATIONS

English translation of Japanese language search report.
European Search Report for Application No. EP 06 01 1611, dated Sep. 8, 2006.

* cited by examiner

Fig. 2
(1) Input signal
R/A
L/B
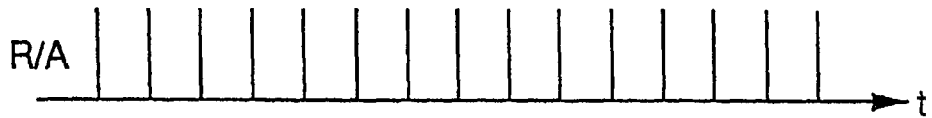
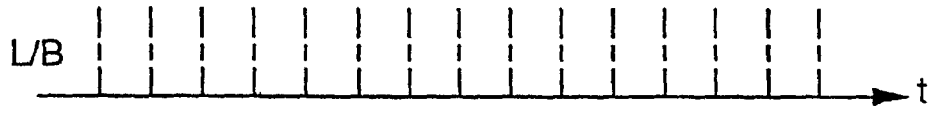
(2) Signal
R-MPEG
L-MPEG
(3) Record signal (interleave signal)
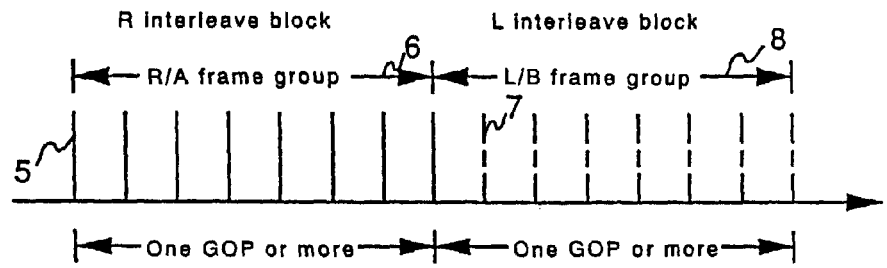
(4) Disk rotation (one pulse in one revolution)
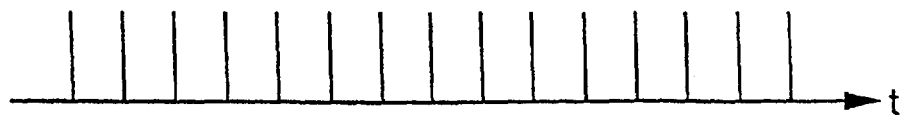

Fig. 4

Stereoscopic video arrangement table

| | | Start address | Channel No. | End address |
|---|---|---|---|---|
| First stereoscopic/PG stream | R/A | $a_1$ | 1 | $a_{n1}$ |
| | L/B | $a_2$ | 2 | $a_{n1}+1$ |
| Second stereoscopic/PG stream | R/A | $a_{n2}$ | 3 | $a_{n3}$ |
| | L/B | $a_{n2}+1$ | 4 | $a_{n3}+1$ |
| Third stereoscopic/PG stream | R/A | | | |
| | L/B | | | |

Fig. 13

| | Stereoscopic/PG video identifier present | | | | | | Absent | | |
|---|---|---|---|---|---|---|---|---|---|
| (1) Stereoscopic/PG video identifier | t1 46 t2 47 t3 46a t4 47a t5 46b t6 47b t7 46c t8 47c t9 46d t10 47d t11<br>6  8  6a  8a  6b  8b  44  45  44a  45a<br>R1 L1 R2 L2 R3 L3 A1 B1 A B | | | | | | | | |
| (2) Record signal | ▦ ▦ ▦ ▦ ▦ ▦ | | | | | | | | |
| (Note) | ┄┄┄ Delay time of 1t only (one interleave block time) | | | | | | | | |
| (3) R output (30fps) | R1 ▦ | | R2 | | R3 | | A ▦ | A ▦ | A |
| (4) L output (30fps) | L1 | | L2 | | L3 | | A | A | A |
| (5) Mixed output (120 Hz) | R1/L1 ▦<br>48 49 48a 49a | | R2/L2 | | R3/L3 | | A ▦<br>48d 49d 48e | A | A |
| (6) Mixed output (60 Hz) | R1/L1 ▦ | | R2/L2 | | R3/L3 | | A | A | A |

Fig. 18

Stereoscopic PG video logic arrangement table 53 51 / File

| Logic layer | | | | | | | | | | |
|---|---|---|---|---|---|---|---|---|---|---|
| Video title layer (VTS) | Title 1 | | | | | | | | | |
| | 001 | There are 3D/PG cells and non-3D/PG cells. | | | | | 2 | 3 | 4 | |
| | | | | | | | 110 All cells are 3D. | 000 No 3D. | 101 All cells are PG. | |
| (Part of video title layer) (PVT) | Chapter No. | | | | | | | | | |
| | 1 | | | | | 2 | 3 | 4 | | |
| | 001 There are 3D/PG cells and non-3D/PG cells. | | | | | 000 No 3D. | 110 All cells are 3D. | 101 All cells are PG. | | |
| Cell layer (Cell) | Cell No. | | | | | | | | | |
| | 1 | 2 | 3 | 4 | 5 | 6 | 7 | 1 | 2 | |
| | 1-R | 1-L | 2-R | 2-L | 00 | 00 | | | | |

Fig. 43
(a)
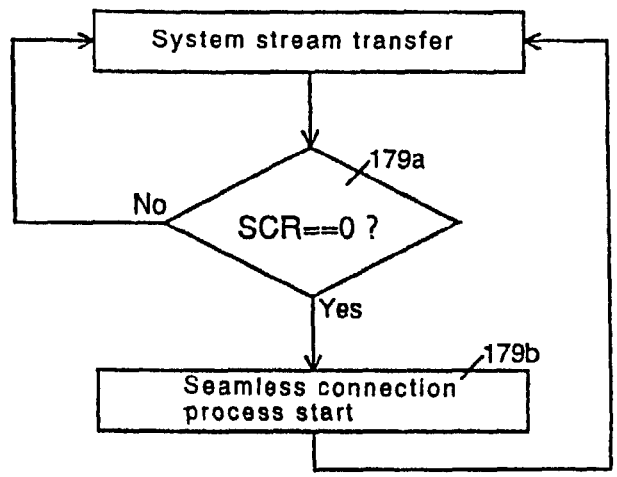
(b)
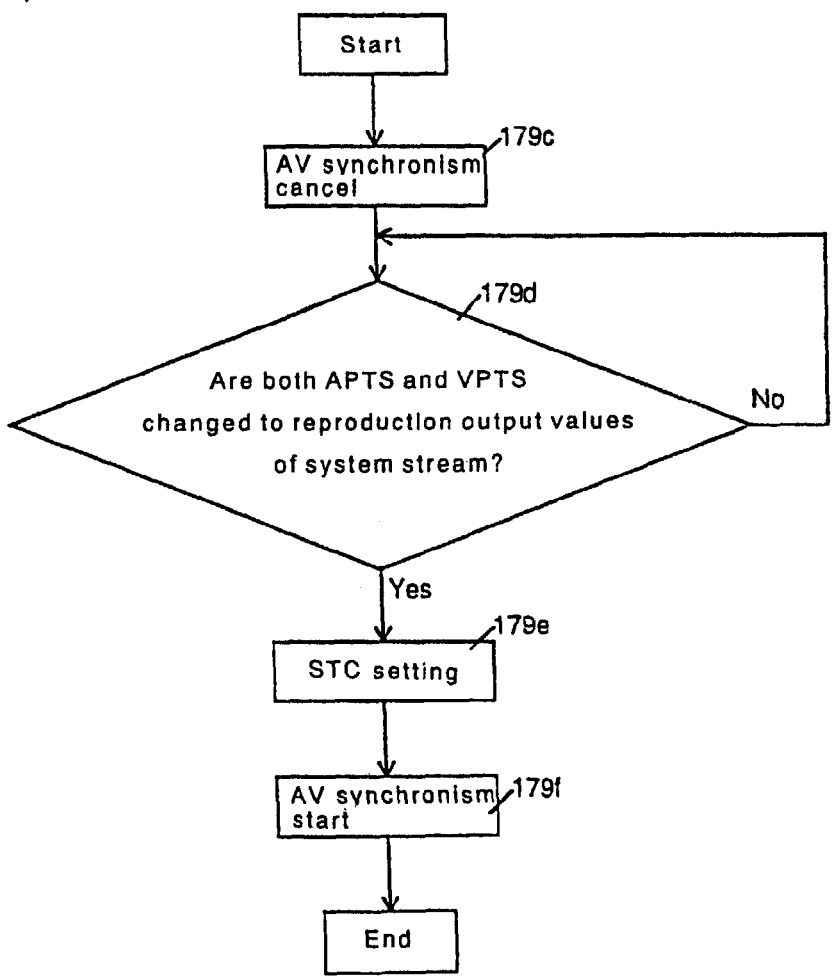

HIGH-RESOLUTION OPTICAL DISK FOR RECORDING STEREOSCOPIC VIDEO, OPTICAL DISK REPRODUCING DEVICE, AND OPTICAL DISK RECORDING DEVICE

This application is a divisional of U.S. patent application Ser. No. 09/125,885 filed Aug. 27, 1998 now U.S. Pat. No. 6,574,423 which is a U.S. National Phase Application of PCT International Application PCT/JP97/00615 filed on Feb. 28, 1997.

FIELD OF THE INVENTION

The present invention relates to an optical disk in which stereoscopic videos and high-quality videos are recorded, and a reproducing device and a recording device of such optical disk.

BACKGROUND OF THE INVENTION

Hitherto, as an optical disk in which stereoscopic moving picture is recorded, and its reproducing device, the structure as shown in FIG. 10 is known. Herein, in an optical disk 201, right-eye signals are recorded alternately in even-field regions 204, 204a, 204b, and left-eye signals, in odd-field regions 203, 203a, 203b. When such optical disk 201 is reproduced by an existing optical disk reproducing device 205 as shown in FIG. 11, the right-eye images and left-eye images appear on a TV 206 alternately in every 1/60 second. With the naked eye, only the right-eye and left-eye images appear to be a duplicate image. However, when observed through stereoscopic goggles 207 for changing over the right-eye and left-eye shutters once in every 1/60 second, a stereoscopic image is seen. As shown in FIG. 12, the right-eye image and left-eye image are alternately encoded in every field in the interlace signals in one GOP (Group of Pictures) of MPEG signal. As high-quality videos, the progressive system is being studied.

Problems in the prior art are discussed. When a conventional stereoscopic optical disk is reproduced in a standard reproducing device, an ordinary image which is not stereoscopic image, that is, 2D image is not delivered. A stereoscopic optical disk cannot be reproduced by a reproducing device unless a stereoscopic display is connected thereto. It was hence necessary to fabricate two types in the same contents, that is, a stereoscopic optical disk and a 2D optical disk. It is the same for high-quality videos. That is, the conventional stereoscopic and high-quality optical disks were not compatible with ordinary videos. A purpose of the invention is described below. It is a purpose of the invention to present a mutually compatible stereoscopic and high-quality optical disk and a reproducing system. As the definition of compatibility is clarified, the compatibility may be just compared to the relation between the monaural record and stereo record in the past. That is, a new stereoscopic optical disk is reproduced as a mono-vision, that is, 2D with an existing reproducing device, and is reproduced as either mono-vision or stereo-vision, that is, stereoscopic video with a new reproducing device.

SUMMARY OF THE INVENTION

To achieve the object, in the optical disk of the invention, first, two moving pictures for right and left eye at a frame rate of 30 frames/sec each are entered, a video data unit is compiled by combining one GOP or more of images of plural frames of video data of one eye or field components of progressive image, an interleaved block consisting of said video data unit is provided so that one video data unit is recorded by one revolution or more on the track of the optical disk, the right and left video data units are recorded so as to be interleaved, that is, disposed alternately, and information of video identifier of stereoscopic video and high-quality video is recorded.

When this optical disk is played back in an optical disk reproducing device for ordinary 2D reproduction, an ordinary 2D moving picture is reproduced.

The reproducing device applicable to stereoscopic videos and high-quality video of the invention comprises means for reproducing video identifier information from the optical disk, means for reproducing 2D video by a conventional procedure according to this information, means for reproducing 3D video or high-quality video, and means for issuing stereoscopic video and high-quality video.

BRIEF DESCRIPTION OF THE DRAWINGS

FIG. 2 is a time chart showing the relation of input signal and recorded signal in the embodiment of the invention.

FIG. 4 is a diagram showing stereoscopic video arrangement information in an embodiment of the invention.

FIG. 13 is a time chart showing the relation of virtual stereoscopic video identifier, R output and L output in an embodiment of the invention.

FIG. 18 is a diagram showing the state of a stereoscopic video identifier entered in the stereoscopic video logic arrangement table in the embodiment of the invention.

FIG. 43 is a flowchart of seamless connection in the embodiment of the invention.

53 is a progressive reproducing method for reproducing interleaved blocks while referring to the video present time stamp in the embodiment of the invention.

PREFERRED EMBODIMENT OF THE INVENTION

Figure 1:
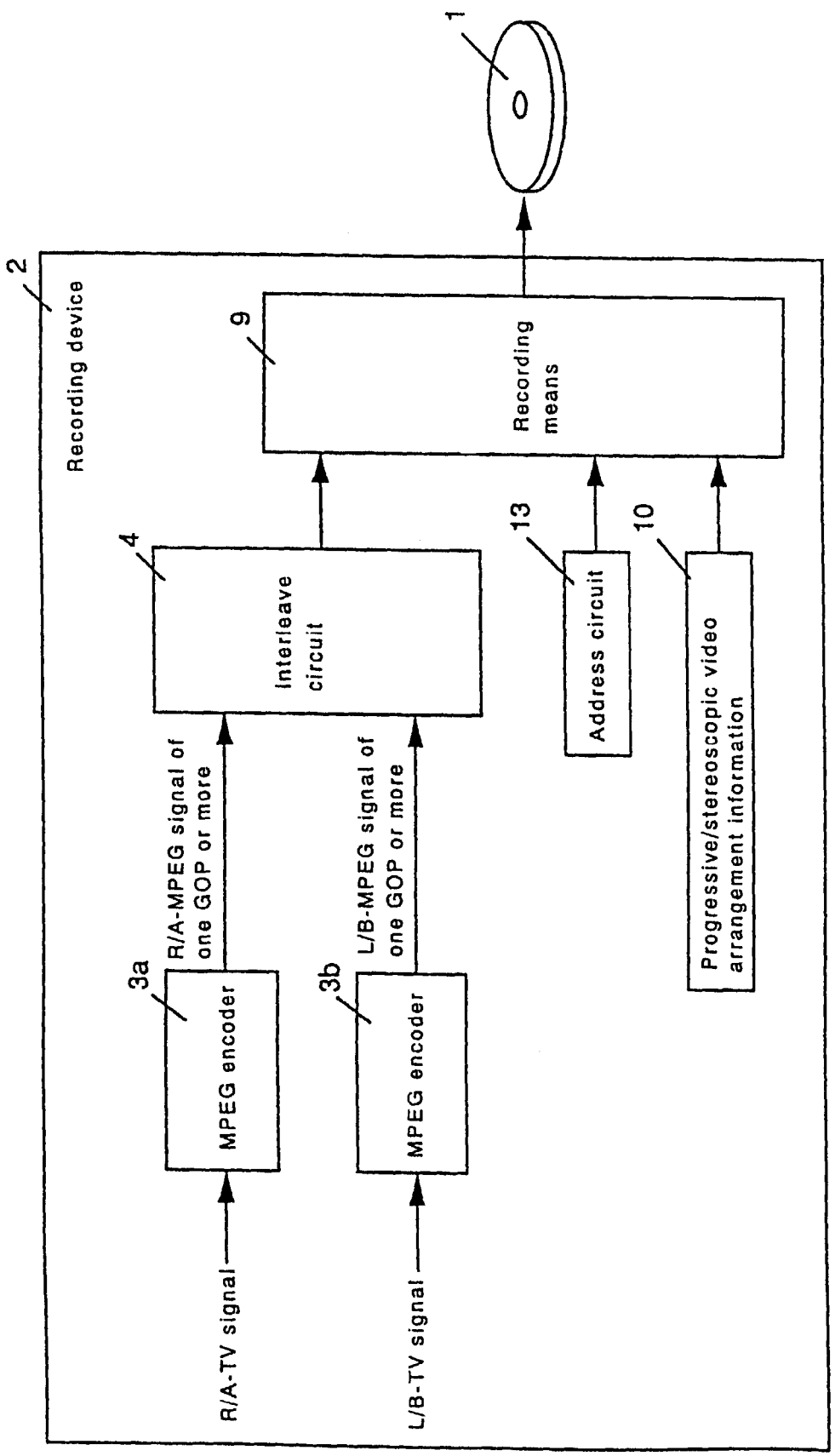
FIG. 1 is a block diagram showing a recording device in an embodiment of the invention.

Referring now to the drawings, preferred embodiments of the invention are specifically described below.

The method of recording and reproducing stereoscopic videos (3-D videos) and high resolution videos is described in the first half, and the method of realizing high-resolution videos is discussed in the second half.

In recording of the invention, in the case of stereoscopic video or wide video, two screens of the right eye and left eye, or two screens divided in the horizontal direction are recorded separately. The two screens are field videos starting from an odd-number line, which are called odd-first signals. When recording a progressive video by dividing into two screens in the vertical direction, these two screens consist of a field signal starting from an odd-number line and a field signal starting from an even-number line, which are respectively called odd-first signal and even-first signal.

In this specification, an interleaved recording unit of video information of one GOP or more is called an interleaved block or a frame group.

FIG. 1 is a block diagram of an optical disk recording device 2 of the invention. A signal for the right eye of a stereoscopic image is called an R-TV signal, and a signal for the left eye is called an L-TV signal, and the R-TV signal and L-TV signal are compressed into MPEG signals by MPEG encoders 3a, 3b, and an R-MPEG signal and an L-MPEG signal as shown in FIG. 2(2) are obtained. These signals are interleaved in an interleave circuit 4, as shown in FIG. 2(3), so that an R frame group 6 by combining R frames 5 of R-MPEG signals by the number of frames of one GOP or more into a frame group, and an L frame group 8 by combining L frames 7 of L-MPEG signals by the number of frames of one GOP or more may be disposed alternately. This recording unit is called an interleaved block, or called a frame group in the specification. In order that the right-eye signal and left-eye signal may be synchronized when reproducing, the number of frames in the R frame group 6 and L frame group 8 is same as the number of frames in the same duration. This is also called the video data unit, and in one unit, data for the duration of 0.4 sec to 1 sec is recorded. In the case of DVD, on the other hand, the innermost circumference is 1440 rpm, that is, 24 Hz. Accordingly, as shown in FIG. 2(4), the interleaved block is recorded for more than one revolution to more than ten revolutions of the disk. Back to FIG. 1, the address information is issued from an address circuit 13, and stereoscopic video arrangement information is issued from a stereoscopic video arrangement information output unit 10, and is recorded on an optical disk by a recording circuit 9. This stereoscopic video arrangement information includes an identifier showing whether the stereoscopic video is present on the optical disk or not, or a stereoscopic video arrangement table 14 shown in FIG. 4. As shown in FIG. 4, the channel numbers arranging R and L stereoscopic videos, start address and end address are presented. On the basis of such arrangement information and identification information, in the reproducing device, stereoscopic videos are correctly issued as R and L outputs. Therefore, if different ordinary videos are issued to R and L by mistake, the videos are not related to the right eye and left eye of the viewer, so that discomfort is given. The stereoscopic video arrangement information or stereoscopic video identifier is effective for preventing output of such uncomfortable videos. The method is more specifically described in the following explanation of the reproducing device.

Herein, a specific method of realizing stereoscopic video arrangement information is described. In the case of an optical disk conforming to DVD standard, files of directory of contents and information of table of contents are standardized and recorded in a record starting region of the optical disk. These files, however, do not contain description about stereoscopic videos. Accordingly, a stereoscopic video logic arrangement file 53 containing a stereoscopic video logic arrangement table 51 shown in FIG. 18 is provided, and this file is read by a reproducing device corresponding to stereoscopic video. An ordinary 2D reproducing device does not read the stereoscopic video logic arrangement file 53, but does not reproduce 3D, and hence there is no problem.

FIG. 18 is explained. Video information of DVD consists of three logic layers. They are video title set (VTS) layer showing the title of the movie or the like, part of video title (PVT) layer showing chapters in the title, and cell layer showing stream in the chapter.

The arrangement of stereoscopic video is shown in each layer. 000 means there is no stereoscopic video or progressive at all. 110 means an entire stereoscopic video. 001 means a mixture of stereoscopic portion and non-stereoscopic portion. In FIG. 18, title 1 of VTS layer is 001 meaning a mixture of 3D and ordinary video, title 2 is 110 meaning an entire stereoscopic video. Title 3 is 000 meaning there is no stereoscopic video. Therefore, in the layers beneath titles 2 and 3, stereoscopic information is not necessary.

In the PVT layer of title 1, chapter 2 is 000 meaning there is no stereoscopic cell, and chapter 3 is 110 meaning all cells are stereoscopic. Therefor, stereoscopic information is not necessary in the cell layer. Chapter 1 is 001 meaning a mixture of stereoscopic cells and ordinary cells. In the cell layer of chapter 1, cells 1 and 2 are R and L of first story, cells 3 and 4 are R and L of second story, and cells 5 and 6 contain recording of ordinary videos. In this way, by recording the stereoscopic video logic arrangement file separately in the optical disk, the conventional file is not changed, and hence compatibility is maintained. Moreover, by this logic information, all physical information on the optical disk is known, and it hence prevents such error as to display ordinary videos of two different contents in the right and left eyes. Still more, by adequately reproducing the stereoscopic video and decoding, videos of R and L can be given to the right eye and left eye from the correct output units.

Figure 19:
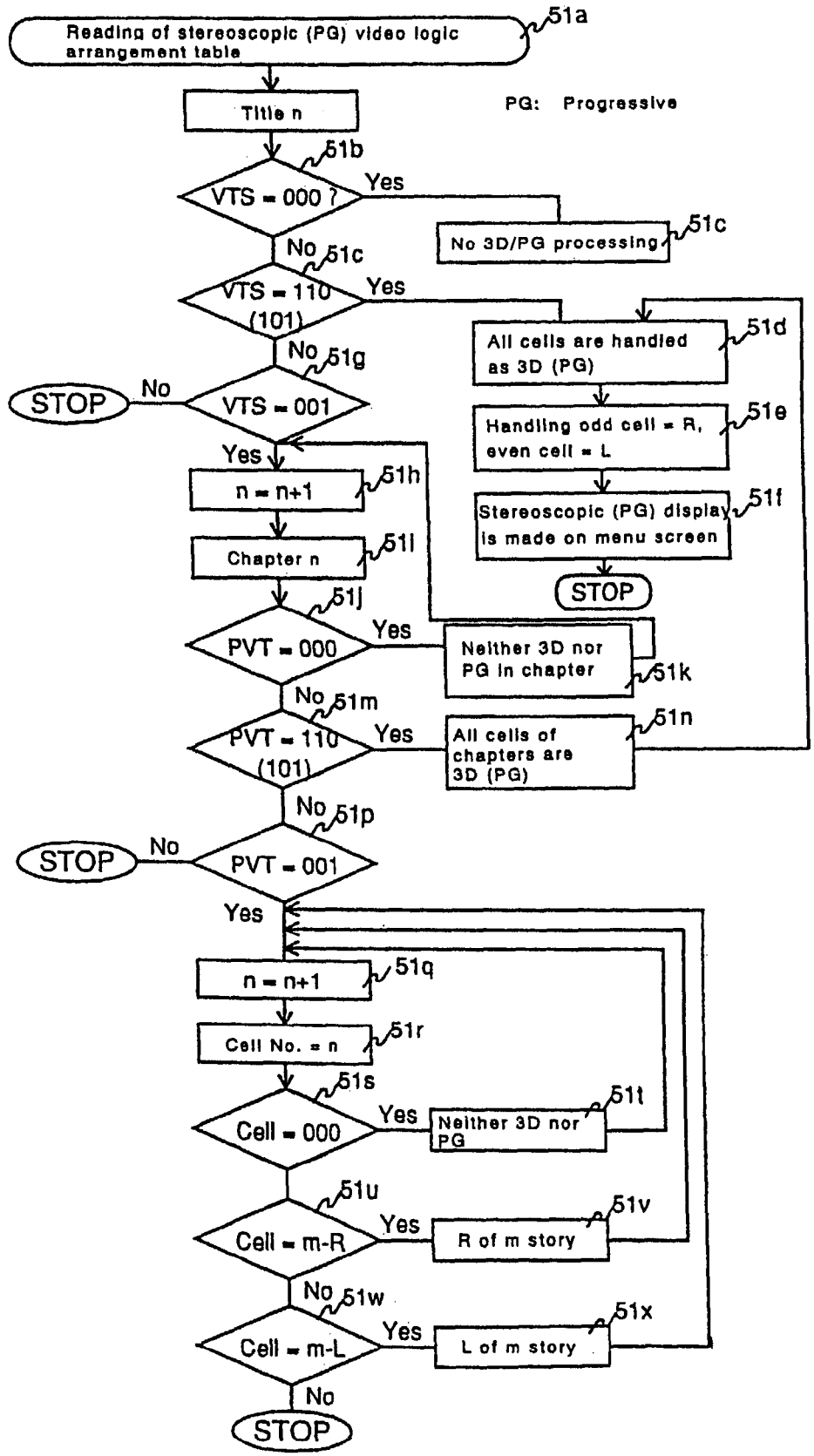
FIG. 19 is a flowchart showing the procedure of specifying the attribute of stereoscopic video of each chapter, each cell and each interleaved block from the stereoscopic video identifier of the stereoscopic video logic arrangement table in the embodiment of the invention.

Referring to the flowchart in FIG. 19, the procedure of judging whether each cell is stereoscopic video or not from the stereoscopic video logic arrangement table is shown. At step 51a, the stereoscopic video logic arrangement table 52 is read out from the first record region of optical disk. At step 51b, the content of the VTS layer shown in FIG. 18 of title n is checked, and if 000, it is judged to be not a stereoscopic cell, and 3D processing is not done. At step 51c, if VTS=110, all cells are handled as 3D at step 51d, and odd cell=R and even cell=L are handled at step 51e. At step 51f, the display that all cells in title n are stereoscopic is shown in the menu screen. At step 51g, if VTS=001, at step 51i, the arrangement information of chapter n in the lower layer is checked, and at step 51j, if PVT=000, at step 51k, it is judged there is no 3D cell in chapter n, at step 51m, if PVT=110, at step 51n, all cells in the chapter are judged to be 3D, and advancing to step 51d, same as stated above, the display that the corresponding chapter is stereoscopic is added to the menu screen. Back to step 51p, if PVT=001, cell number=n in the chapter of PVT=001 is checked one by one, and at step 51s, if cell=000, it is judged not 3D, and the process returns to step 51q. At step 51u, if cell=m-R, at step 51v, it is judged to be R of m story, and at step 51w, if cell=m-L, at step 51x, it is judged to be L of m story, and next cell is checked at step 51q.

In this way, by additional recording of the stereoscopic video logic arrangement table 52 in FIG. 18, it provides an effect of judging whether titles, chapters and cells of all videos are stereoscopic or not.

Figure 3:
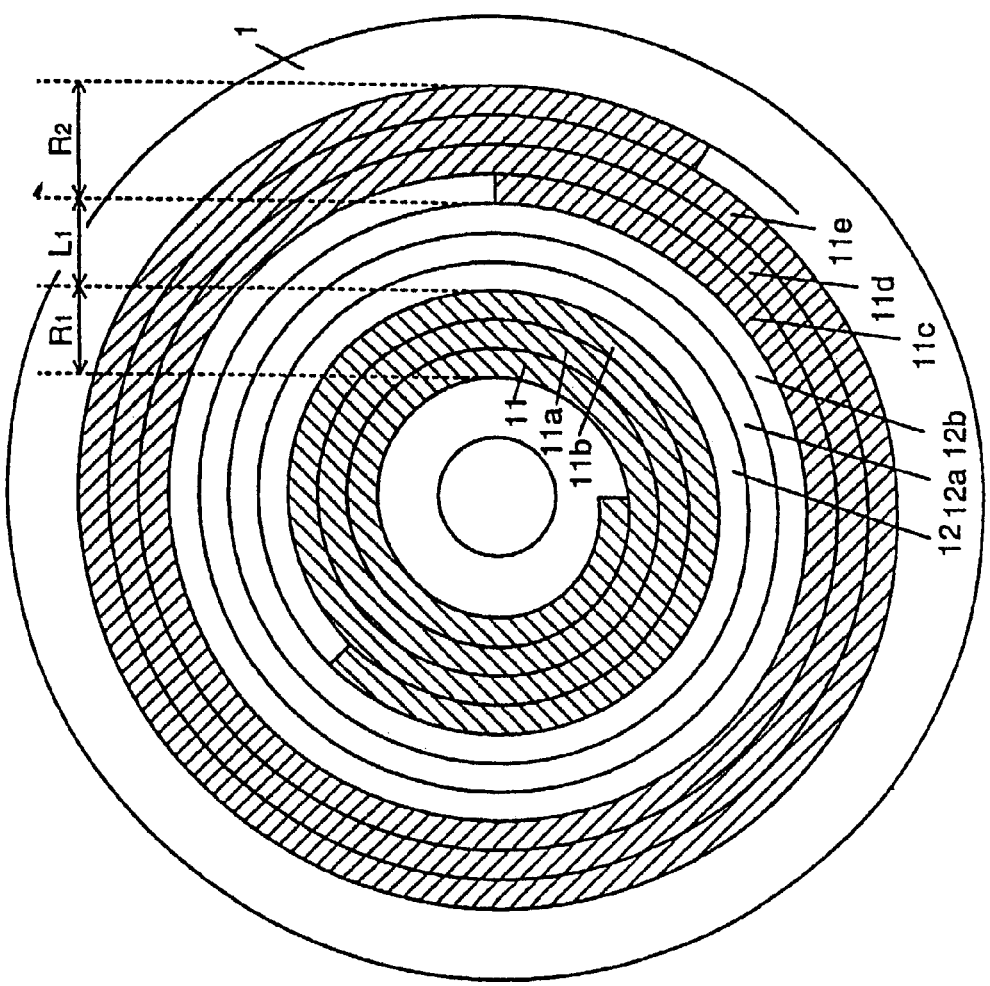
FIG. 3 is a top view of an optical disk showing an arrangement of interleaved block on the optical disk in the embodiment of the invention.

This is further explained in a top view of a disk in FIG. 3. One spiral track is formed in a disk 1, and an R frame group 6 is recorded in a plurality of tracks of R tracks 11, 11a, 11b. Actually, it is recorded in 5 to 24 tracks. An L frame group 8 is recorded in L tracks 12, 12a, 12b, and next R frame group 6a, in R tracks 11c, 11d, 11e.

Figure 5:
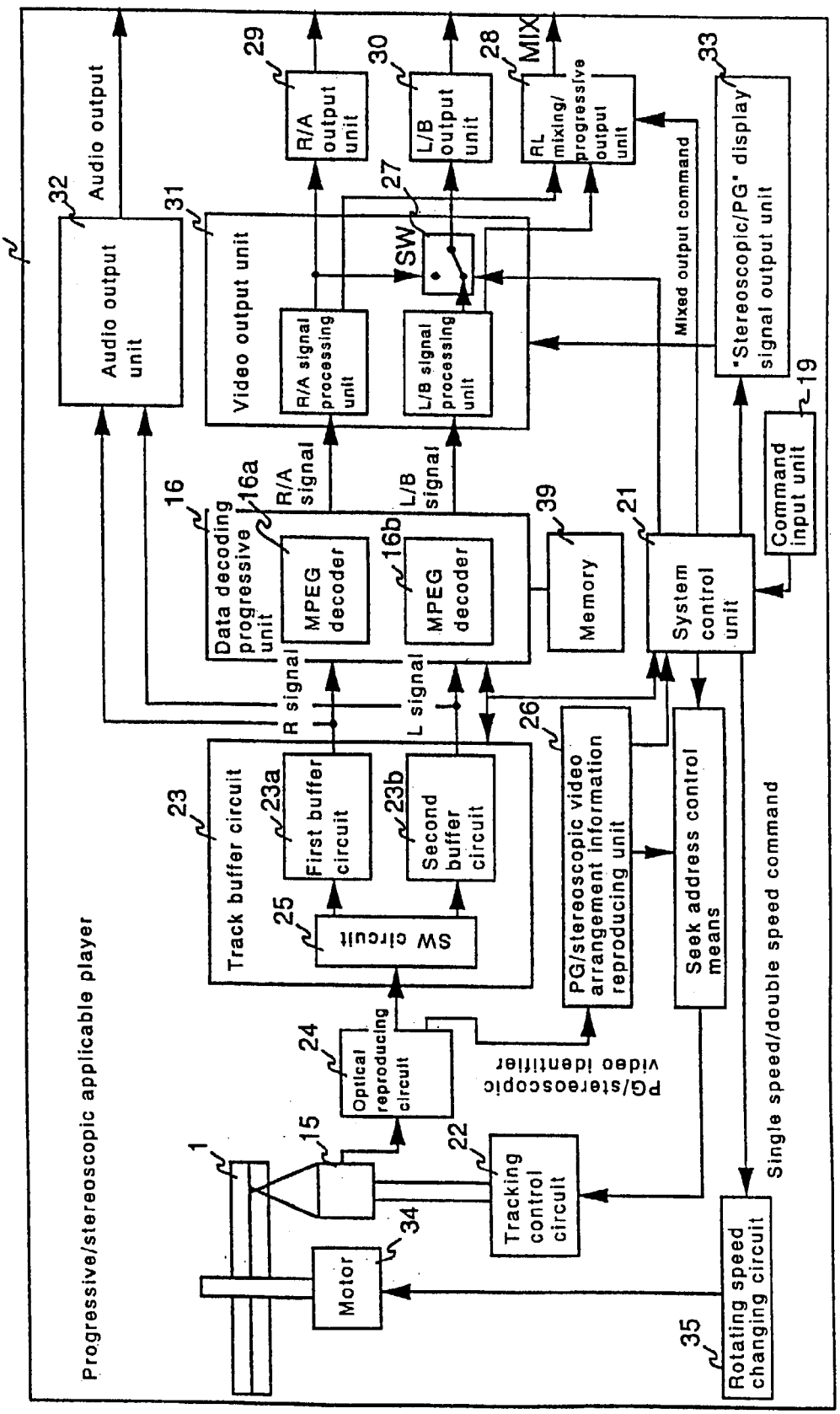
FIG. 5 is a diagram showing a reproducing device of stereoscopic video in the embodiment of the invention.
Figure 6:
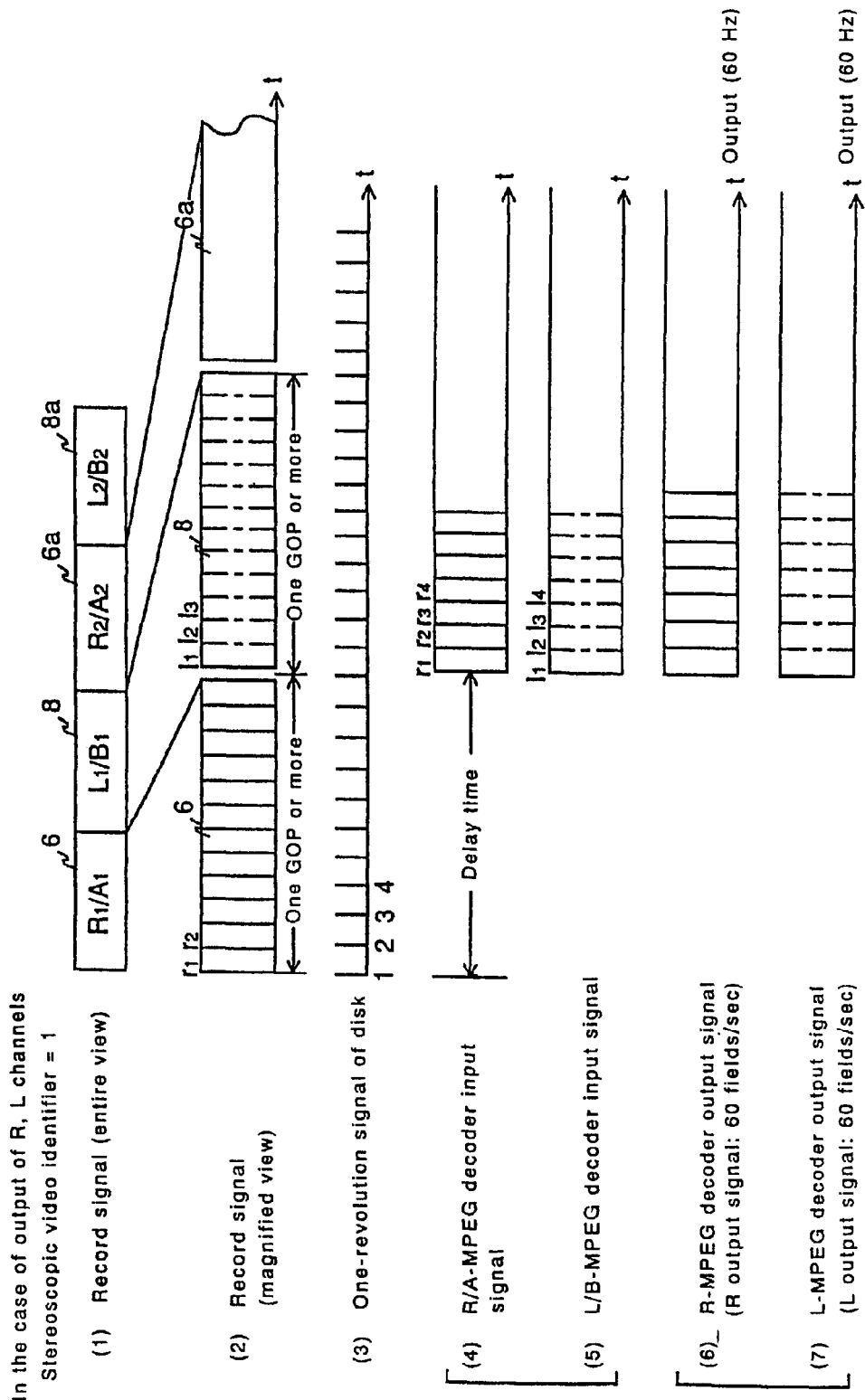
FIG. 6 is a time chart showing the relation of signals recorded in the reproducing device and video output signals in the embodiment of the invention.

The reproducing operation is described by referring to the block diagram of 3D reproducing device of the invention in FIG. 5, and the timing chart in FIG. 6. When a signal is reproduced from the optical disk 1 by an optical head 15 and an optical reproducing circuit 24, and a stereoscopic video identifier is detected by a stereoscopic video arrangement information reproducing unit 26, or when video data designated to be stereoscopic video in a stereoscopic video arrangement table 14 as shown in FIG. 4 is reproduced, if a stereoscopic video output is instructed from an input unit 19 or the like, the stereoscopic video is processed, and, at the same time, a SW unit 27 is controlled, and R signal and L signal are issued from an R output unit 29 and an L output unit 30, and R and L are issued alternately in each field from an RL mixed output unit 28.

Referring to FIG. 5 and FIG. 6, operation of stereoscopic video reproduction is described. On the optical disk, as explained in FIG. 2(3), R frame group 6 and L frame group 8 having frames of one GOP or more each are recorded alternately. In FIG. 6, (1) shows an entire view, and (2) shows a partial view. The output signal of the optical reproducing circuit 24 in FIG. 5 is as shown in FIG. 6(2). This signal is separated into R signal and L signal in the SW unit 25, and the time axis of the R signal and L signal is matched with the original time by means of a first buffer circuit 23a and a second buffer circuit 23b, respectively. As a result, input signals of R and L-MPEG decoders are obtained as shown in FIGS. 6(4), (5). By processing these signals in MPEG decoders 16a, 16b in FIG. 5, mutually synchronized R and L output signals are sent into a video output unit 31 as shown in FIGS. 6(6), (7). The audio signal is expanded and issued in an audio output unit 32.

In this way, two outputs of R and L are issued simultaneously, and therefore in a stereoscopic TV of two outputs of R and L, by sending signals of 60 fps (frames per second) each from R output unit 29 and L output unit 30, a flicker-less video is obtained. From the RL mixed output unit 28, by sending an RL mixed output of 60 fields/sec, a 3D video can be viewed, although there is flicker, by the conventional TV and 3D goggles. By issuing an RL mixed output of 120 fields/sec, a flicker-less 3D video can be viewed by using double scan TV and 3D goggles. Besides, in spite of stereoscopic video contents, if stereoscopic output is not made, a signal is added by a "stereoscopic" display signal output unit 33, and a symbol meaning stereoscopic is displayed in the TV screen. As a result, the user is informed of the fact that the stereoscopic video is being observed in 2D mode, and is urged to change over to the stereoscopic output.

Figure 7:
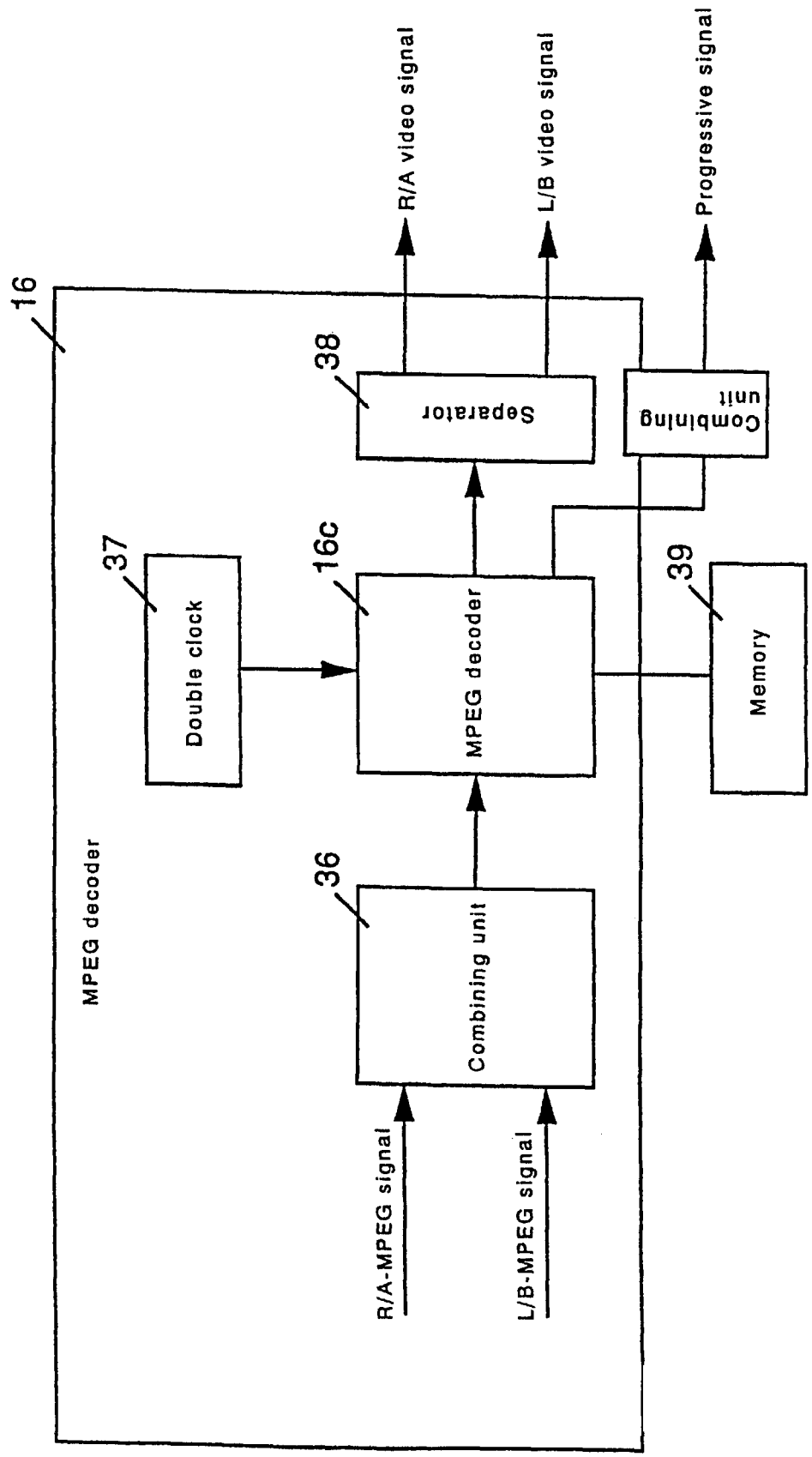
FIG. 7 is a block diagram showing an MPEG decoder of a reproducing device in an embodiment of the invention.

In the block diagram in FIG. 5, two MPEG decoders are used, but as shown in FIG. 7, the R-MPEG signal and L-MPEG signal may be combined into one MPEG signal in a combining unit 36, a double clock is generated by a double clock generating unit 37, double operation and expansion are done in a double clock type MPEG decoder 16c, and R and L video signals are issued from a separating unit 38, so that the constitution may be simplified in such circuit configuration. In this case, as compared with the 2D reproducing device, it is enough to add only a 16 MB SD-RAM to the memory 39, so that the cost increase is small.

Next is described the procedure of rotating at single speed and taking out only R signal. The standard rotation of the DVD reproducing device is called the single speed, and double rotation of the standard is called the double speed. Since it is not necessary to rotate the motor 34 at double speed, a single speed command is sent from a control unit 21 to a rotating speed change circuit 35, and the rotating speed is lowered. The procedure of taking out only R signal at single speed from the optical disk in which R signal and L signal are recorded is described by referring to the time chart in FIG. 8. As explained in FIGS. 6(1), (2), R frame groups 6 and L frame groups 8 are alternately recorded in the optical disk of the invention. This state is shown in FIGS. 8(1), (2).

Figure 8:
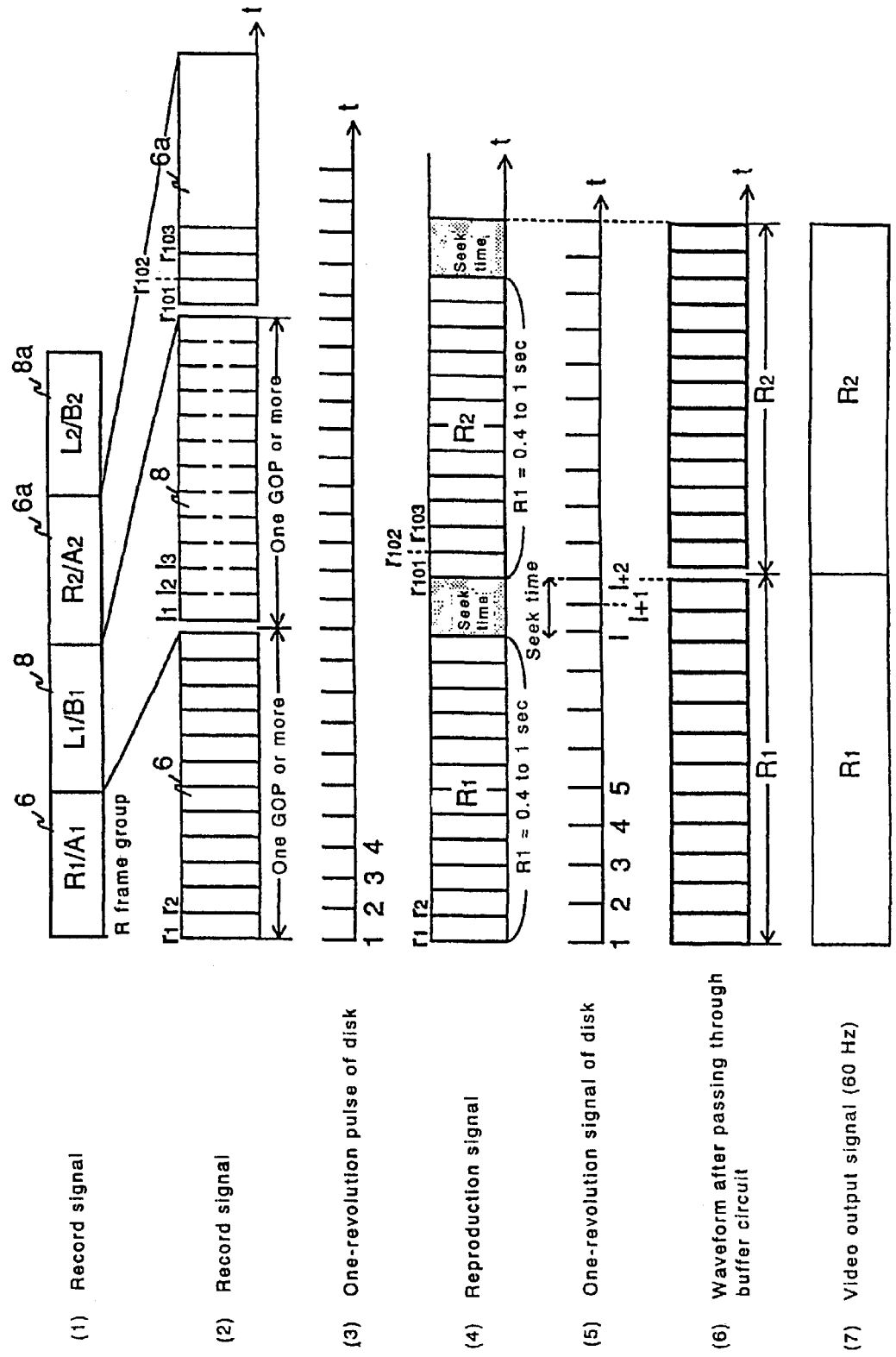
FIG. 8 is a time chart showing the relation between recorded signals and output signals in 2D reproduction of the reproducing device in the embodiment of the invention.

Comparing this signal and the one-rotation signal of the disk in FIG. 8(3), it is known that the optical disk rotates 5 to 20 revolutions during reproduction of one frame group. When the optical head jumps tracks from the R frame group 6 to R frame group 6a, the track jumping time to the adjacent track takes scores of microseconds. Supposing the rotation waiting time to be a maximum of one revolution, data of the R frame group 6a can be reproduced in two revolutions. This is shown in the reproduction signal diagram and the time chart of one-revolution signal of disk in FIGS. 8(4), (5). In the reproduction signal in FIG. 8(4), the time axis is adjusted by the buffer circuit 23a in FIG. 5, and a continuous R frame MPEG signal as shown in FIG. 8(6) is issued from the buffer 23a. This signal is expanded by the MPEG decoder 16a as an R video signal as shown in FIG. 8(7). Same as the R signal, by selecting other channel, a 2D signal of L signal is obtained. Thus, as in the invention, by assigning R or L in the frame signal group of one GOP or more, and recording the frame signal group continuously over plural tracks, it provides an effect of obtaining 2D output of R only, if a 3D optical disk is reproduced, even by the single speed reproducing device.

Figure 9:
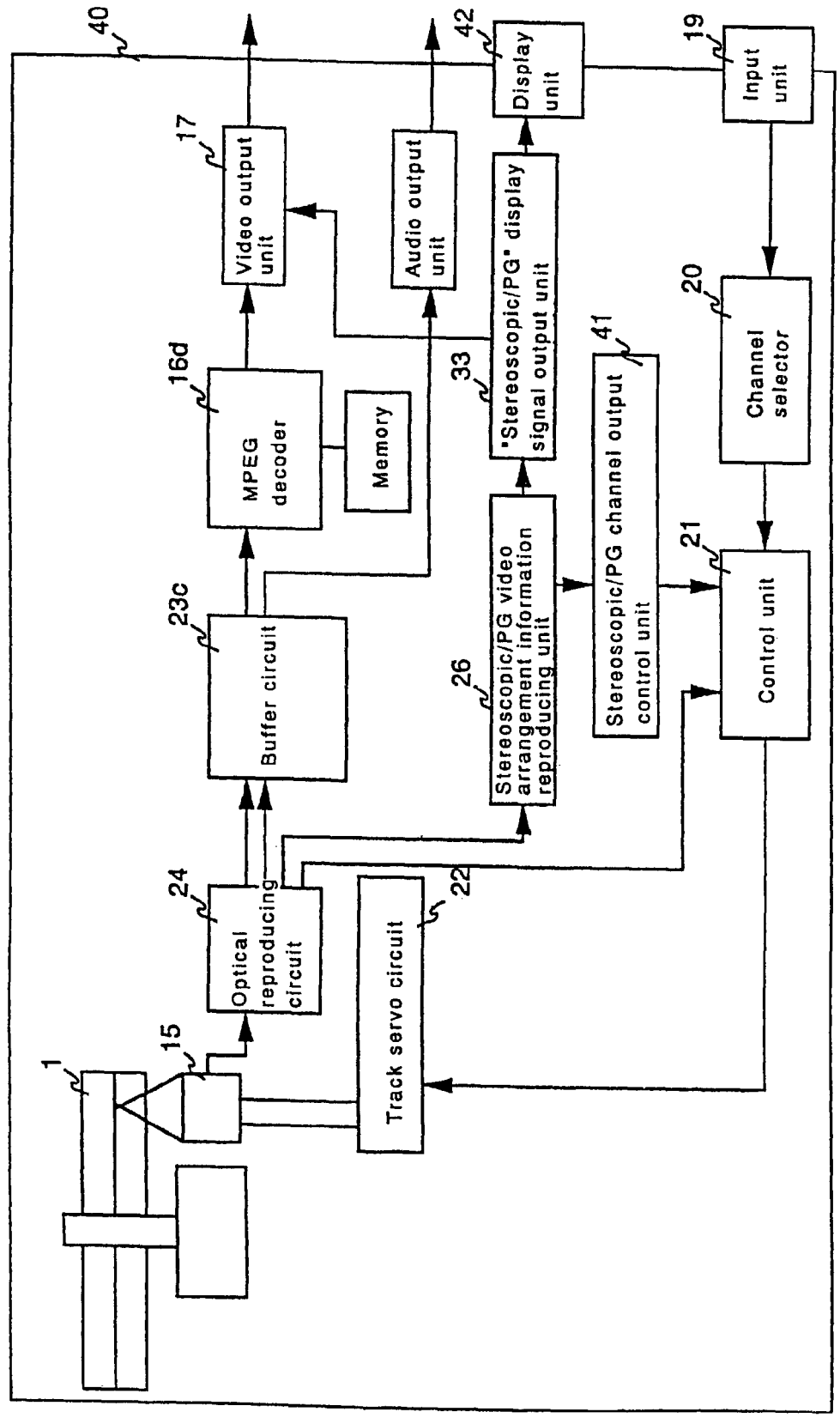
FIG. 9 is a block diagram showing a 2D type reproducing device in the embodiment of the invention.
Figure 10:
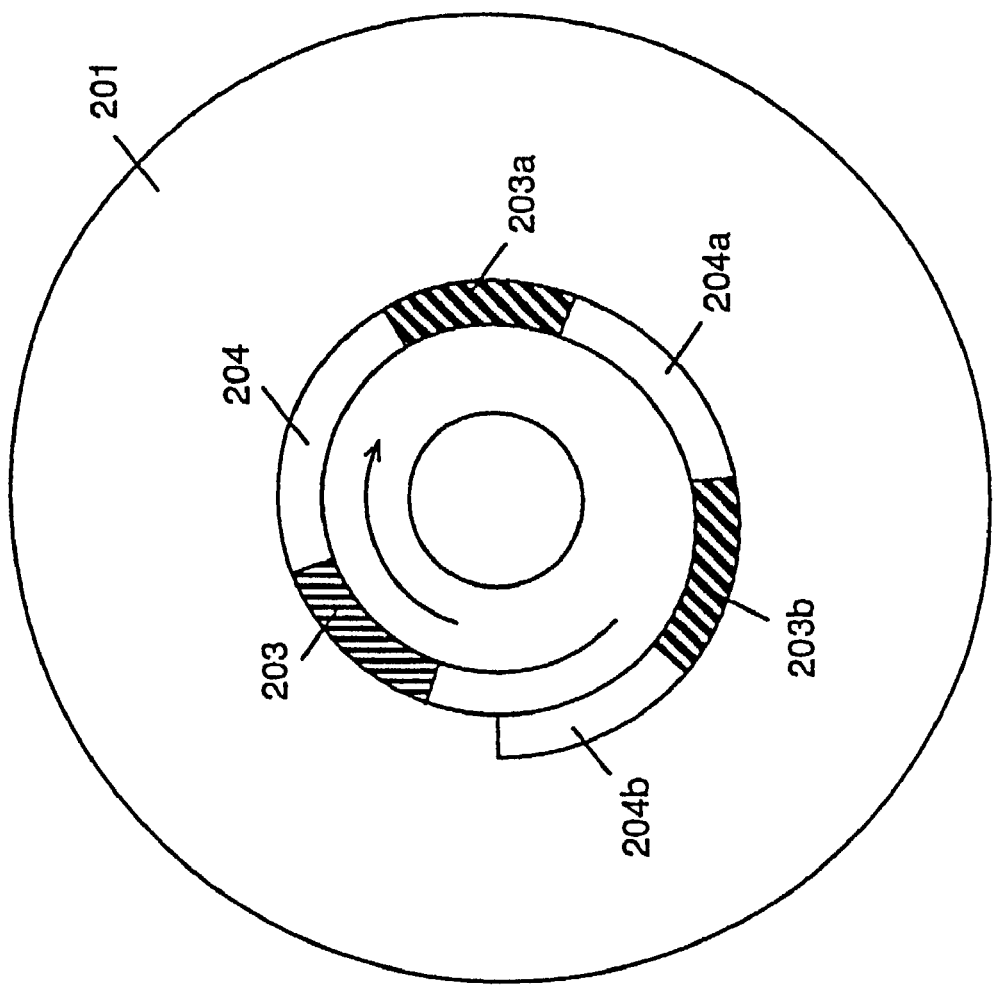
FIG. 10 is a top view showing data arrangement of optical disk recording stereoscopic video in a prior example.
Figure 11:
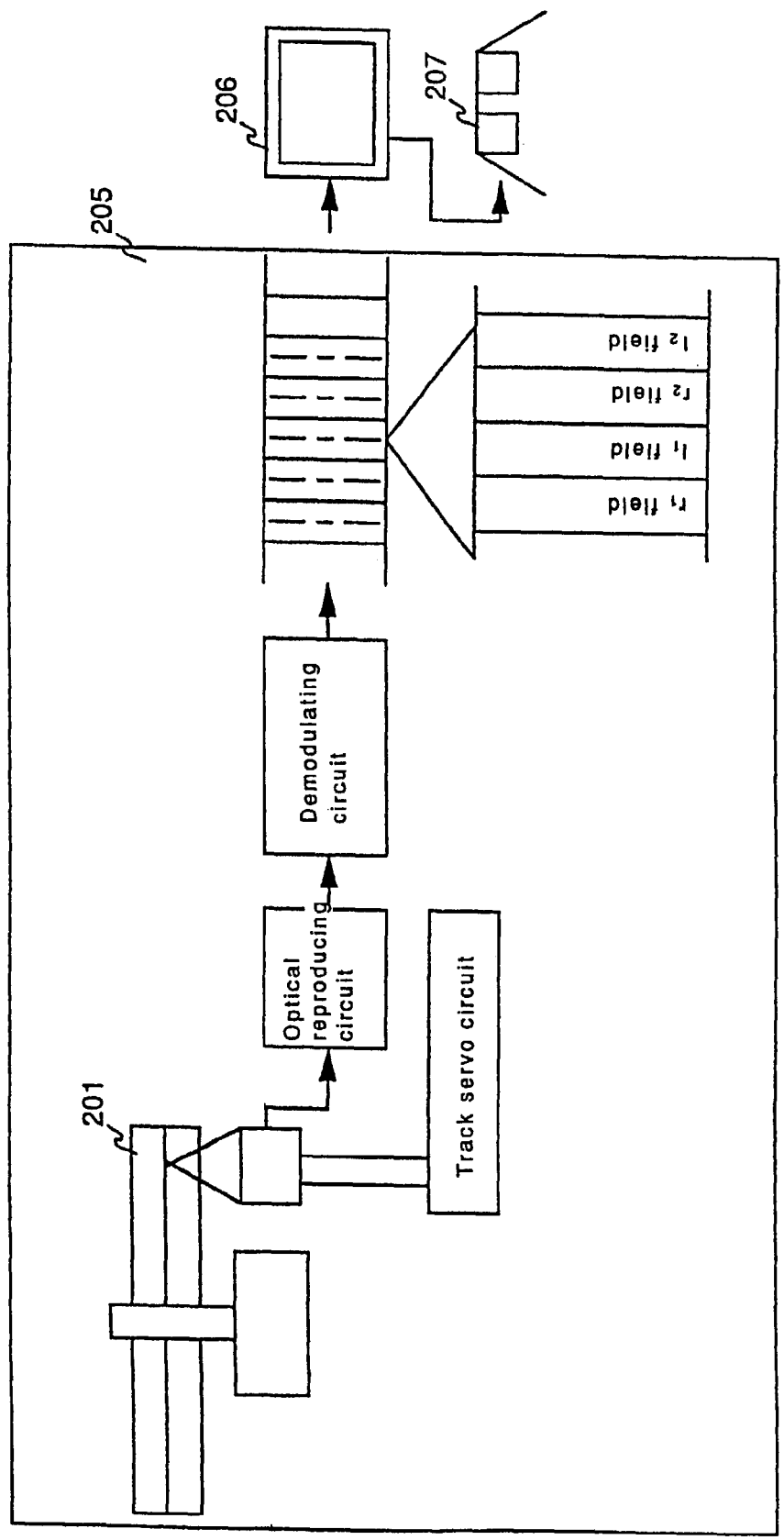
FIG. 11 is a block diagram of a reproducing device for reproducing an optical disk recording stereoscopic videos in a prior example.
Figure 12:
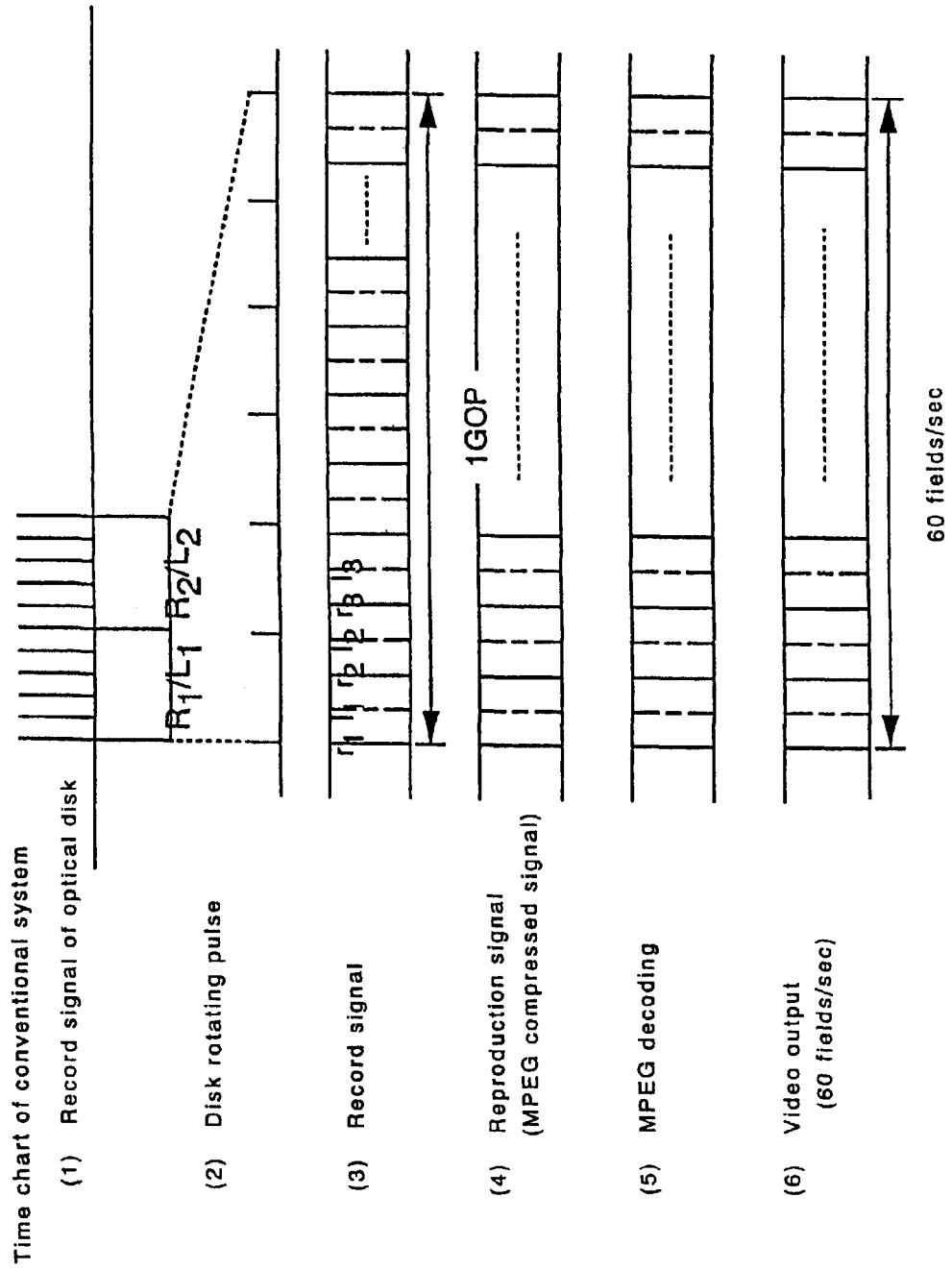
FIG. 12 is a time chart showing the relation of recorded signals and video output by reproducing a stereoscopic video type optical disk in the prior example.

Hence, as shown in the block diagram in FIG. 9, by using one buffer circuit 23 of the 3D reproducing device in FIG. 5, one MPEG decoder 16, and one video output unit 17, a 2D-only reproducing device can be composed. This 2D reproducing device 40 includes a stereoscopic video arrangement information reproducing unit 26, and the identifier and arrangement information of stereoscopic video of a 3D optical disk 1 are reproduced. Therefore, when the 3D optical disk is recorded in the 2D reproducing device, either one of R and L channels is issued. Since R and L have same videos, it is a waste of time to issue by changing over the channels in a channel selecting unit 20. In this invention, however, a stereoscopic channel output limiting unit 41 limits the output to one channel only, for example, R of stereoscopic video by using the stereoscopic video identifier. As a result, only one of R and L of the same video contents can be selected, so that the user does not have to select an unnecessary channel.

In the case of stereoscopic contents, the "stereoscopic" display is shown in a display unit 42 of the reproducing device by a "stereoscopic" display signal output unit 33, so that the user can recognize the stereoscopic contents. Thus, in the optical disk of the invention, 2D and stereoscopic videos are obtained in the stereoscopic reproducing device 43 in FIG. 5, and 2D videos are obtained in the 2D reproducing device in FIG. 9, so that the compatibility is realized.

Back to the 3D reproducing device, the method of use and effect of the stereoscopic video identifier are described.

FIG. 13 is a time chart of stereoscopic video identifier and output signal. If the time after FIG. 13(3) is defined as one interleaved block time unit, there is a delay time of It, but it is not shown in the chart. The stereoscopic video identifier in FIG. 13(1) is changed from 1 to 0 at t=t7. As recorded signals in FIG. 13(2), from t1 to t7, R frame groups 6, 6a, 6b and L frame groups 8, 8a, 8b of stereoscopic videos are recorded. In t7 to t11, on the other hand, completely different contents A and B are recorded as first frame groups 44, 44a, and second frame groups 45, 45a. In the standard of DVD, etc., there is no definition of stereoscopic video, and hence stereoscopic video identifier is not included in the data or directory information. Therefore, upon start of the optical disk, it is required to read out the stereoscopic video arrangement information file of the invention. In R output and L output in FIG. 13(3), (4), from t1 to t7, the data in first time domains 46, 46a, 46b may be directly issued to R output, and the data in second time domains 47, 47a, 47b, directly to L output. After t=t7, there is no stereoscopic video identifier, and therefore the same data as in first time domains 46c, 46d are issued to the R output and L output. In other output system, that is, in a mixed output in FIGS. 13(5), (6), from t1 to t7 in which the stereoscopic video identifier is 1, at the field frequency of 60 Hz or 120 Hz, even field signals 48, 48a and odd field signals 49, 49a are issued alternately from one output. The data of the first time domains 46, 46a are issued to the even field signals, and the data of the second time domains 47, 47a, to the odd field signals.

However, after t7 having no stereoscopic video, the data of the first time domains 46c, 46d are issued to both even field signals 48d, 48e and odd field signals 49d, 49e.

Thus, by varying the output to the stereoscopic display of signals between the region in which the absence of stereoscopic video is indicted by the stereoscopic video arrangement information and the region not indicated, it is effective to prevent input of videos of different contents into the right eye and left eye of the viewer. Without this function, while observing the right image and left image of the same content of the stereoscopic video, when the contents of the video become different between the first time domain and second time domain in the optical disk, abnormal images are shown, contents of A in the right eye and contents of B in the left eyes, which gives discomfort to the viewer.

Figure 17:
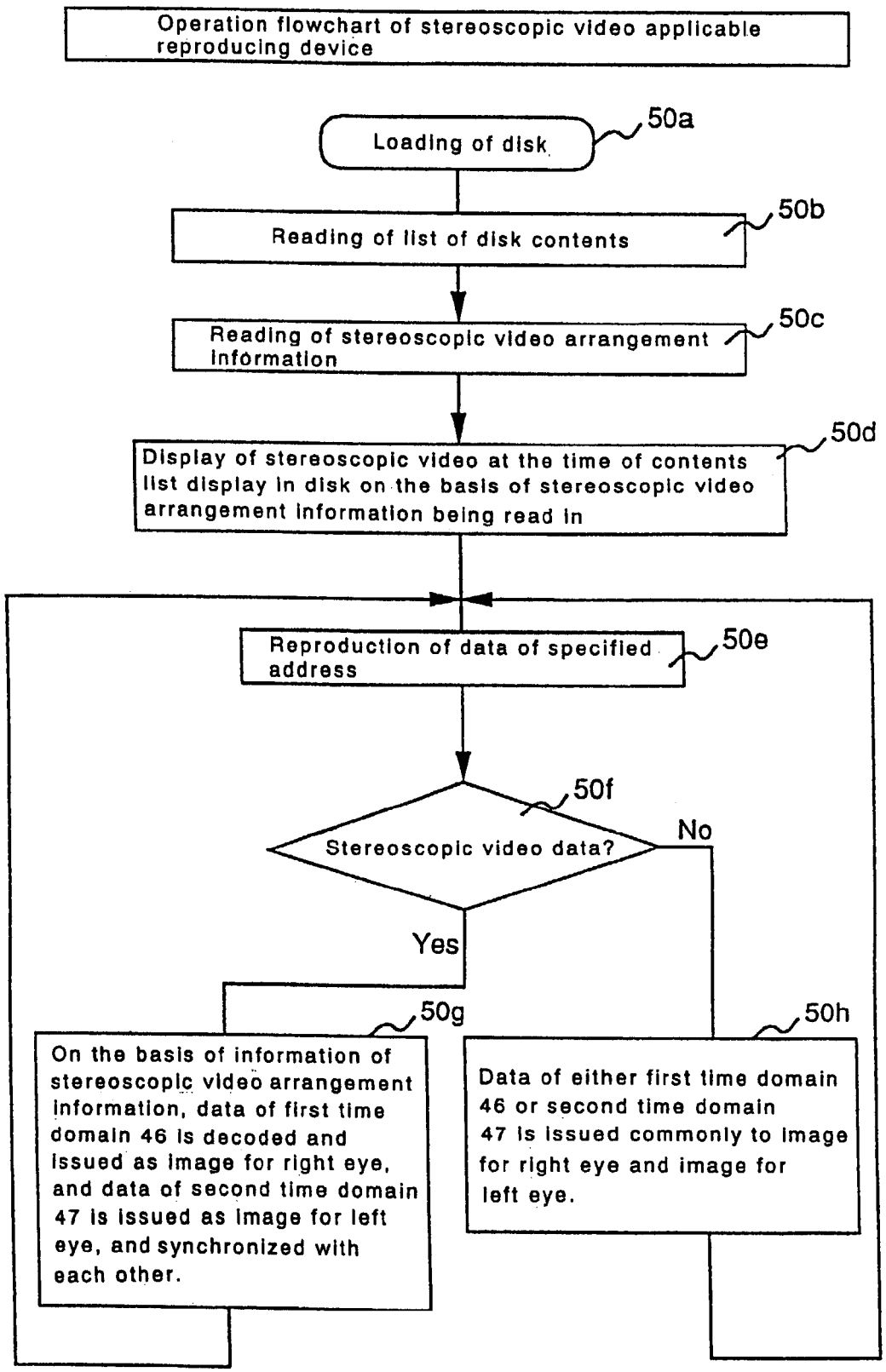
FIG. 17 is a flowchart for changing output depending on whether stereoscopic video is present or not in a stereoscopic video reproducing device in an embodiment of the invention.

This procedure is more specifically described by referring to the flowchart in FIG. 17. At step 50a, an optical disk is loaded, and at step 50b, the file of contents list of the disk is read. Herein, there is no information of stereoscopic video. At step 50c, the stereoscopic video arrangement information is read. At step 50d, on the basis of the stereoscopic arrangement information being read in, when displaying the contents list in the disk, marking of stereoscopic display is shown in each content on the menu screen. In this way, the user can recognize the presence of stereoscopic video. This information, if there is only one in the entire optical disk, may be included in the navigation information in each data unit of DVD.

At step 50e, data of specific address is reproduced, and at step 50f, referring to stereoscopic video arrangement information, it is judged whether the data is stereoscopic video or not. If Yes, at step 50g, from the data of stereoscopic video arrangement information, for example, when the first time domain 46 is R signal and second time domain 47 is L signal, each signal is decoded, the data of the first time domain 46 is issued as the image for the right eye, and the data of the second time domain 47 is issued as the image for the left eye. These images are synchronized. When reproducing the next data, returning to steps 50e, 50f, it is checked whether stereoscopic video or not. If not stereoscopic video, advancing to step 50h, for example, the data of either the first time domain 46 or the second time domain 47 is issued in the same image as the image for the right eye and the image for the left eye. It hence prevents output of images of different contents in the right and left eyes.

In the invention, the reproducing procedure is different between when reproducing ordinary videos of interleaved block system, and when reproducing stereoscopic videos of interleaved block system. Features of the invention are described below.

Figure 14:
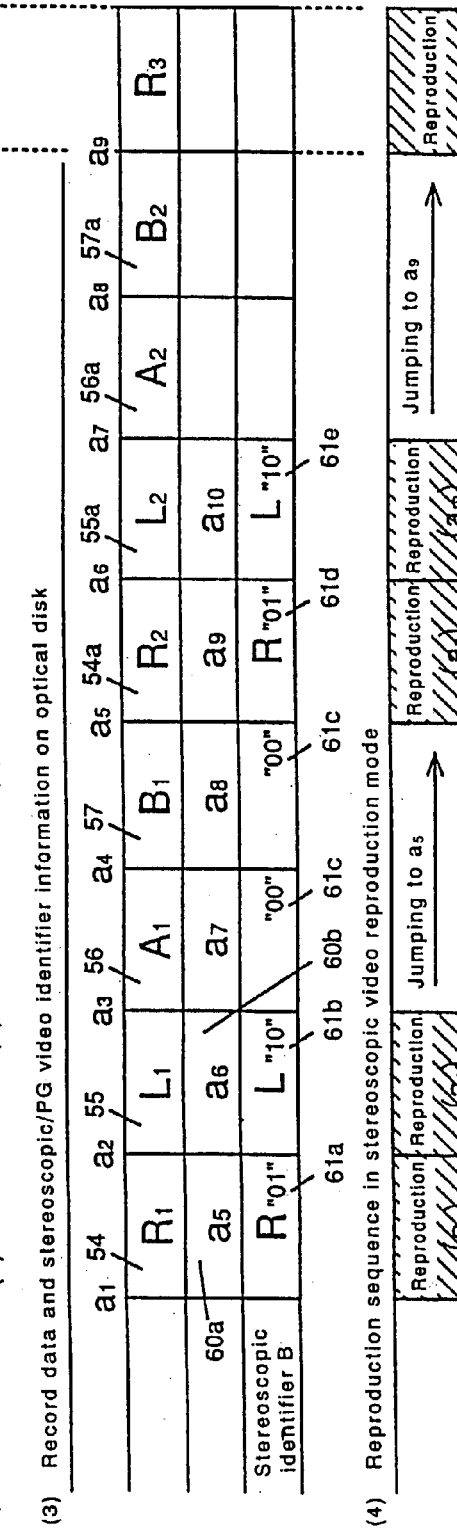
FIG. 14 is a reproduction sequence diagram showing difference in pointer access between ordinary video reproduction mode and stereoscopic video reproduction mode in an embodiment of the invention.

As shown in the recorded data on the optical disk in the time chart (1) in FIG. 14, A1 data and the beginning address a5 of the first interleaved block 56a to be accessed next are recorded in the first interleaved block 56. That is, since the next pointer 60 is recorded, as shown in FIG. 14(2), when reproduction of the first interleaved block 56 is over, only by accessing the address of the pointer 60a, by jumping tracks, a next first interleaved block 56a is accessed in 100 msec, so that A2 data can be reproduced. Similarly, A3 data is reproduced. Thus, contents A3 can be reproduced continuously.

By contrast, in the optical disk recording R and L stereoscopic videos shown in FIG. 14(3), in order to keep compatibility, the same pointer 60 is included so as to make into same format as in FIG. 14(1). Accordingly, the stereoscopic video cannot be reproduced unless the pointer is ignored. From the stereoscopic video logic arrangement table, moreover, the stereoscopic identifier 61 of each cell can be defined. Accordingly, the stereoscopic identifier 61 of the interleaved blocks 54, 55, 56, 57 can be logically defined. This is shown in the diagram. To reproduce R2 and L2 by reproducing R1 and L1 and jumping, the pointer cannot be used directly. More specifically, after completion of reproduction of R interleaved block 54, instead of accessing the address of pointer a5, next L interleaved block 55 is reproduced, and pointer a5 of R interleaved block is accessed by jumping tracks. In this case, pointer 60b of L interleaved block 55 is ignored. When reproducing an interleaved block of which stereoscopic identifier is 1, by changing the access procedure of pointer address from that in ordinary video, it provides an effect of reproducing R and L continuously as shown in FIG. 14(4).

Figure 15:
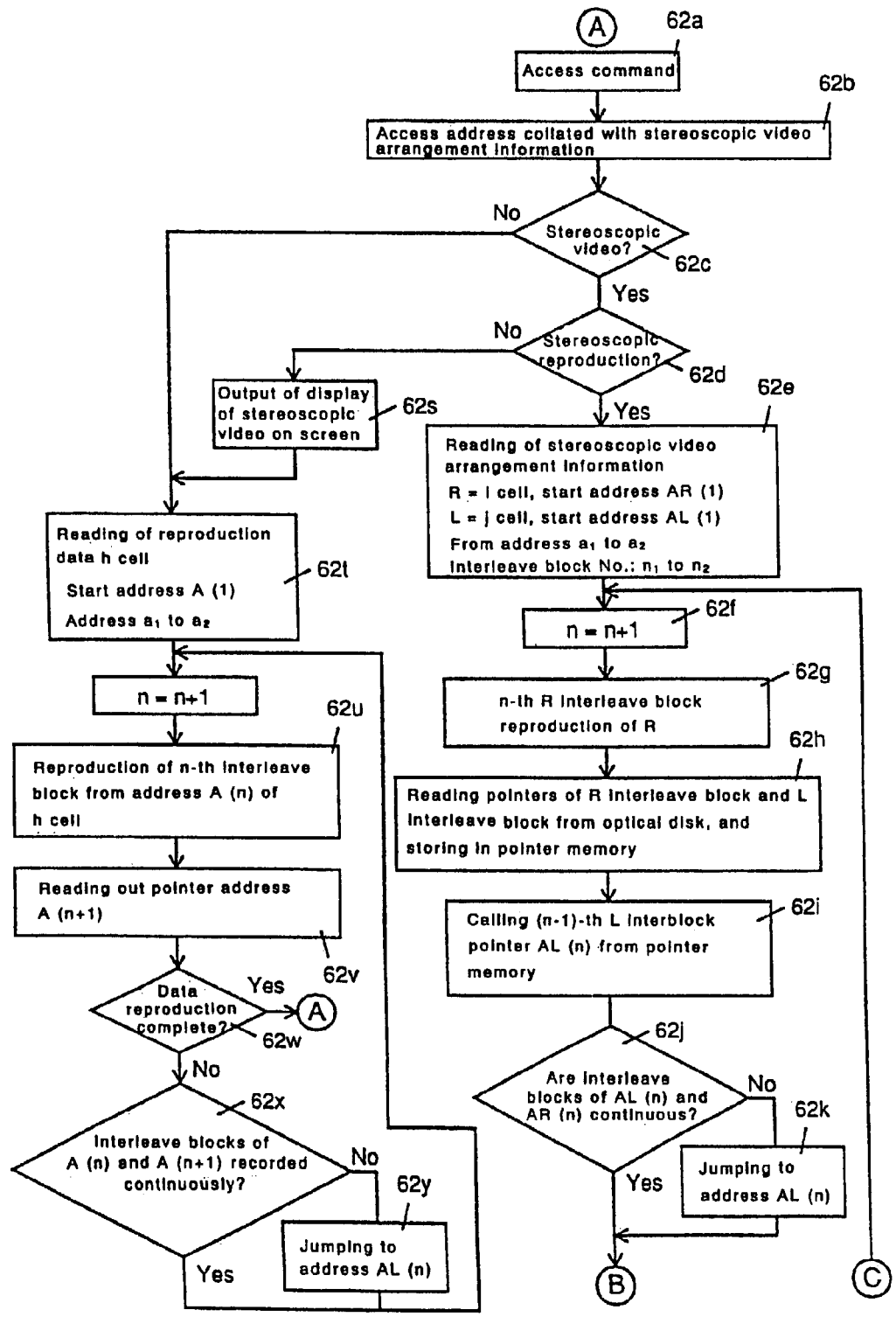
FIG. 15 is a flow chart (1) changing the access procedure of pointers when reproducing and when not reproducing the stereoscopic video signals in the embodiment of the invention.
Figure 16:
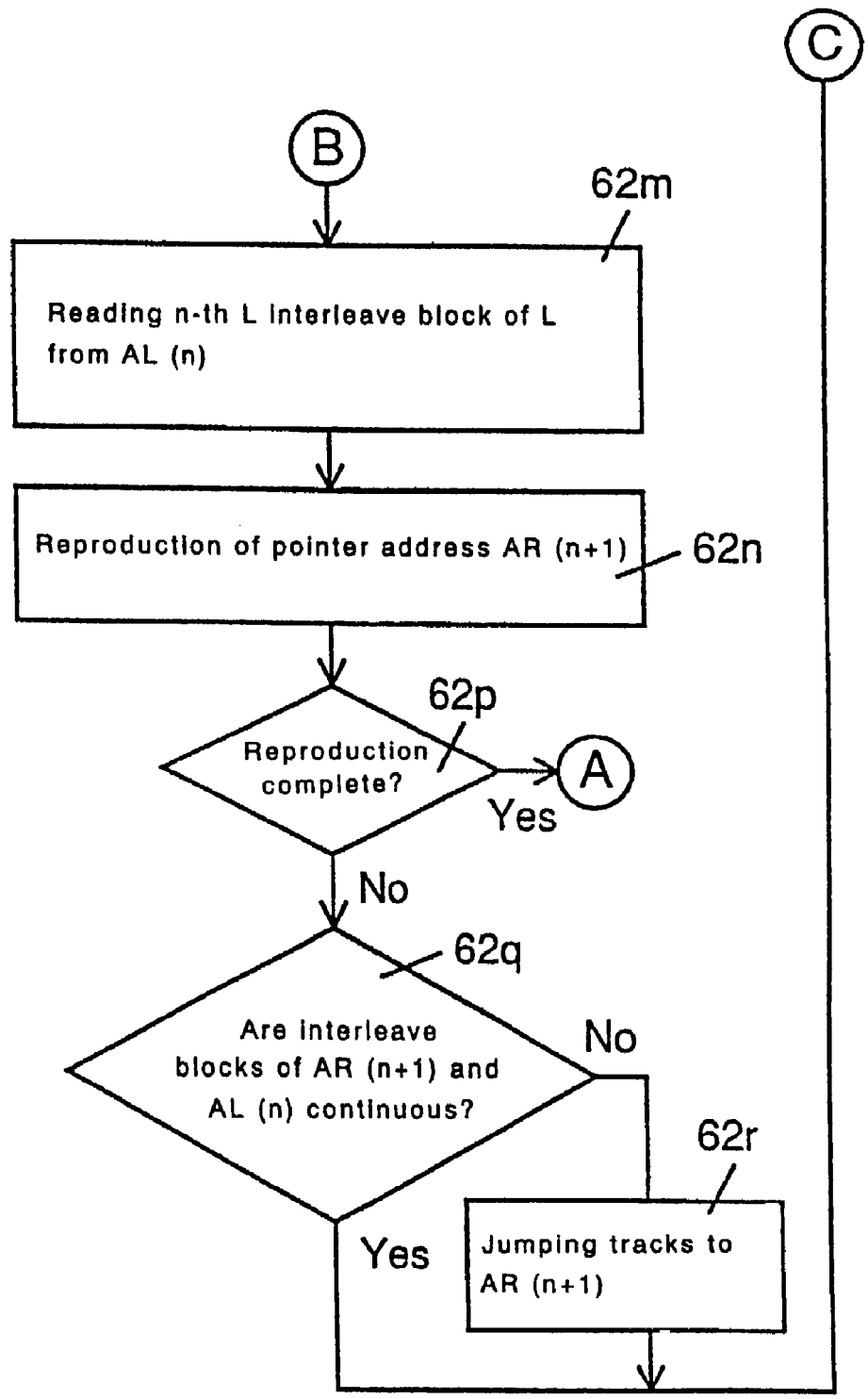
FIG. 16 is a flow chart (2) changing the access procedure of pointers when reproducing and when not reproducing the stereoscopic video signals in the embodiment of the invention.

Referring to the flow chart in FIGS. 15 and 16, the procedure for changing the pointer when accessing the interleaved block is described by using the stereoscopic video identification information.

First, at step 62a, an access command for an address of a specific cell is produced. At step 62b, the address to be accessed is judged to be stereoscopic video or not by referring to the stereoscopic video arrangement information. At step 62c, if not stereoscopic video, skipping to step 62t, one process of ordinary video is carried out. If stereoscopic video at step 62c, advancing to step 62d, it is checked whether or not to reproduce the stereoscopic video of the user or the like, and if No, the display of "stereoscopic video" is shown on the screen, and the process skips to step 62t.

If Yes at step 62d, the stereoscopic video arrangement information is read out at step 62e, and the arrangement of R and L interleaved blocks is calculated from the chapter number, R cell number, L cell number, etc. At step 62g, an n-th R interleaved block is reproduced, and at step 62h, pointers recorded in R interleaved block and L interleaved block are read out, and stored in the pointer memory. At step 62i, the previous, that is, (n−1)-th pointer AL (n) is readout from the pointer memory. At step 62j, it is checked if AL (n) and AR (n) are continuous or not, and if No, the tracks are jumped to address AL (n) at step 62k.

Next, in FIG. 16, at step 62m, an n-th L interleaved block is reproduced, and at step 62n, the pointer address of n+1 is reproduced. At step 62p, it is checked if reproduction of all data is complete or not. At step 62q, it is checked whether the n-th L interleaved block and (n+1)-th R interleaved block are recorded continuously or not, and if not continuous, at step 62r, the tracks are jumped to AR (n+1) to return to step 62f. If Yes, the process returns to step 62f.

At step 62t, if stereoscopic video is not displayed, start address A (1) of h cell is accessed, and the first interleaved block is reproduced, and at next step 62u, the n-th interleaved block of address An (n) is reproduced sequentially. At this time, in each interleaved block, jumping tracks to the next interleaved block, the pointer address A (n+1) for accessing is read out at step 62v, and it is checked whether data reproduction is complete or not at step 62w, and if complete, the process returns to the first step 62a of flowchart A. If not complete, at step 62x, it is checked whether interleaved blocks having start addresses of A (n) and A (n+1) are continuous or not, and if Yes, without jumping, the process returns to the step before step 62u. If No, at step 62y, the tracks are jumped to address A (n+1).

Figure 20:
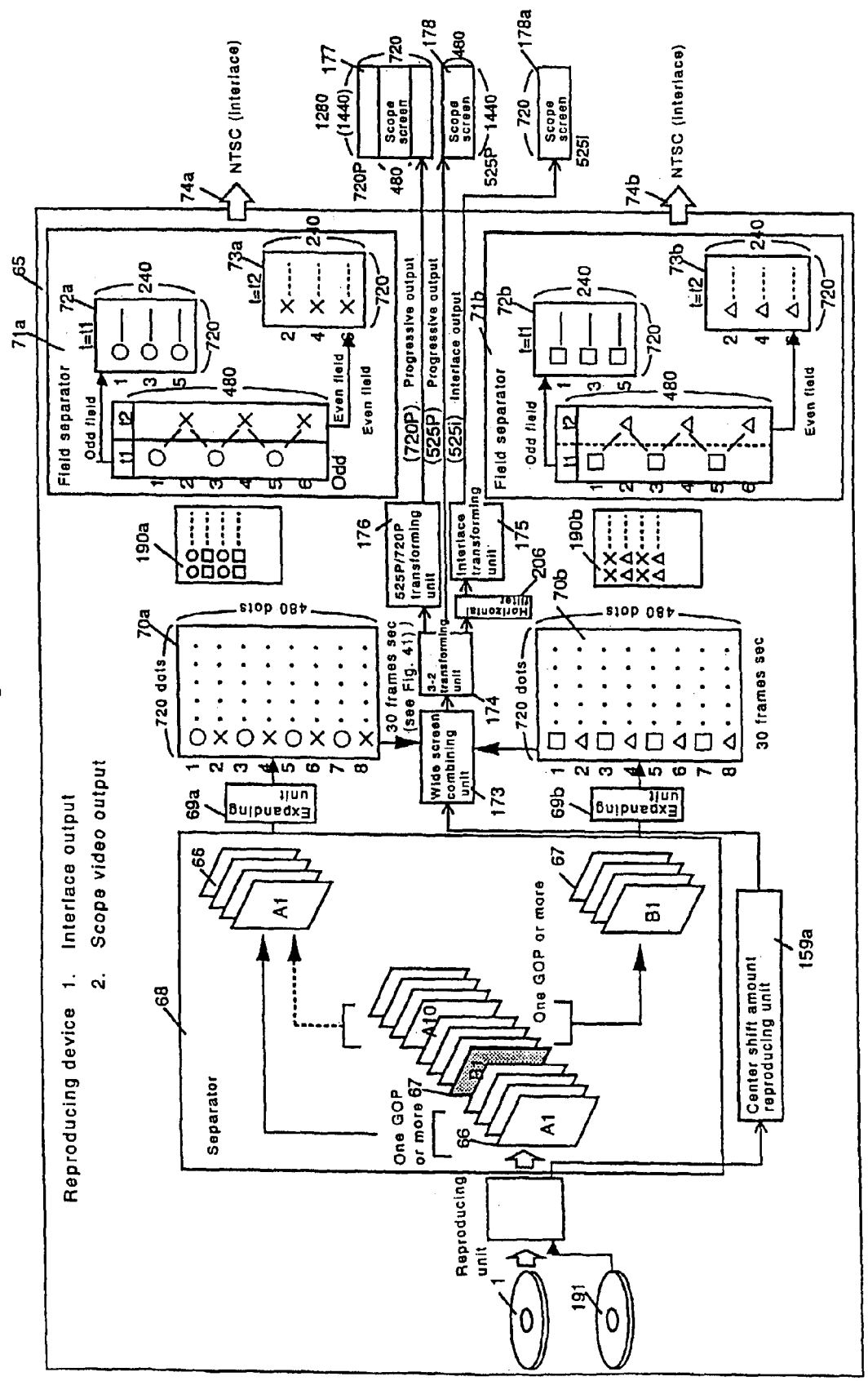
FIG. 20 is a block diagram of interlace video signal output mode of the reproducing device in the embodiment of the invention.

Next, by referring to the block diagram of reproducing device for 720P reproduction of double speed progressive or super-wide screen shown in FIG. 20, the reproduction operation of a reproducing device 65 of the invention is specifically described below. The signal reproduced from the optical disk 1 is separated by a separating unit 68 into a first interleaved block 66 and a second interleaved block 67 composed of frame signals of one GOP or more each. Frame video signals 70a, 70b of 30 seconds expanded by MPEG in an expanding unit 69 are separated into odd field signals 72a, 72b and even field signal 73a, 73b in field separating units 71a, 71b, and interlace signals 74a, 74b of 2ch NTSC are issued. The wide screen in FIG. 20 is described later Referring to FIG. 22, the encoding operation of progressive video signal is described below. At t=t1 and t2, progressive video signals 75a, 75b are entered, and signals of t1 and t2 are combined in a combining unit 76, and a combined signal 77 is obtained. The combined signal 77 is taken out zigzag in the separating unit 78, and odd interlace signals 79a, 79b and even interlace signals 80a, 80b are produced. By combining the odd interlace signals 79a, 79b and even interlace signals 80a, 80b, frame signals 81a, 81b are obtained. Segmenting one GOP or more GOPs which is consist of 10 to 15 frames of compressed signals 83a, 83b compressed in MPEG compressing units 82a, 82b, interleaved blocks 84a, 84b, 84c are produced, and same time stamps are added to the compressed signals separated from the same progressive signal by time stamp providing means, and the signals are recorded on an optical disk 85.

Figure 21:
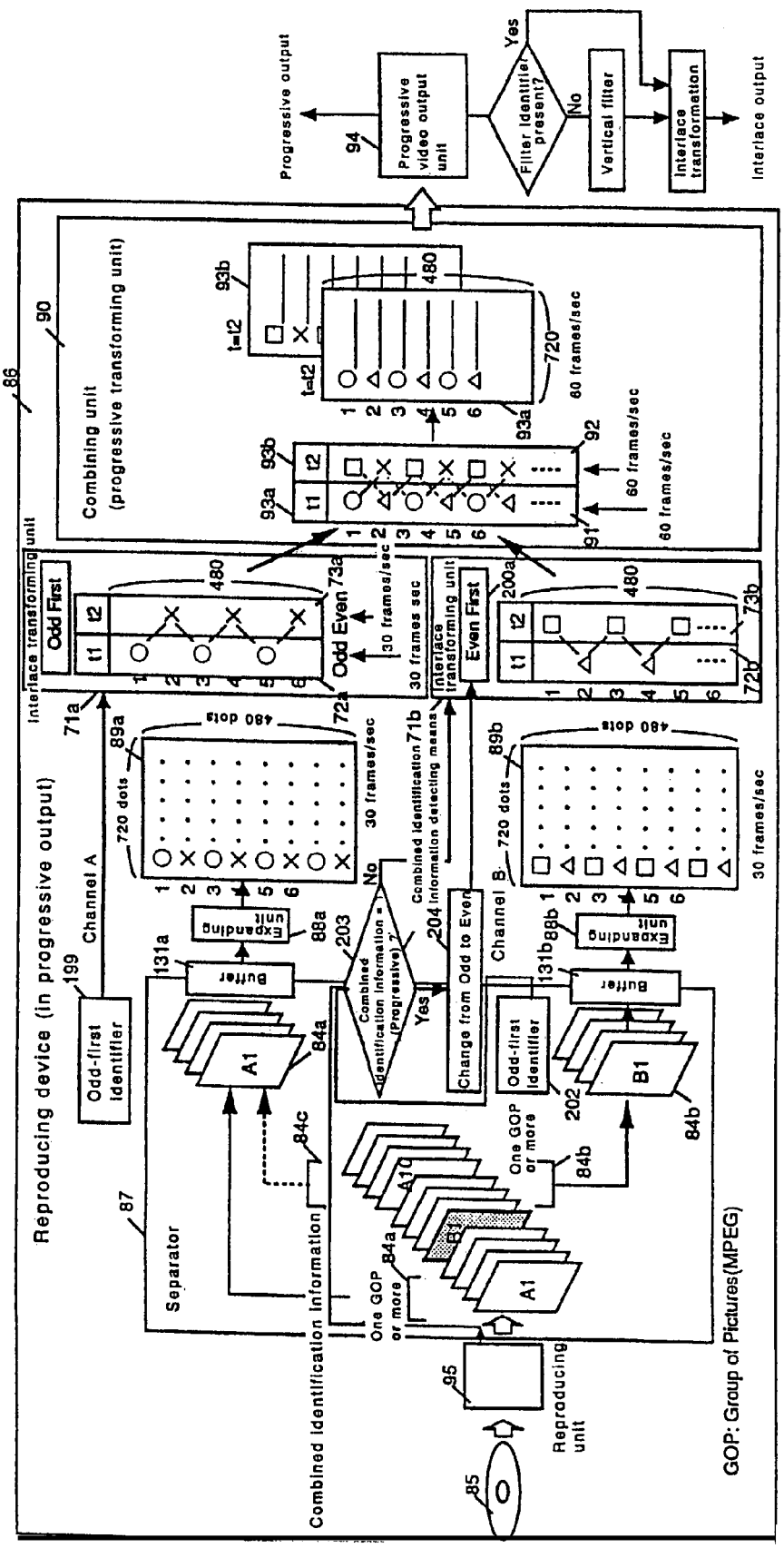
FIG. 21 is a block diagram in output mode of progressive video signal of a reproducing device in an embodiment of the invention.

The optical disk 85 containing the progressive signal is reproduced in a double speed reproducing device 86 in FIG. 21, and reproduced in interleaved block units in a separating unit 87, and separated into two streams of interleaved blocks 84a, 84c, and interleaved block 84b, then expanded into frame signals 89a, 89b of 720×480 pixels in expanding units 88a, 88b. In field separating units 71a, 71b, the signals are separated into odd fields 72a, 72b and even fields 73a, 73b on the time axis. So far, the operation is same as in the reproducing device 65 in FIG. 20.

In FIG. 21, however, odd fields 72a, 72b of channel A 91 and channel B 92 are combined in a combining unit 90. Even fields 73a, 73b are similarly combined. Thus, channel A 91 and channel B 92 are combined zigzag, and progressive signals 93a, 93b of 60 frames/sec are obtained, and delivered from a progressive video output unit 94.

Thus, according to the reproducing device of the invention, progressive signals, that is, 525 signals not interlacing NTSC signals, or 480 signals in this case are obtained. A reproducing unit 95 reproduces at double speed.

In this case, if the conventional optical disk recording movie software is reproduced, a progressive video is obtained.

In FIG. 20, meanwhile, when reproducing the optical disk containing the movie software for single speed reproducing device for reproducing interlace signals, since the movie software is composed of frame signals (progressive signals) of 24 frames per second, 24 frames of progressive signals are obtained in the MPEG decoder. By detecting the movie software by detecting means, or by transforming 24 frames into progressive signals of 60 frames/sec in a 3-2 transforming unit 174 shown in FIG. 20, progressive signals are reproduced. In the case of interlace output, by filtering the progressive signals in a vertical filter unit by referring to the filter identifier, an interlace video free from disturbance is obtained.

Figure 22:
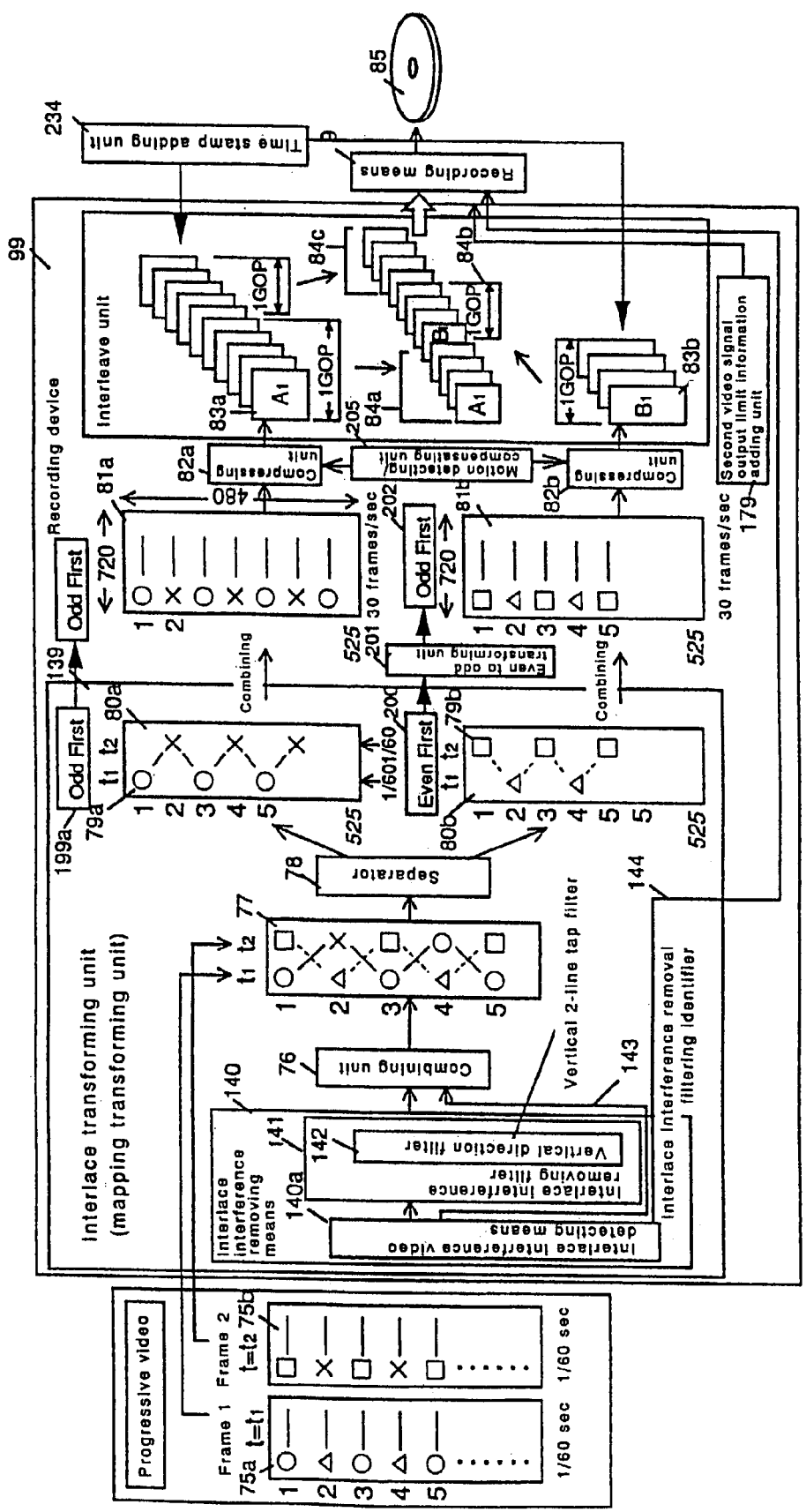
FIG. 22 is a block diagram in input mode of progressive video signal of a recording device in the embodiment of the invention.

Herein, when the optical disk 85 encoded in FIG. 22 is reproduced in the reproducing device 65 applicable to progressive signals in FIG. 20, an interlace signal 74a of channel A is reproduced. A conventional DVD player of interlace type has channel A only out of channel A and channel B. Hence, when the optical disk 85 of the invention is loaded in a conventional DVD player of interlace type, it is known that the interlace signal of channel A is obtained. That is, in the optical disk of the invention, progressive signals are obtained in the reproducing device of the invention, and interlace signals of the same contents are obtained in a conventional reproducing device, and a perfect compatibility is realized.

In this case, by adding an interlace interference removing compressing filter 140 to the MPEG encoder in FIG. 22, although the frequency characteristic is slightly lowered, aliasing distortion between channel A and channel B can be decreased.

Encoding of stereoscopic video is more specifically described below.

Figure 23:
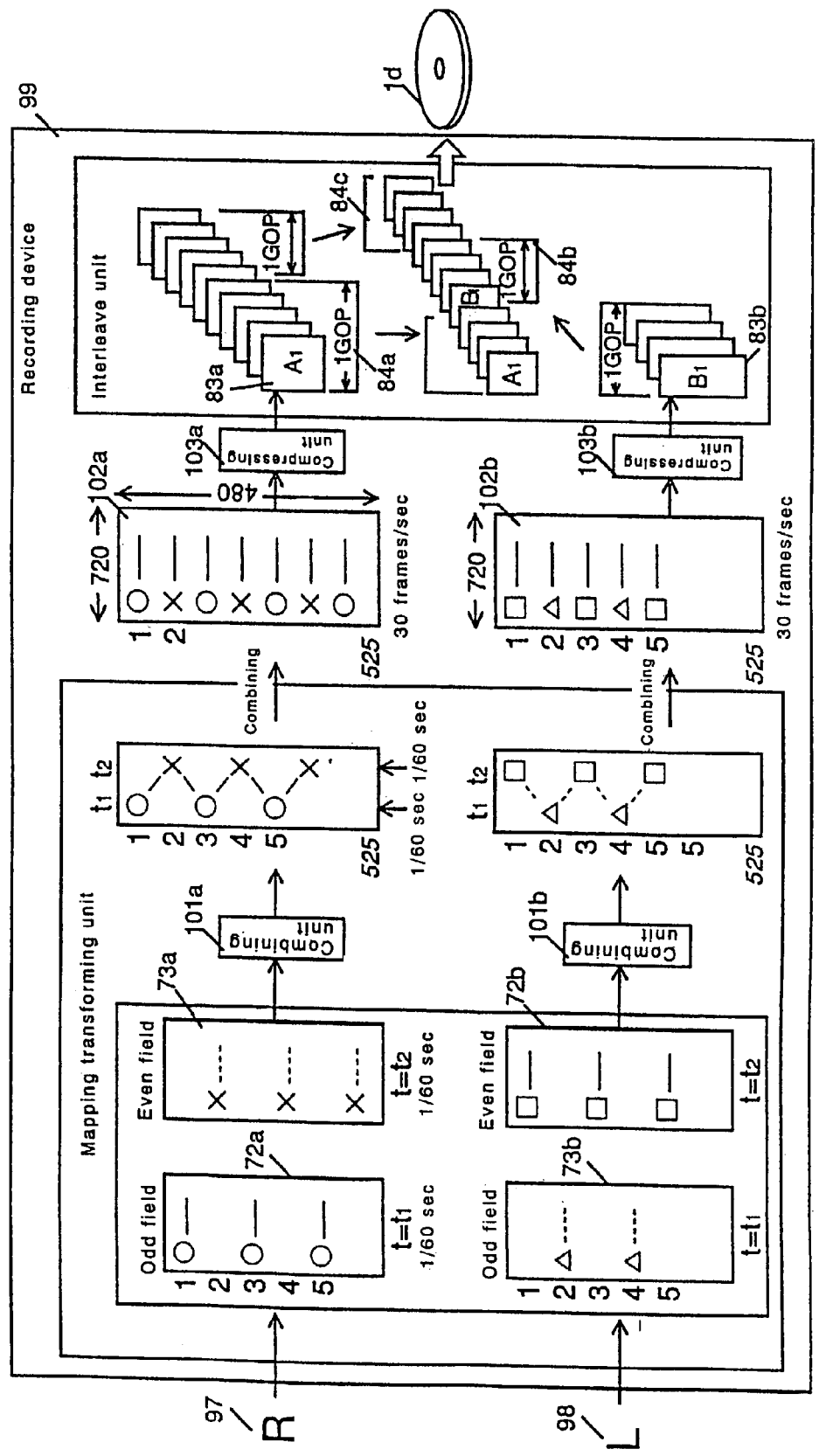
FIG. 23 is a block diagram in input mode of stereoscopic video signal of the recording device in the embodiment of the invention.

As shown in FIG. 23, a right-eye signal 97 and a left-eye signal 98 are entered in a recording device 99. Being of interlace signals, in every ⅟60 second, odd field signals 72a, 72b and even field signals 73a, 73b are entered. The signals are combined in combining units 101a, 101b, and transformed into frame signals 102a, 102b in every ⅟30 second. Compressed signals 83a, 83b compressed in compressing units 103a, 103b are gathered into a set of one GOP or more, and interleaved block 84a, 84b, 84c are produced, and are arranged alternately and recorded on the optical disk 1. When this optical disk 1 is reproduced in the reproducing device of the invention shown in FIG. 24, the stereoscopic/PG video arrangement information reproducing unit 26 in FIG. 5 detects the PG identifier in the disk, and the reproducing device 104 is established in the stereoscopic reproducing mode as shown in the block diagram in FIG. 24. In this case, the stereoscopic video in the optical disk 1d is first separated into channel A and channel B in the separator 68, and expanded in expanding units 88a, 88b, and separated into field signals in field separators 71a, 71b. So far, the operation is same as in FIG. 21.

Figure 24:
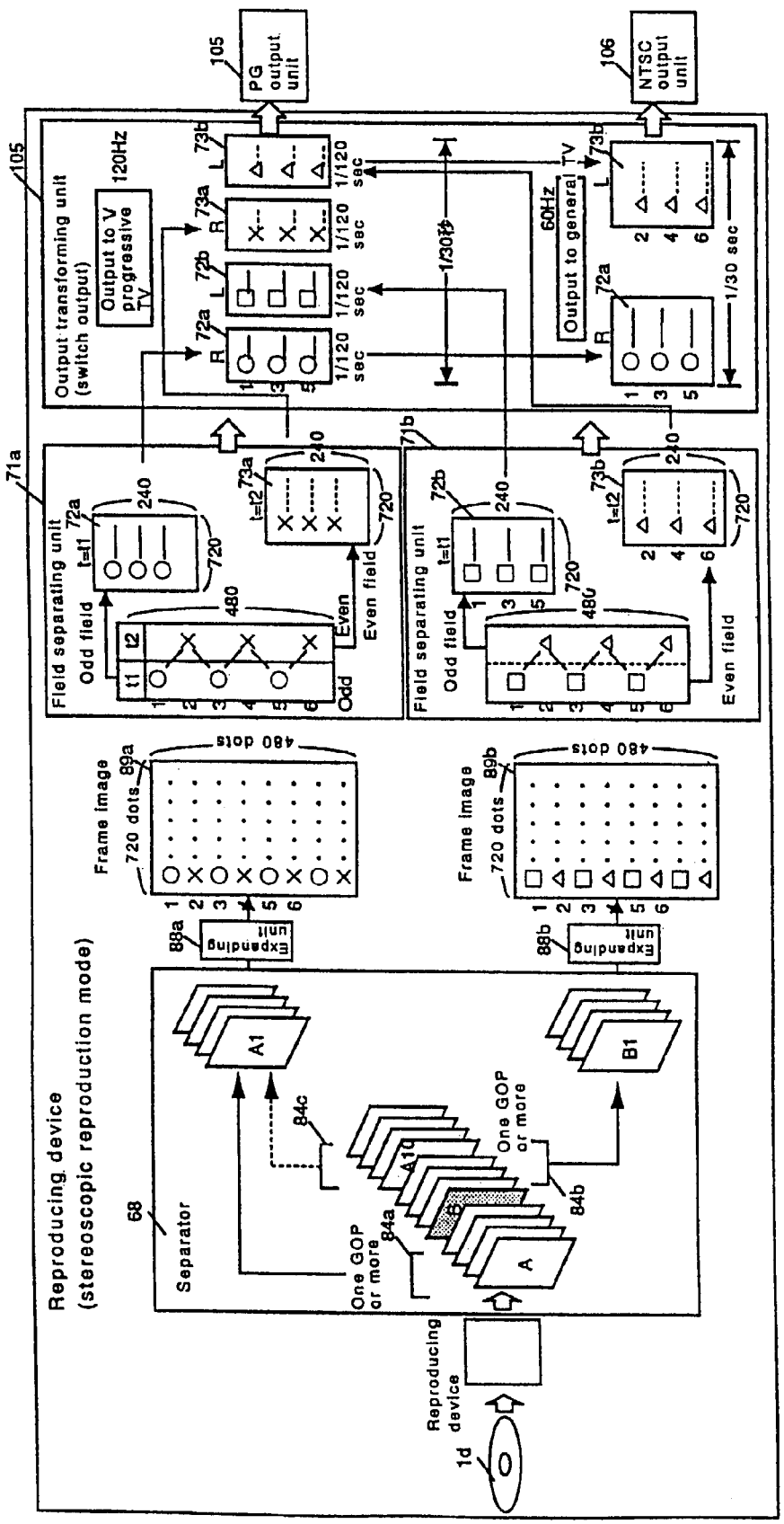
FIG. 24 is a block diagram in reproducing mode of stereoscopic video signal of a reproducing device in an embodiment of the invention.

It is a feature of FIG. 24 that the field separator 71a issues odd field signals and even field signals by changing over the output sequence in an output converting unit. First, for progressive TV, that is, for TV of field frequency of 120 Hz, odd field signal 72a of channel A, odd field signal 72b of channel B, even field signal 73a of channel A and even field signal 73b of channel B are sent out sequentially. As a result, odd fields and even fields are issued sequentially and alternately to the right and left eyes, and thereby by using switch type stereoscopic goggles, a flicker-less video matched in time information is obtained from the progressive output unit 105.

As the output to the general TV, by using the odd field 72a of channel A and even field 73b of channel B out of the above from the NTSC output unit 106, although flicker is present, a stereoscopic video of natural motion is obtained through stereoscopic goggles.

Figure 25:
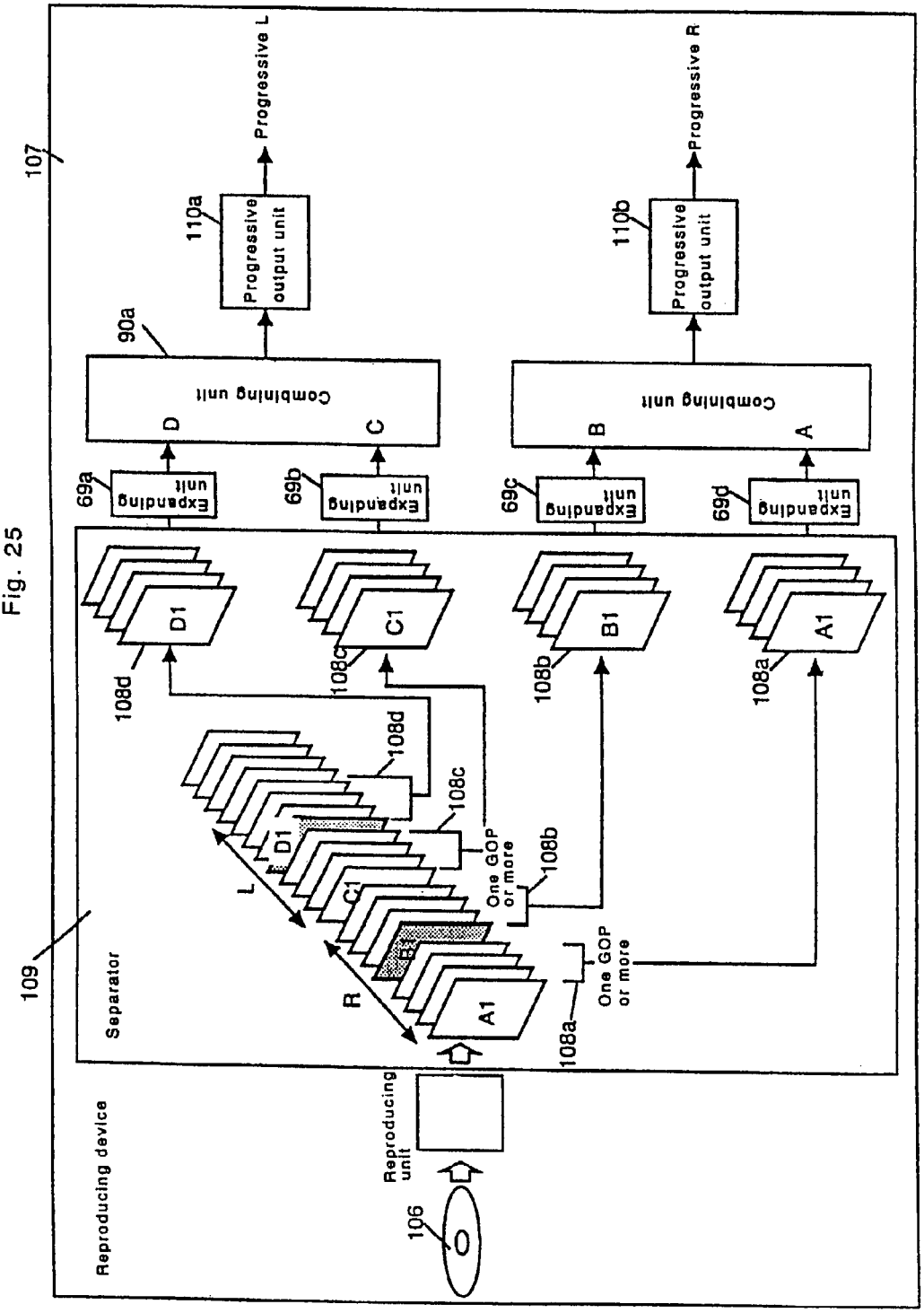
FIG. 25 is a block diagram in reproducing mode of stereoscopic progressive video signal of four-speed reproducing device in the embodiment of the invention.

When the progressive system of the invention and the stereoscopic video reproducing system are combined, stereoscopic videos of high picture quality of right and left progressive images are obtained. This is explained in FIG. 25. This reproducing device 107 reproduces at a four-speed rate, and hence requires a four-speed reproduction capacity. In the DVD, however, it may be 80% of ordinary transfer rate. If, as shown in FIG. 25, when interleaved blocks 108a, 108b, 108c, 108d of right progressive signals A, B and left progressive signals C, D are arranged continuously without gap, the optical pickup can reproduce continuously without jumping tracks. In the case of DVD, since the information is limited to 80%, in continuous reproduction, instead of four speed, 3.2 speed is enough. Such continuous arrangement brings about an effect of reducing the reproducing speed.

Back to the explanation, by a separator 109, the interleaved blocks 108a, 108b, 108c, 108d are separated as mentioned above, and signals of four channels A, B, C, D are reproduced. Video signals expanded in expanding units 69a, 69b, 69c, 69d are combined in combining units 90a, 90b same as in FIG. 21, and two progressive signals are issued from progressive output units 110a, 110b. They are respectively left-eye signal and right-eye signal, and a progressive stereoscopic video is issued from the reproducing device 107. In this case, by using four-speed block MPEG chip, it is possible to process by one chip, and hence the number of parts is not increased. It is also possible to record and reproduce four videos of different contents. In this case, four screens of multi-screen TV can be displayed simultaneously by one disk.

It is also a feature of the invention that the compatibility is guaranteed in all cases. When the disk 106 in FIG. 25 is reproduced in a conventional DVD or other reproducing device, the interlace signal for either the right eye or the left eye is issued. The picture quality is not deteriorated. However, only ¼ of time can be reproduced. By adhering two layers of DVD, the total time is 2 hours and 15 minutes, and it is enough for almost all movies.

In the reproducing device of the invention applicable to double-speed stereoscopic/progressive video, when the user sends a command to the control unit 21 through the channel selection unit 20 from the input unit 19 in FIG. 9, the stereoscopic interlace or one-channel progressive video can be changed over to a desired video. Thus, like the monaural record and stereo record in the past, a complete compatibility is assured.

Accordingly, by the double-speed or four-speed reproducing device of the invention, videos of various picture qualities and projection methods may be obtained.

In the invention, therefore, in the absence of stereoscopic video identifier, it is enough to read the pointer and jump, and in the presence of stereoscopic video identifier, by reading the pointer of one of the interleaved blocks of one step before, and changing the reproducing procedure to access, the stereoscopic video can be recorded without changing the format.

Herein, a method of dividing the screen of scope size movie into two images, and recording and reproducing is described below.

Figure 40:
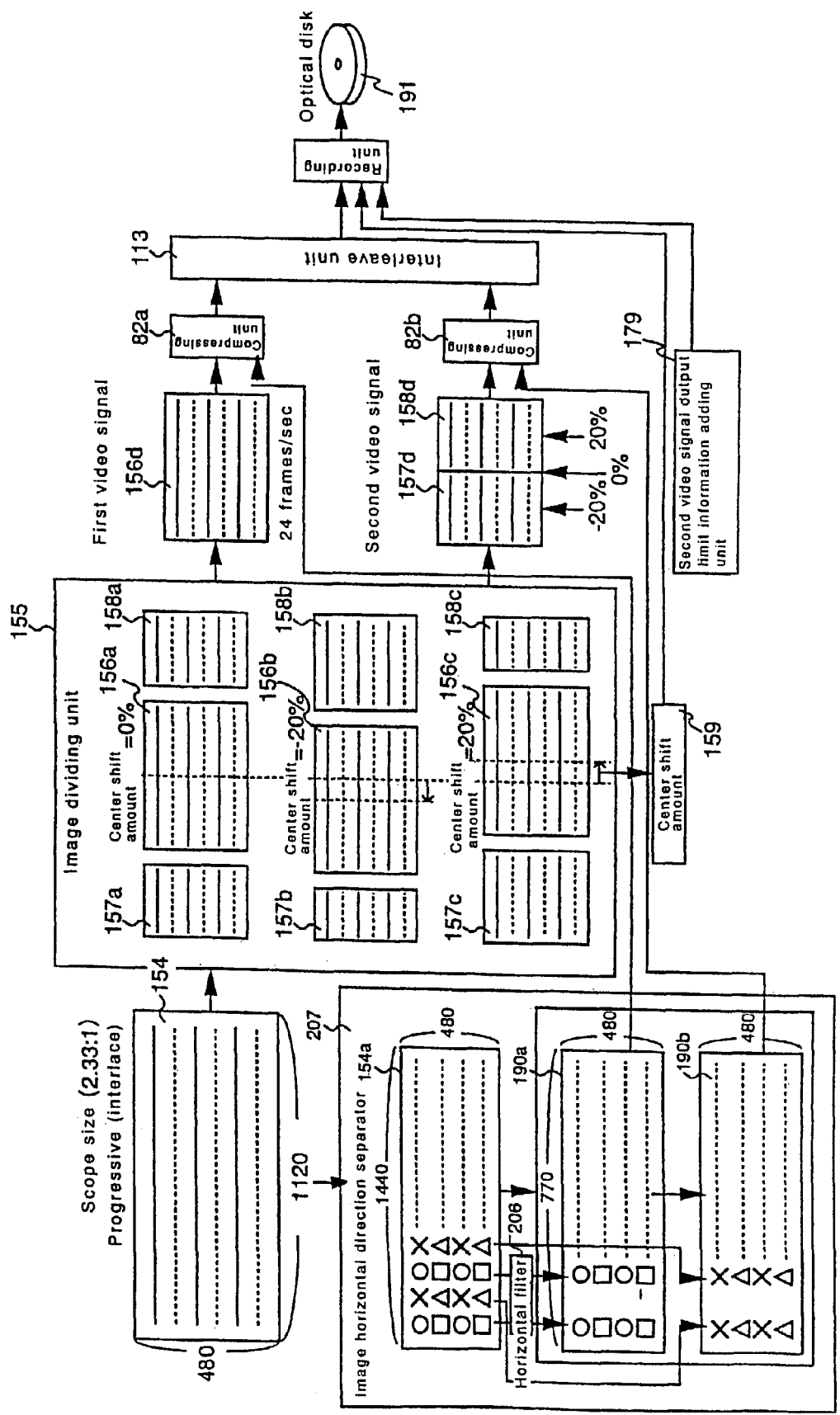
FIG. 40 is a principle diagram for recording interleaved block by separating the scope (wide) video in the horizontal direction in the embodiment of the invention.

In FIG. 20, the method of reproducing the optical disk 1 recording two screens of interlace signals by a double-speed reproducing device of the invention was mentioned. In FIG. 40, by applying this method, a superwide image 154 of scope size (2.35:1) is divided in a screen dividing unit 155 into three screens, that is, a central image 156 and side images 157, 158, and the dividing position is indicated by a center shift quantity 159. The central image 156d is supposed to be a first video signal 156d, and is compressed as a second video signal together with side images 157d, 158d, and interleaved in an interleaved unit 113, and recorded in the optical disk together with the center shift quantity 159. In this case, since the second video signal is a patched-up picture of different qualities, and it is not preferred to be reproduced. Accordingly, by a second video signal limiting information adding unit 179, password protection or other reproduction limiting information is added to the stream of the second video signal in the file control information region of the optical disk. As a result, in the reproducing device, the second video signal is not reproduced independently. Thus the viewer can be protected from viewing the abnormal image of independent output limit division screen of second video signal. In this case, in the progressive applicable player, both first video signal and second video signal are reproduced, and a wide screen can be issued.

Figure 41:
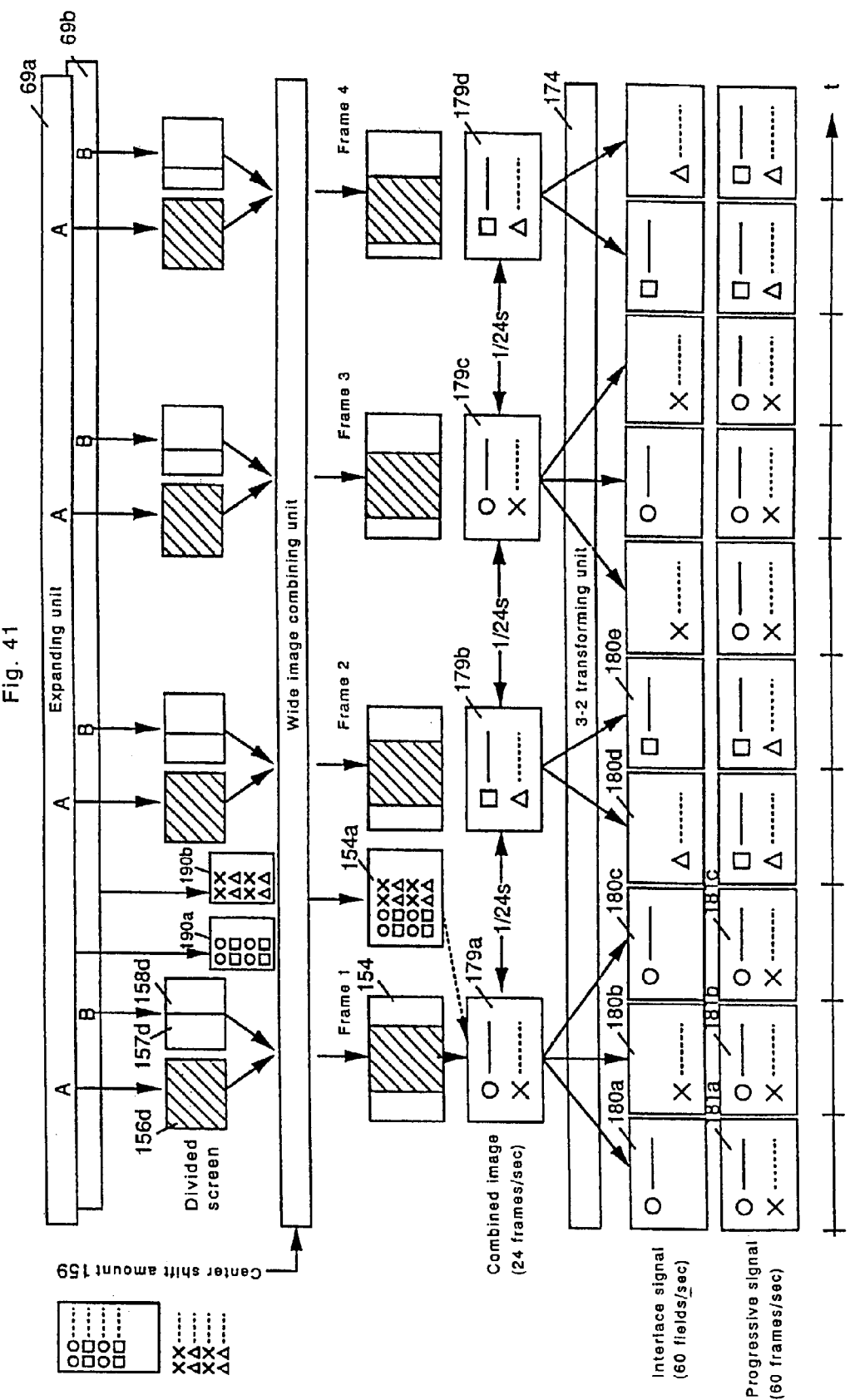
FIG. 41 is a principle diagram of 3-2 transformation by combining scope video from an optical disk in which scope (wide) video is separated and recorded in an embodiment of the invention.

When this disk is reproduced in the reproducing device in FIG. 20, first of all, the second video signal is not issued independently. From the optical disk, the center shift quantity 159 is reproduced from the center shift quantity reproducing unit 159b. By using this shift quantity 159, in a wide screen combining unit 173, the scope image is combined, and it is transformed by 3-2 pull-down in a 3-2 transforming unit 174 as shown in FIG. 41, and 24 frames of the movie are transformed into interlace signals of 60 fields/sec, or progressive signals of 60 frames/sec. As, shown in FIG. 41, expansion and wide screen combination are effected. In the process of 3-2 transformation in the 3-2 transforming unit 174, a combined image 179a of a combined image 179 comprising 24 frames per second is separated into three interlace images 180a, 180b, 180c, and a combined image 179b is separated into two interlace images 180d, 180e. Thus, the image of 24 frames/sec is transformed into an interlace image of 60 fields. In the case of output of progressive image 181, the three progressive images 181a, 181b, 181c and two progressive images 181d, 181e may be issued directly.

Figure 46:
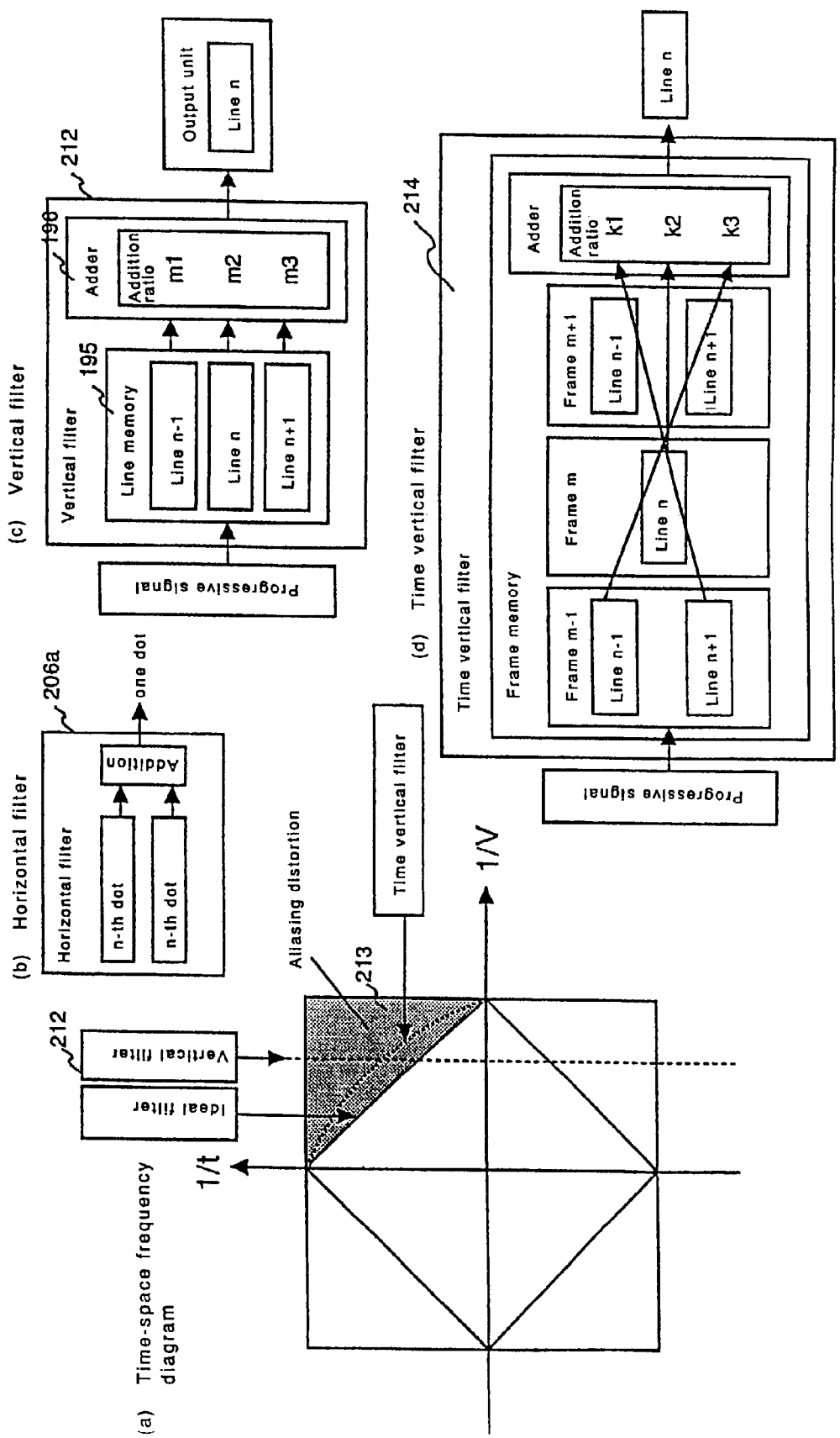
FIG. 46 is a structural diagram of horizontal filter and vertical filter in the embodiment of the invention.

As a second method of separating the screen, as shown in FIG. 40, when a screen 154 of 1440×480 pixels is separated in an image horizontal direction separator 207 to separate two pixels in the horizontal direction into one pixel each, it is separated into two horizontal separate screens 190a, 190b of 720×480 pixels each. By a similar technique, they are compressed as a first video signal and a second video signal, and recorded in an optical disk 191. In this case, aliasing distortion occurs in the horizontal direction, and two pixels are added at a specific addition ratio by a horizontal filter 206 to attenuate the high frequency components in the horizontal direction as shown in the horizontal filter 206 in FIG. 46. This prevents moire at the time of reproduction with 720 dots in the existing reproducing device.

When this optical disk 191 is reproduced in the reproducing device 65 in FIG. 20, the horizontal separate screens 190a, 190b are decoded, and when combined in the wide image combining unit 173, the original screen 154a of 1440×480 pixels is reproduced. In the case of the movie software, for 3-2 transformation, as shown in FIG. 41, the screen 154a is combined to transform by 3-2.

In this second screen horizontal separating method, in both first video signal and second video signal, since an ordinary picture of 720×480 pixels dividing the original 1440×480 pixels into half in the horizontal direction is recorded, if the second video signal is reproduced by mistake in the ordinary reproducing device such as DVD player, since the picture of the same aspect ratio as in the original is delivered, the compatibility is high. Thus, by this separating method, the interlace image is reproduced in an ordinary reproducing device, 525 progressive image in an applicable reproducing device, and a wide image such as 720P scope in a 720P high resolution applicable reproducing device. The movie material can be reproduced at double speed, and hence the effect is high.

Figure 44:
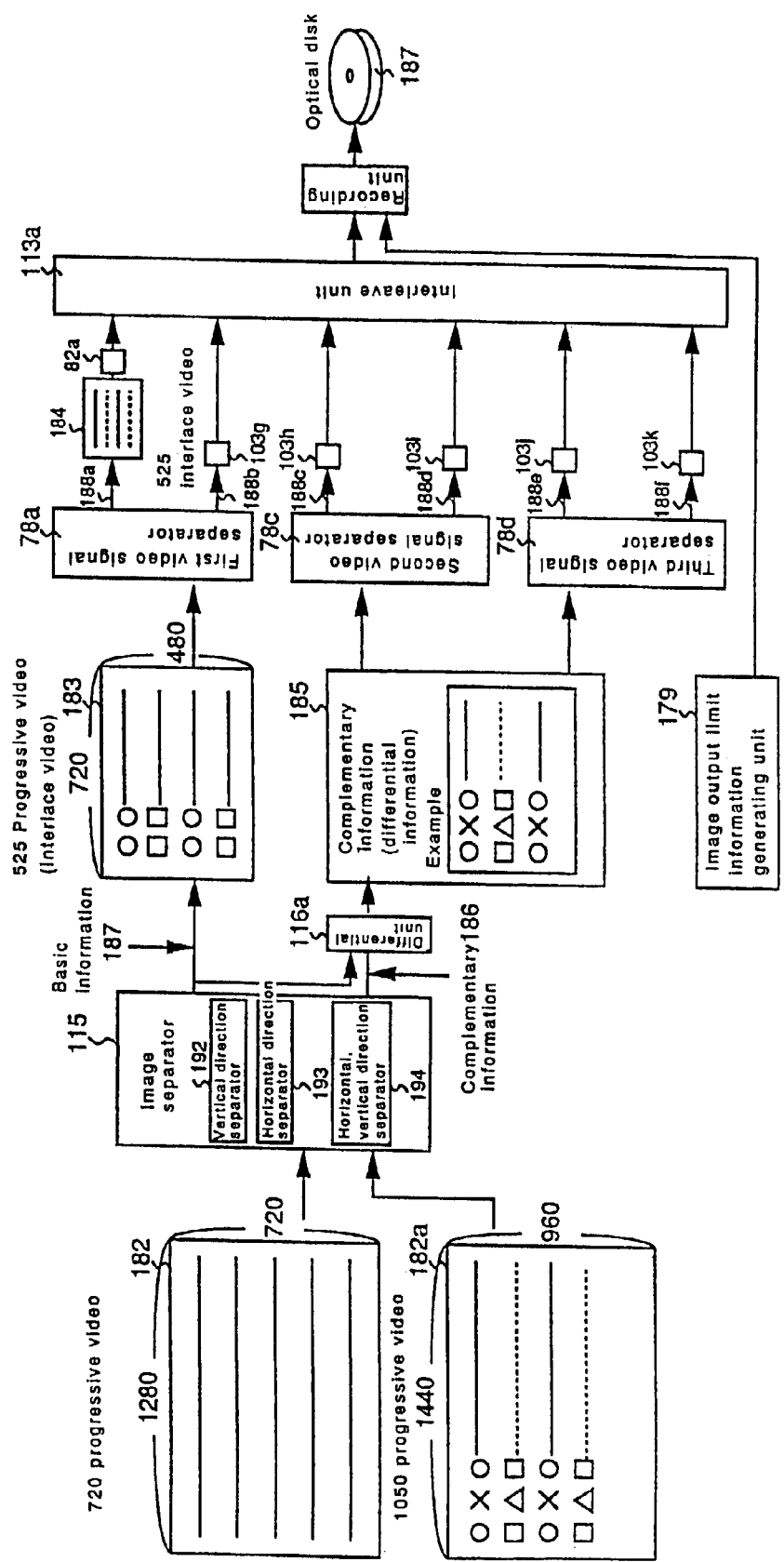
FIG. 44 is a diagram showing a method of separating interpolation information in the horizontal and vertical direction and recording in interleaved blocks in an embodiment of the invention.

Further developing this technique, in FIG. 44, a progressive image 182a of 1440×960 is separated into the horizontal or vertical direction by a horizontal or vertical separator 194 of the image separator 115 by using, for example, sub-band filter or wavelet transform. As a result, a 525 progressive image 183 is obtained. It is separated into 525 interlace signal 184, and recorded in a stream 188a.

On the other hand, the remaining interpolating information 185 is similarly separated into four streams 188c, 188d, 188e, 188f, and recorded in interleaved blocks. The maximum transfer rate of each interleaved block is 8 Mbps in DVD standard, and when the interpolating information is divided into four steams, it is 32 Mbps, and in the case of six angles, 48 Mbps is recorded, so that 720P and 1050P HDTV video scan be recorded. In this case, in the conventional reproducing device, the stream 188a is reproduced, and the interlace video 184 is issued. In the streams 188c, 188d, 188e, 188f, since the output limiting information is recorded in the optical disk 187 by an image processing limiting information generating unit 179, so that the interpolating information 185 of poor picture quality such as differential information will not be issued by mistake. Thus, by separating in both horizontal and vertical directions by the method in FIG. 44, a compatible optical disk applicable to both HDTV and NTSC is realized.

In FIG. 20, the interlace signal is transformed in an interlace transforming unit 175, and issued and a scope screen 178 is obtained. The 525P progressive signal is similarly issued as the scope screen 178. When observing with a monitor of 720P, the 525P signal is transformed into a 720 progressive signal in a 525P/720P transforming unit 176, and a letterbox type 720P screen 177 of 1280×720 or 1440×720 (the image size being 1280×480 or 1440×480) is issued. Since the scope screen (2.35:1) is 1128×480 wide, an image of a closer aspect ratio is obtained. In particular, in the case of movie software, because of 24 frames/sec, the progressive image is at a rate of 4 Mbps. When the scope video is recorded in the system of the invention of dividing into two screens, the rate is 8 Mbps, and since the recording time is about 2 hours on two-layer disk of DVD, so that a scope video of 720P or a progressive video of high picture quality of 525P can be recorded in one disk. In the conventional TV, too, the interlace output signal is displayed. It is hence effective to issue the scope screen (2.33:1) of movie at 525P or 720P.

Figure 51:
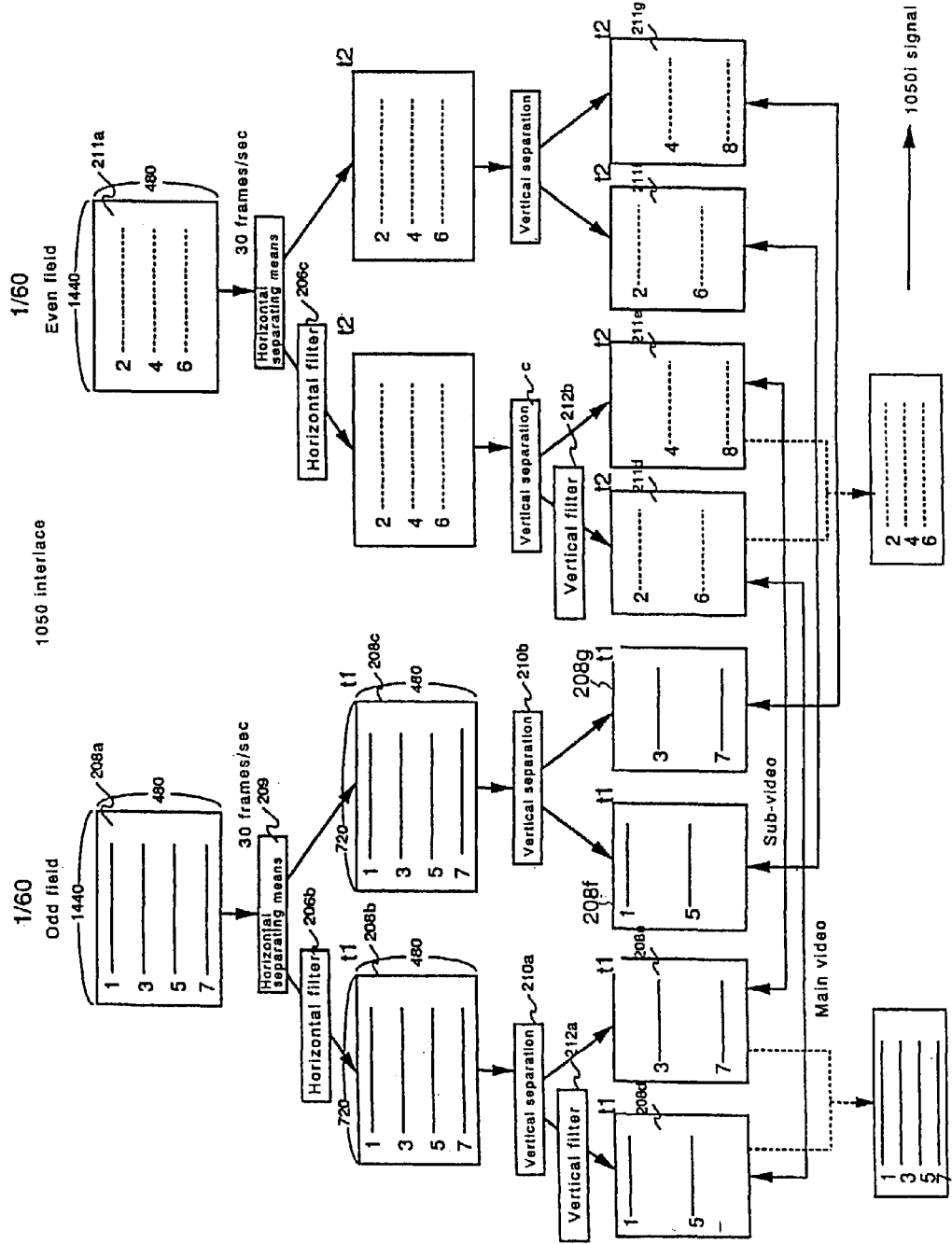
FIG. 51 is a diagram showing a principle of divided recording of 1050 interlace signal in an embodiment of the invention.

Herein, referring to FIG. 51, a method of recording and reproducing 1050 interlace signals is specifically described below. An even field 208a of 1050 interlace signals is separated into two images 208b, 208c by horizontal separating means 209, and separated into images 208d, 208e by vertical separating means 210a, 210b, and images 208f, 208g are similarly obtained. An odd field signal 211a is similarly separated, and images 211d, e, f, g are obtained. In this case, the image 208d and image 211d are main signals, and the DVD interlace video is obtained in a conventional reproducing device. To prevent interlace interference, horizontal filters 206b, 206c, and vertical filters 212a, 212b are inserted, so that aliasing distortion of reproduced image is decreased.

Figure 27:
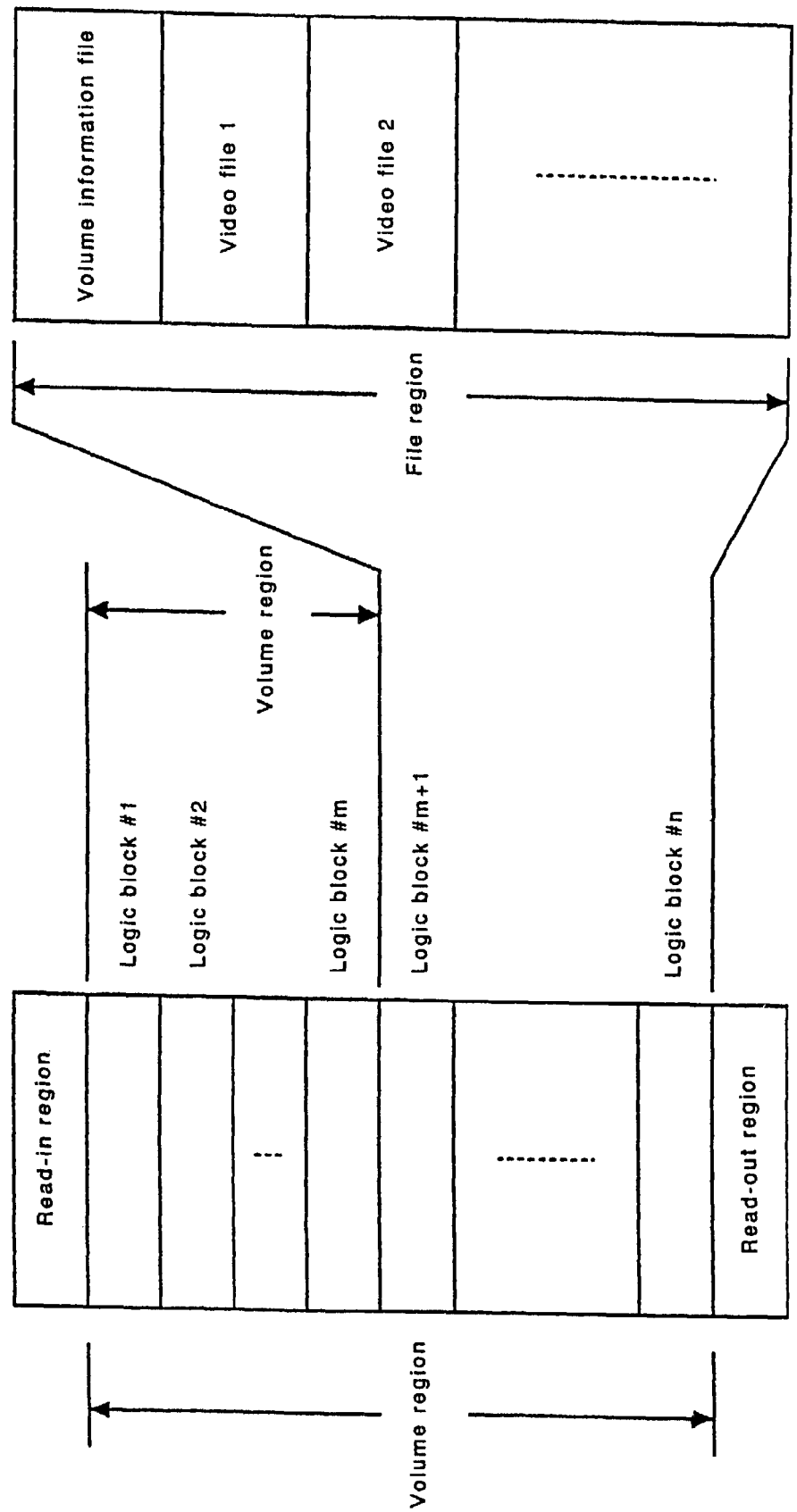
FIG. 27 is a diagram showing an entire data structure of optical disk in an embodiment of the invention.
Figure 28:
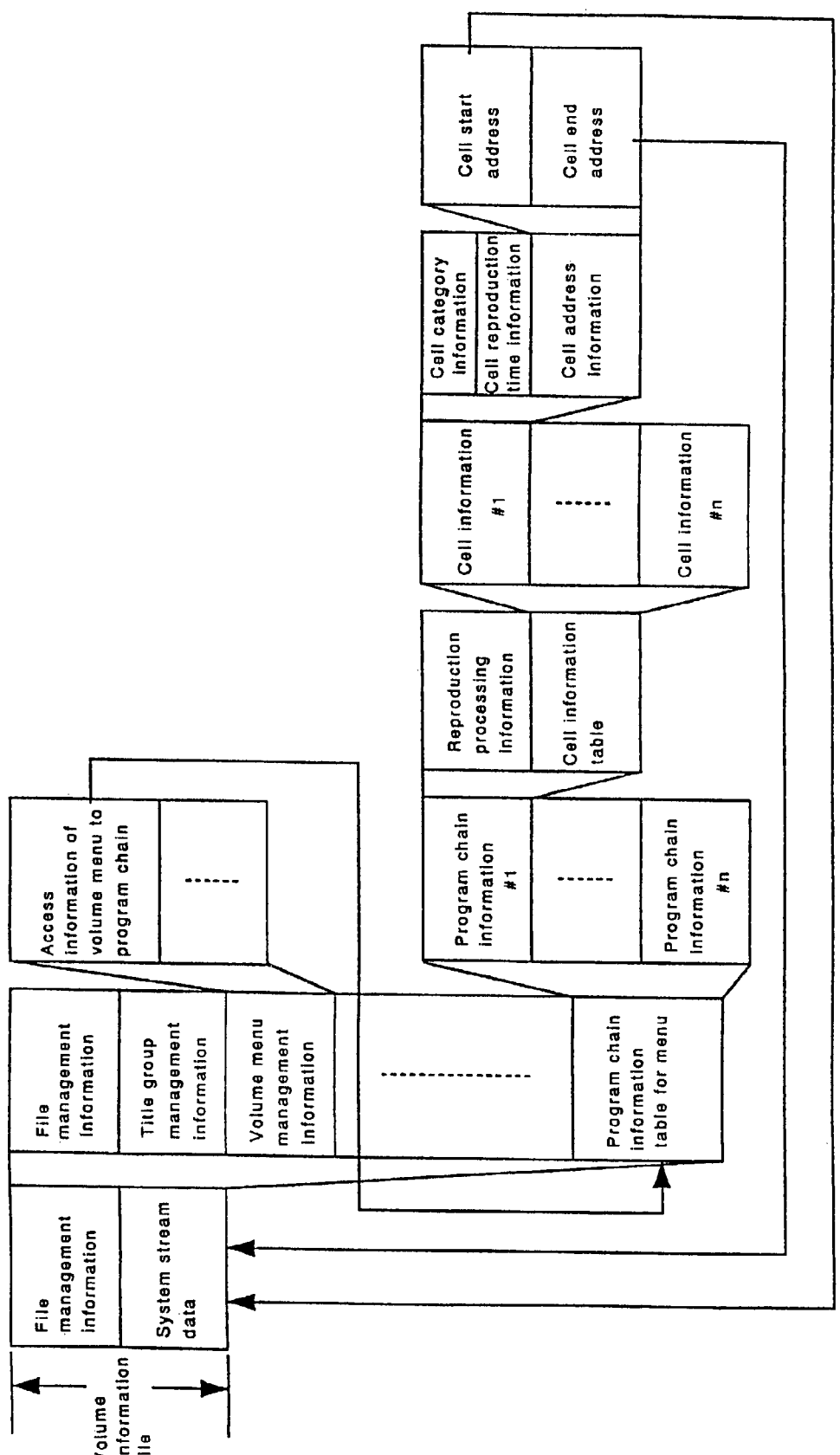
FIG. 28 is a diagram showing an internal structure of volume information file in FIG. 27 in the embodiment of the invention.
Figure 42:
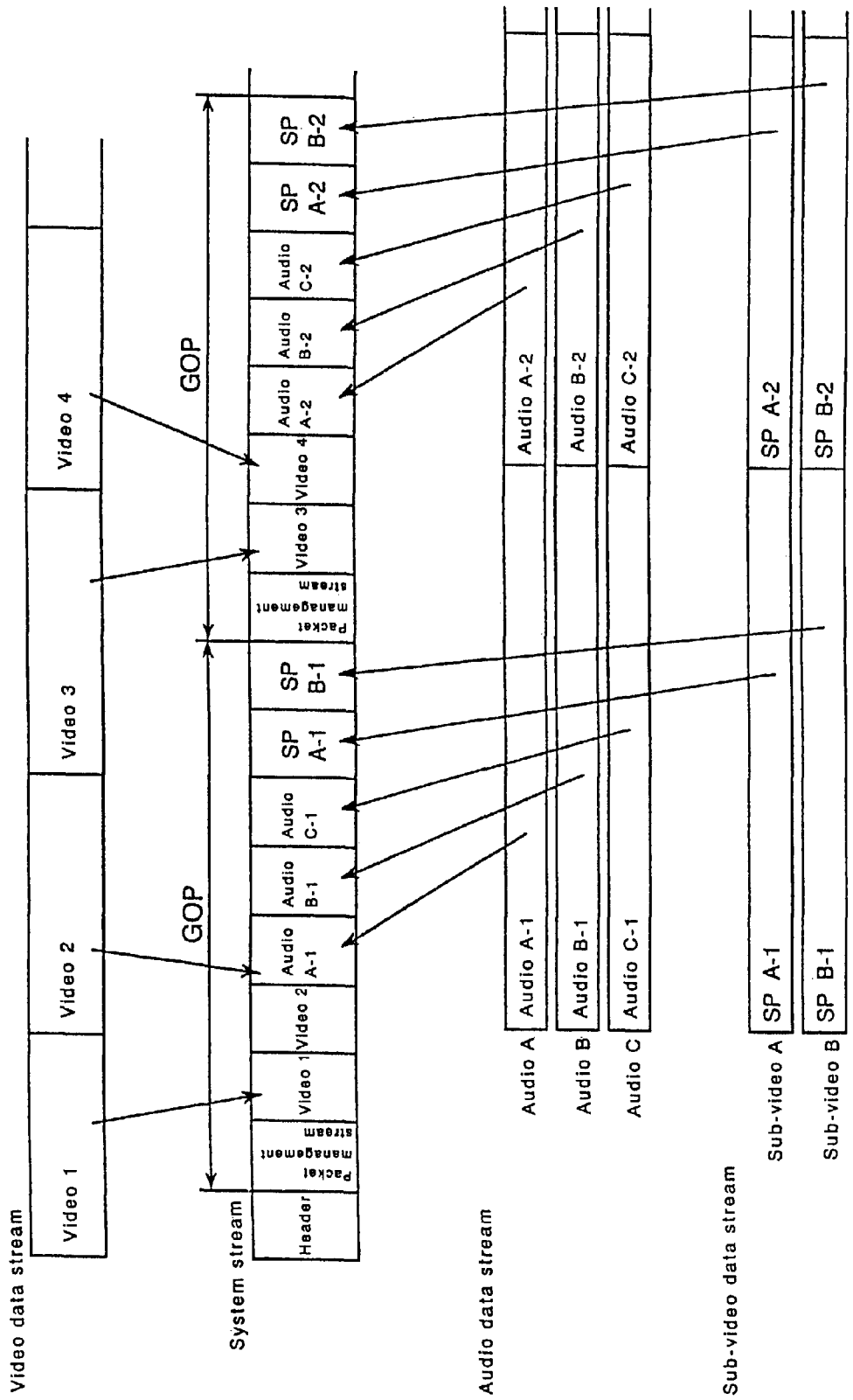
FIG. 42 is a composition diagram of system stream and video data of an optical disk in the embodiment of the invention.

Referring to FIG. 27, FIG. 28, FIG. 42, and FIG. 49, the file structure and video identifier are described. FIG. 27 shows the DVD logic format. Video files are recorded in logic blocks. As shown in FIG. 28, the minimum unit in the system stream is called a cell, in which, as shown in FIG. 42, video data and audio data in one GOP unit, and sub-picture are recorded in a packet.

The provider defined stream in a packet 217 in a cell 216 (see FIG. 49) of main signal of the first stream has a capacity of 2048 bytes. It includes recording of a progressive identifier 218 showing whether progressive or interlace, a resolution identifier 219 showing whether the resolution is 525, 720 or 1050, a differential identifier 220 showing whether the interpolating signal is a differential signal from the main signal, a filter identifier 144 described below, and a sub-stream number information 221 showing the stream number of a first sub-stream.

Figure 52:
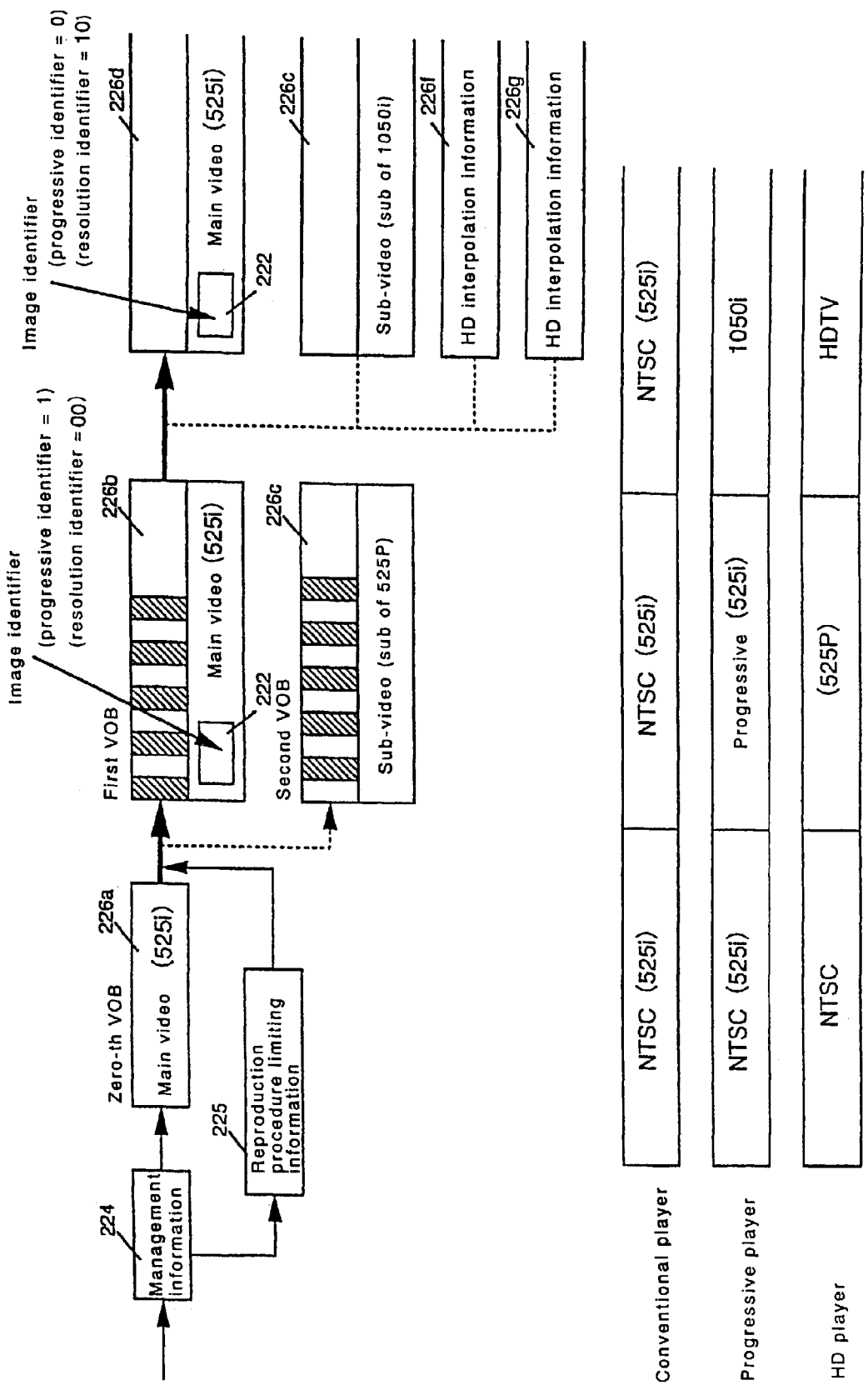
FIG. 52 is a signal arrangement diagram for issuing progressive signal, NTSC signal, HDTV signal in the embodiment of the invention, FIG.

By reference to FIG. 52, the procedure of reproducing by a video identifier 222 is described below.

From the optical disk, first, reproducing procedure control information 225 is read out from management information 224. Since the limiting information of VOB (Video Object) is included herein, in the existing reproducing device, it is connected only from No. 0 VOB 226a to No. 1 VOB 226b in which the main video is recorded. Since No. 0 VOB 226a is not connected to No. 2 VOB 226c in which the interpolating signal of differential information or the like is recorded, video of poor picture quality will not be reproduced from the conventional reproducing apparatus such as the differential information as mentioned above. A video identifier is recorded in each VOB of the main signal, and since No. 1 VOB 226b and No. 2 VOB 226c are progressive identifier=1, resolution identifier=00 (525 signals), 525 progressive signals are reproduced from the progressive player or HD player.

Since the video identifier 222 of the next VOB 226d is the progressive identifier=0 and resolution identifier 219=10, there are 1050 interlace signals, and it is known that three VOBs, VOB 226e, VOB 226f, VOB 226g, are interpolating information. Thus, in the conventional players, 1050 interlace signals with 720 horizontal pixels are issued by the NTSC progressive player, and 1050c full standard HDTV signals are issued by HD player. Thus, by the video identifier 222, various video signals can be recorded and reproduced in interleave. The video identifier 222 may be also recorded in the management information 224.

Figure 53:
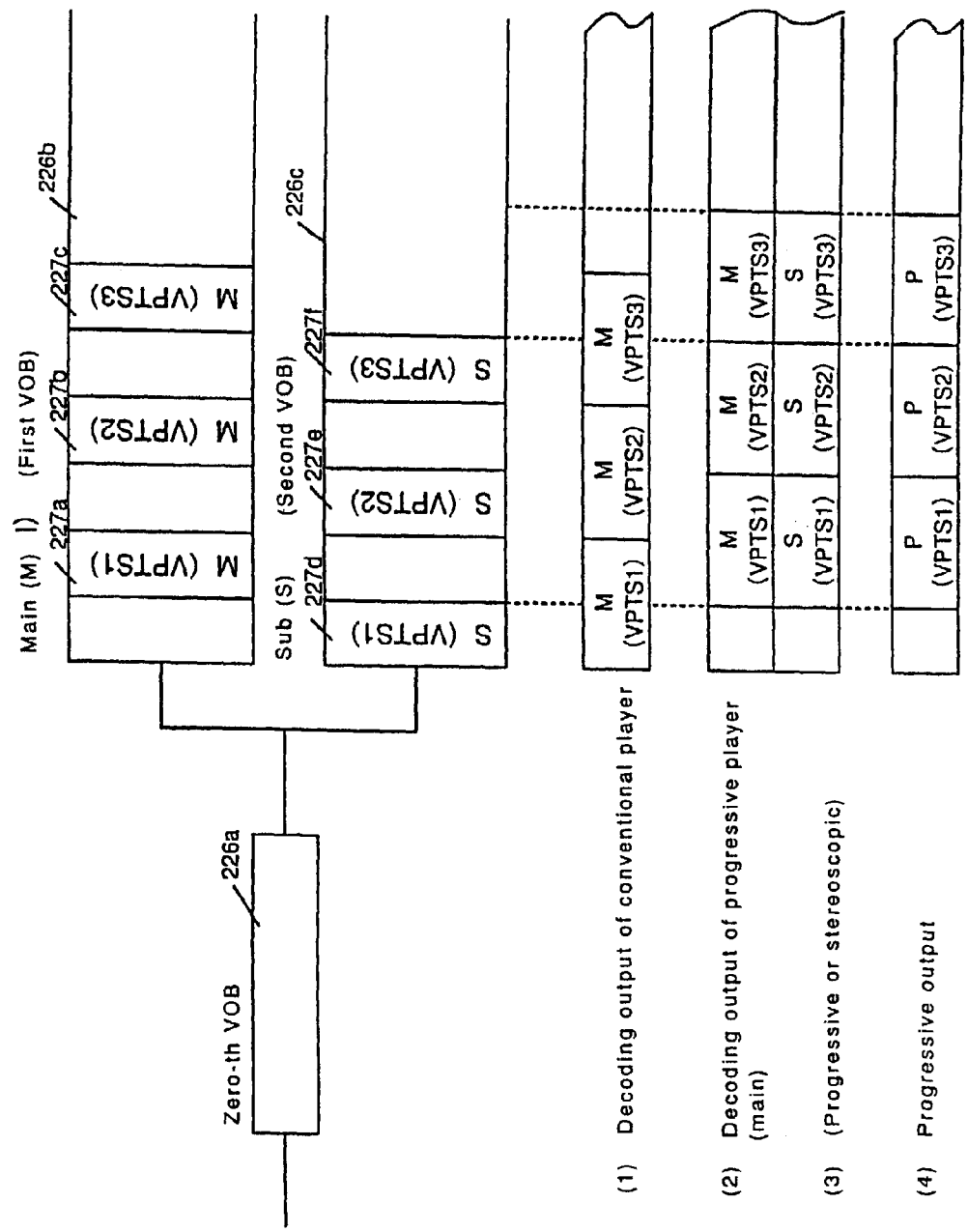

Herein, referring to FIG. 53, VPTS (video presentation time stamp) of sub-track by each interleaved block, that is, the time relation in decoding output is described. In No. 1 VOB 226b, interleaved blocks 227a, 227b, 227c of main signal are recorded together with VPTS1, 2, 3 of VPTS. In No. 2 VOB 226c, interleaved blocks 227d, 227e, 227f are recorded together with VPTS1, 2, 3. The conventional player reproduces the interleaved blocks 227a, 227b, 227c at single speed. Since sound is also included in the main signal, the sound is also reproduced. On the other hand, in the progressive applicable player, the interleaved block 227d of No. 2 VOB 227c as sub-signal is reproduced, and stored once in the buffer memory. When stored completely, the interleaved block 227a of No. 1 VOB 226b of the main signal is reproduced, and the AV synchronism is achieved by this synchronous information. Since the sound is also recorded in the main signal, the output of the main signal and sub-signal as shown in FIGS. 53(2), (3) is synchronized with sound. In this case, tracks are jumped between the interleaved block 227a and interleaved block 227e. Thus, the progressive signal in FIG. 53(4) is issued. In this way, at the reproducing device side, by checking the same VPTS of each interleaved block, the main signal and sub-signal are decoded synchronously and combined, so that a normal progressive signal is maintained.

Figure 54:
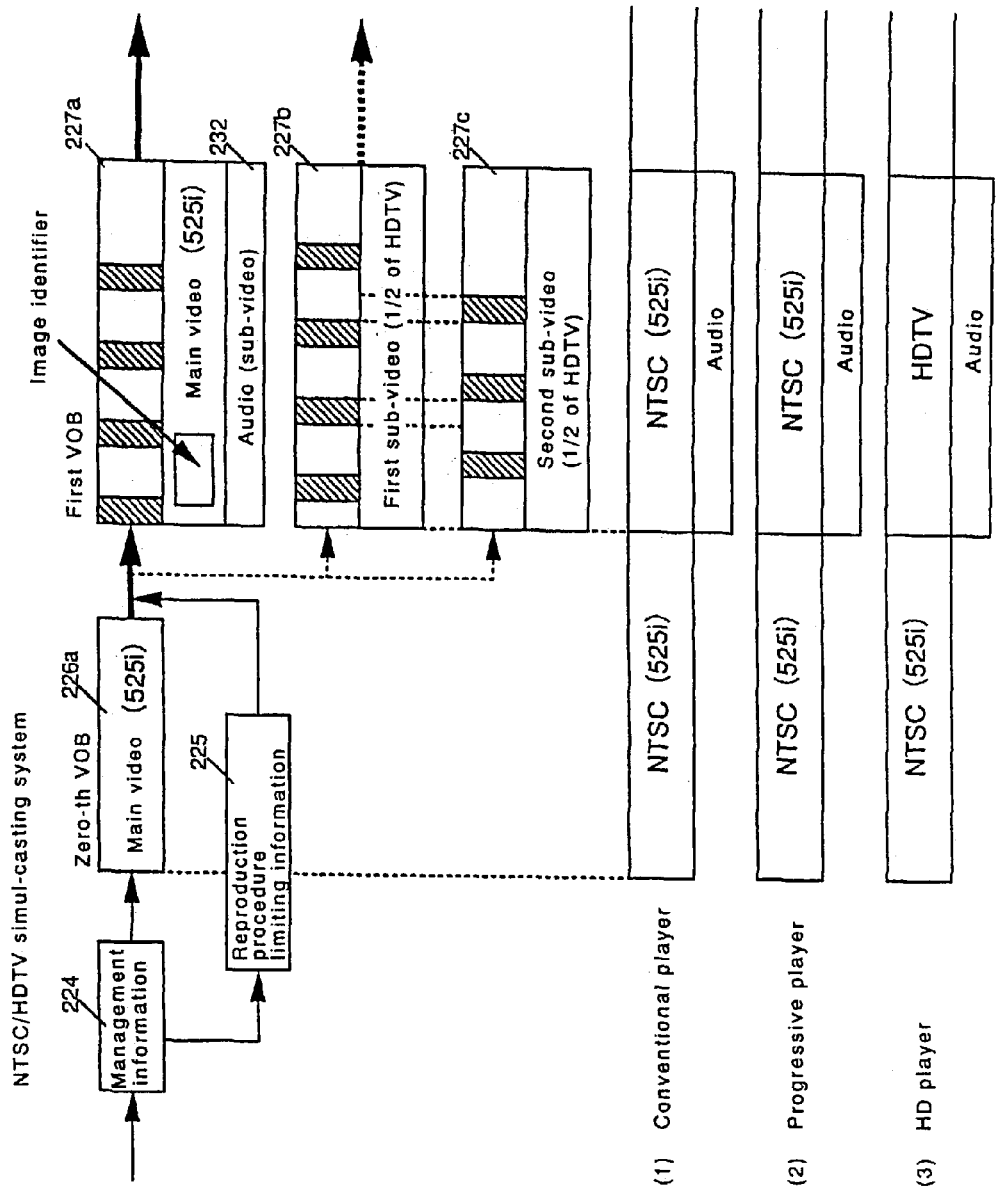
FIG. 54 is an arrangement diagram of HDTV sub signal and NTSC signal of simultaneous broadcasting system in the embodiment of the invention.
Figure 55:
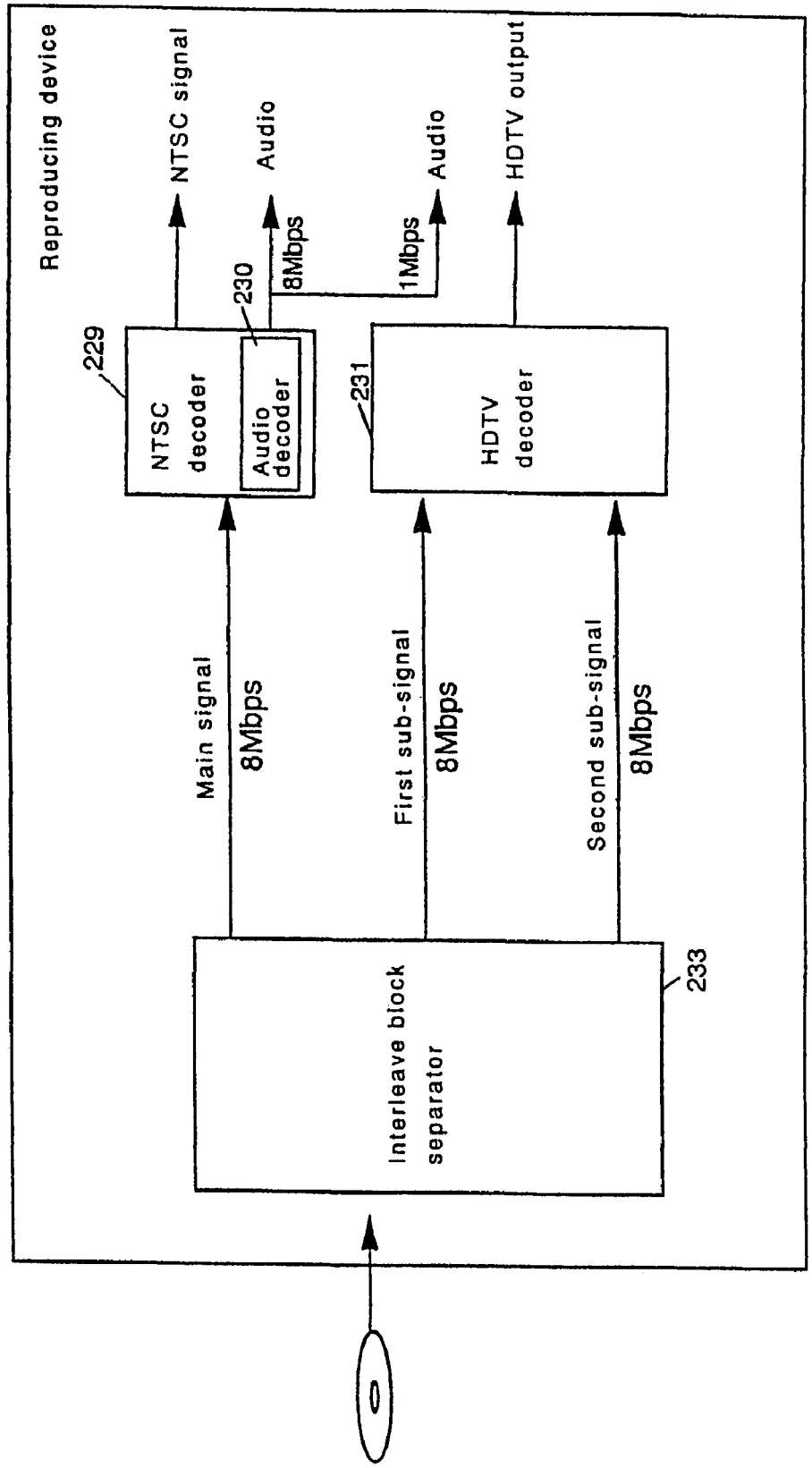
FIG. 55 is a block diagram of reproducing device for common disk of HDTV and NTSC of simultaneous broadcasting system in the embodiment of the invention.

FIG. 54 is a diagram showing an arrangement of signals of simul-casting system for interleaved recording of NTSC signal and HDTV signal individually, independently, and at the same time. In this case, NTSC video and sound 232 are recorded in the main signal of VOB 227a. In VOB 227b, VOB 227c, a signal of about 16 Mbps of compressed video signal of HDTV is divided into 8 Mbps each, and recorded on the optical disk in the interleave system of the invention. In the conventional player in FIGS. 54(1), (2), and in the progressive applicable player, (525i) signal of NTSC is reproduced. However, in the HDTV player in FIG. 54(3), only the audio data is obtained from No. 1 VOB 227a, and first sub-video and second sub-video are reproduced from the VOB 227b, 227c, and combined, and the HDTV signal of 16 Mbps is reproduced as shown in FIG. 54(3). In this case, since the reproduction of sub-signal is limited by reproducing procedure limiting information 225, in the event of misoperation of the existing DVD player by the user, the HDTV compressed signal will not be reproduced. Thus, the NTSC is issued from the conventional player, and HDTV signal, from the HDTV splay, so that the compatibility is maintained. A block diagram is shown in FIG. 55. The detail of operation is same as above and is omitted, and the reproduced signal from the optical disk is separated by an interleaved block separator 233, and the sound of the main signal is decoded by an audio decoder 230 of NTSC decoder 229, the stream of 8 Mbps of first sub-signal and second sub-signal is decoded in HDTV decoder 231, and the HDTV signal is decoded. In this way, HDTV signal and audio signal are issued. In this case, by simul-casting, in the firsts place, it is possible to reproduce in NTSC also by a conventional machine. In the invention, by using two interleave streams, a transfer rate of 16 Mbps is obtained, and the MPEG compressed signal of standard HDTV can be directly recorded. Next, in the DVD, only 16 Mbps can be recorded in two interleaved blocks. On the other hand, the HDTV compressed video signal is 16 Mbps. Accordingly, audio data cannot be recorded. However, as in the invention, by making use of the audio data of NTSC signal of main signal, if the HDTV is recorded in two interleaves, the audio output can be recorded.

Herein, a method of removing interlace interference is described below. When a progressive signal is decimated and transformed into interlace signal, aliasing occurs, and moire of low frequency component occurs. At the same time, line flicker of 30 Hz occurs. To avoid this, it is required to pass through interlace interference removing means. The interlace interference removing means 140 is put into the progressive signal block of the progressive interlace transforming unit 139 in the block diagram of the recording device 99 in FIG. 22 explained above. From the entered progressive signal, first, the video signal of high probability of occurrence of interlace interference is detected from the interlace interference image detecting means 140a, and only this video signal is passed into the interlace interference removing filter 141. For example, in the case of the image of low frequency component in the vertical direction, since interlace interference does not occur, the filter is circulated through a filter bypass route 143. Accordingly, deterioration of vertical resolution of image can be lessened. The interlace interference removing filter 141 is composed of a vertical direction filter 142.

As shown in the time and space frequency diagram in FIG. 46(a), the shaded area is an interlace aliasing distortion occurring region 213. To remove this, it may be passed through a vertical filter. More specifically, as shown in FIG. 46(c), installing three line memories 195, of 480 progressive line signals, by adding the video information of the objective line (n-th line), and video information of the lines before and after ((n−1)-th, (n+1)-th lines), three in total, by an adder 196 at an addition ratio, video information of one line is obtained, and 240 interlace signals are produced. By this processing, the vertical direction is filtered, and the interlace interference is alleviated. By varying the addition ratio of three lines, the filter characteristics can be changed. This is called the vertical three-line tap filter. By varying the addition ratio of a line and the preceding and following lines, a simpler vertical filter is obtained. As shown in FIG. 46(d), the line information is not a simple vertical filter, but, vertical filtering may be executed by developing, for example, even lines of the (n−1)-the line of previous frame and (n+1)-th line of next frame on a same space. By this timevertical filter 214, it is effective to lessen the interlace interference occurring when viewing only the interlace signal by reproducing the optical disk recording the progressive signal by a DVD player not applicable to progressive video. A horizontal filter 206a is realized by adding two pixels in the horizontal direction, and combining into one pixel. By filtering, however, the resolution of the progressive video is deteriorated. By the interlace interference video detecting means 140, by not filtering the image small in interference or changing the addition ratio of the adder of the vertical filter, the filtering effect is weakened, and it is effective to lessen deterioration in reproduction of progressive video. In the reproducing device applicable to progressive video of the invention, if not filtered during recording as mentioned later, the interlace interference can be removed by the filter at the reproducing device side. In future, it will be replaced by the progressive applicable type reproducing device, filter is not necessary when recording in future. In this case, filtered optical disk and non-filtered optical disk are present, and the interlace interference removal filtering means 140 issues an interlace interference removal filtering identifier 144 to the filtered image as an identifier for identifying it, and records it on the optical disk 85 by the recording means 9.

Figure 50:
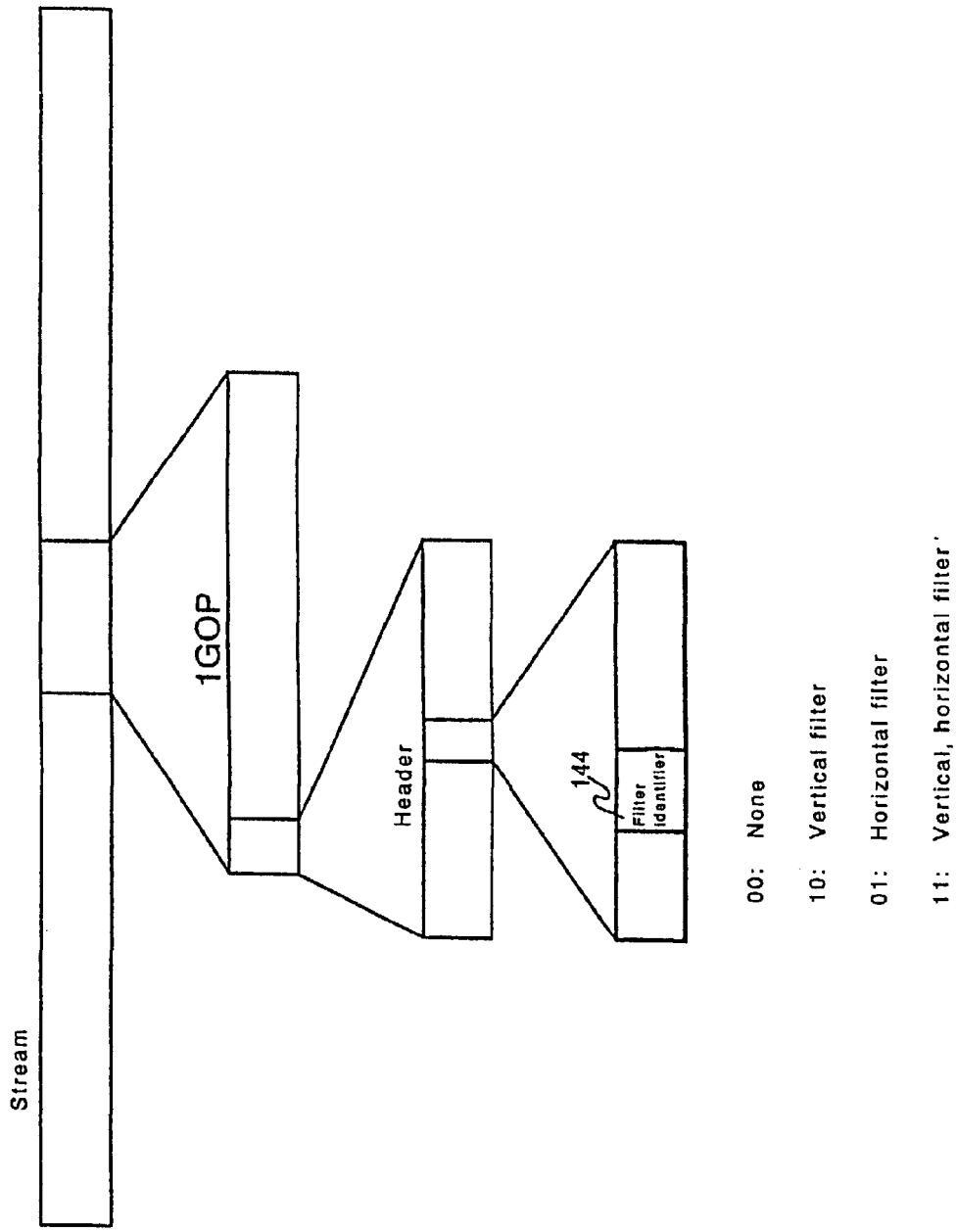
FIG. 50 shows contents of identifiers of vertical filter and horizontal filter in the embodiment of the invention.

A specific recording method of filter identifier shown in FIG. 50 is described. A filter identifier 144 is put into a header in a GOP which is a pixel unit of MPEG in a stream. "00" means there is no filter, "10" shows a signal passing through a vertical filter, "01" through a horizontal filter, and "11" through a vertical or horizontal filter. Being entered in the minimum unit of one GOP, the filter can be turned on and off in every GOP in the reproducing device, so that deterioration of picture quality due to double filters is prevented.

Figure 32:
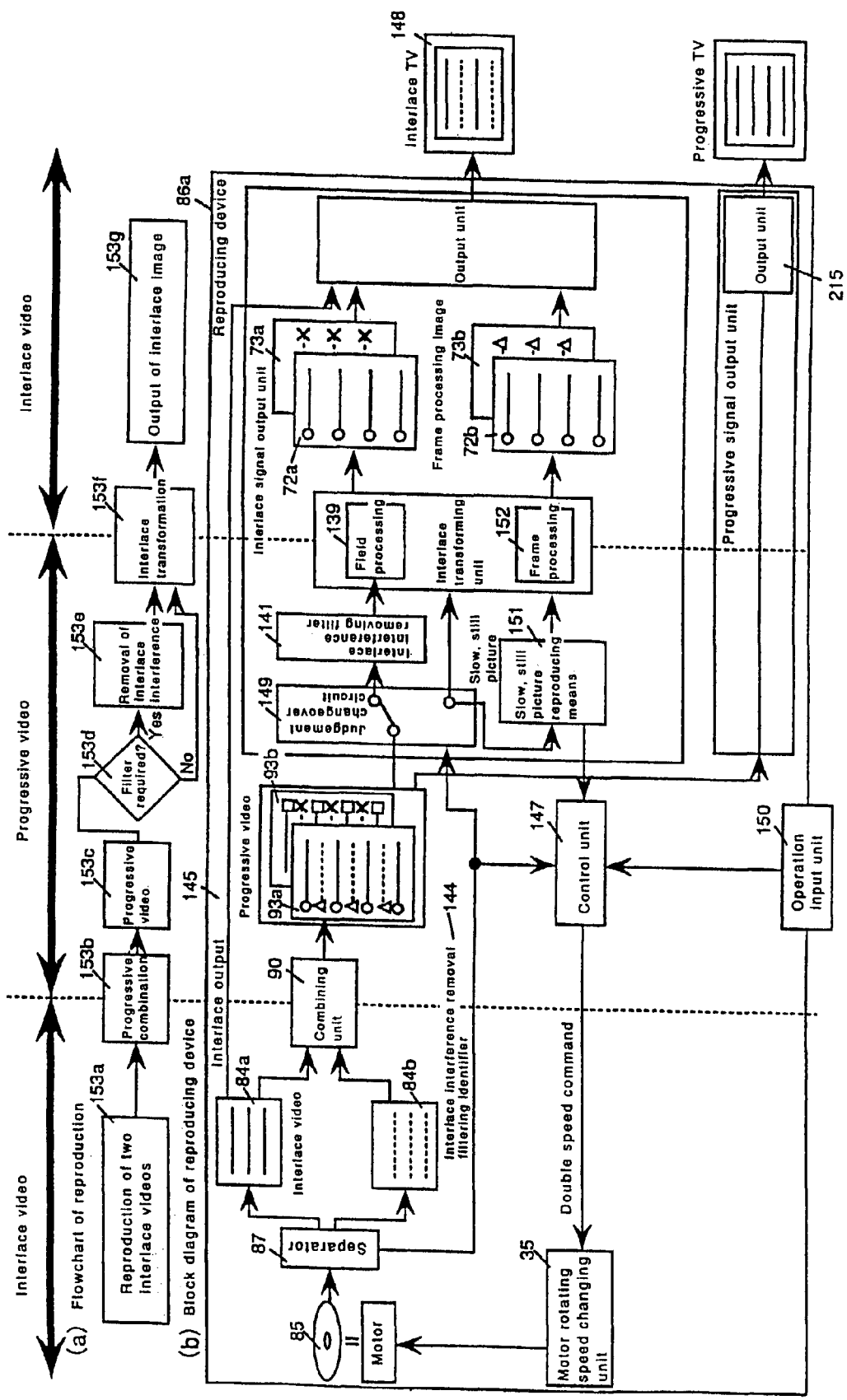
FIG. 32 is a diagram showing a method of decreasing interlace disturbance by filter on/off in the case of obtaining interlace signal in the embodiment of the invention.

The operation of reproducing this optical disk 85 by the reproducing device 86a is described by referring to FIGS. 32(a), (b). Same as in FIG. 21, two interlace images 84a, 84b are reproduced, and once combined into a progressive image 93a. However, when the interlace interference removal filtering identifier 144 is ON or when not performing trick play such as slow or still picture and not issuing progressive image, the interlace signal is issued directly by interlace output 145 by single speed rotation. In this case, energy-saving effect is obtained.

In the case of trick play or when the interlace interference removal filtering identifier 144 is OFF, a double speed command 146 is sent to a motor rotating speed changing unit 35 from a control unit 147, and the optical disk 85 rotates at double speed, and the progressive video is reproduced.

When issuing thus reproduced progressive video to an interlace TV 148 as an interlace signal, a method of removing the interlace interference is described below. When the interlace interference removal filtering identifier 144 is OFF, a judgement changeover circuit 149 is changed over, and the progressive signal is passed into the interlace interference removal filter 141, and odd interlace signal 72a and even interlace signal 73a are issued from two frames 93a, 93b in the interlace changing unit 139, and an ordinary interlace signal is issued. In this case, an image free from interlace interference is displayed in the interlace TV 148. Since the effect of interlace interference filter on the interlace signal is small, the interlace signal does not deteriorate. On the other hand, in a progressive signal output unit 215, a progressive signal free from interlace interference removal filter is issued. Therefore, by the on/off method of interlace interference removal filter at the reproducing device side, outputs of progressive video free from deterioration and interlace video free from deterioration such as interlace interference are obtained at the same time, which is a very notable effect.

In slow reproduction of ½ or lower speed or still picture reproduction, the interlace interference decreases, and the removal filter is weakened.

Means for improving picture quality in trick play is described below. When a command for slow or still picture reproduction is put into slow still picture reproducing means 151 from a control unit 147 through an operation input unit 150, the interlace transforming unit 149 distributes 480 lines of one frame 93a into two fields by the frame processing unit 152, and an odd interlace signal 72b and an even interlace signal 73b are produced and issued. As a result, an interlace still picture or slow reproduction image of resolution of 480 lines free from shake is displayed in the interlace TV 148. In the conventional interlace type reproducing device, to obtain a still picture or slow picture free from shake, the resolution must be lowered to 240 lines, but in this invention, by once transforming from the interlace to the progressive video, and then transforming to the interlace video, it is effective to obtain slow and still picture of interlace at resolution of 480 lines. In FIG. 32(a), steps 153a to 153g show this procedure in flow chart, but detailed description is omitted.

Figure 26:
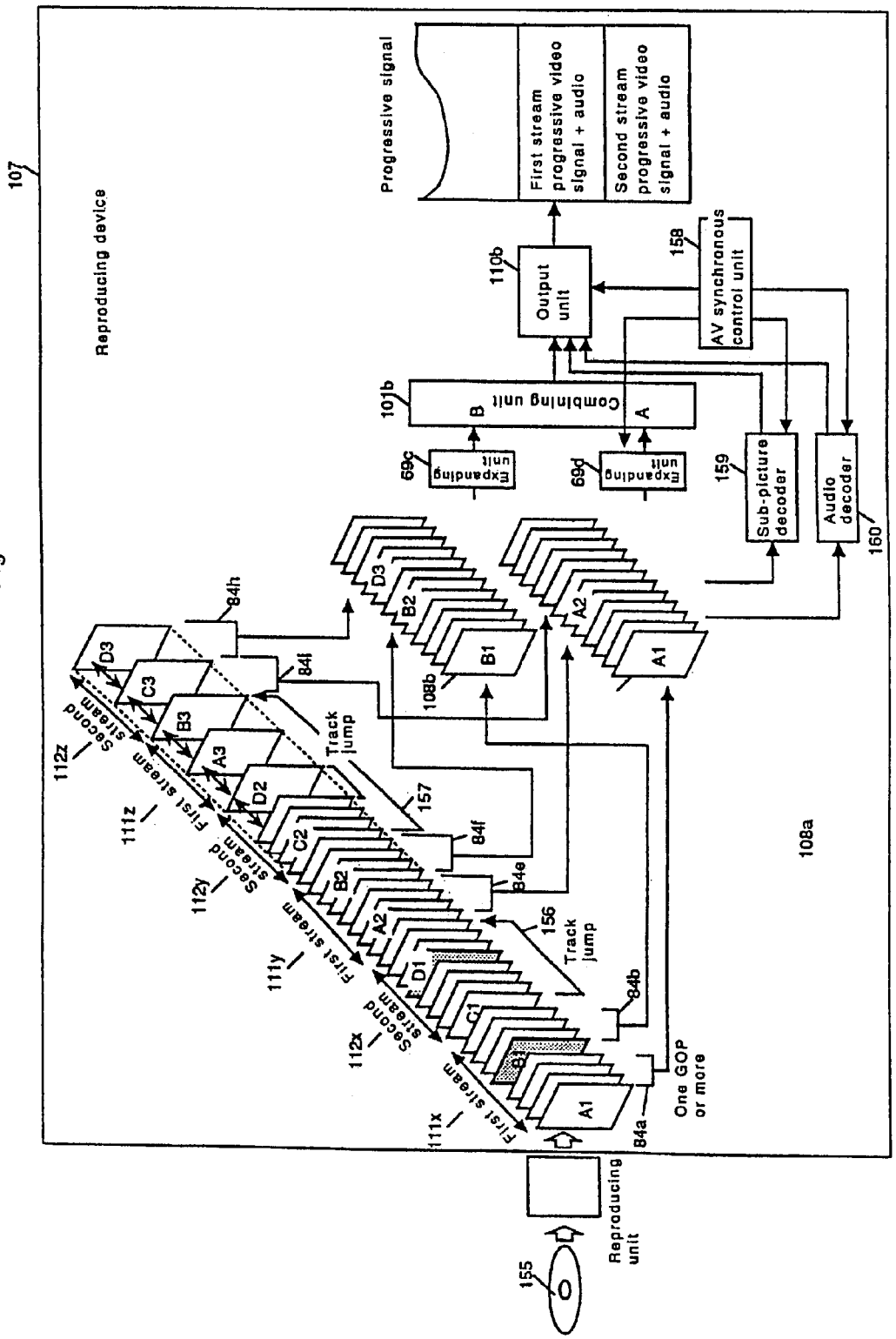
FIG. 26 is a block diagram in progressive video reproduction of multi-stream of the reproducing device in the embodiment of the invention.

Next, in the method shown in FIG. 26, from a stream of two channels, for example, from a disk interleaving videos of camera 1 and camera 2, a first stream is reproduced, and it is changed over to a second stream intermediately, and issued continuously.

Figure 35:
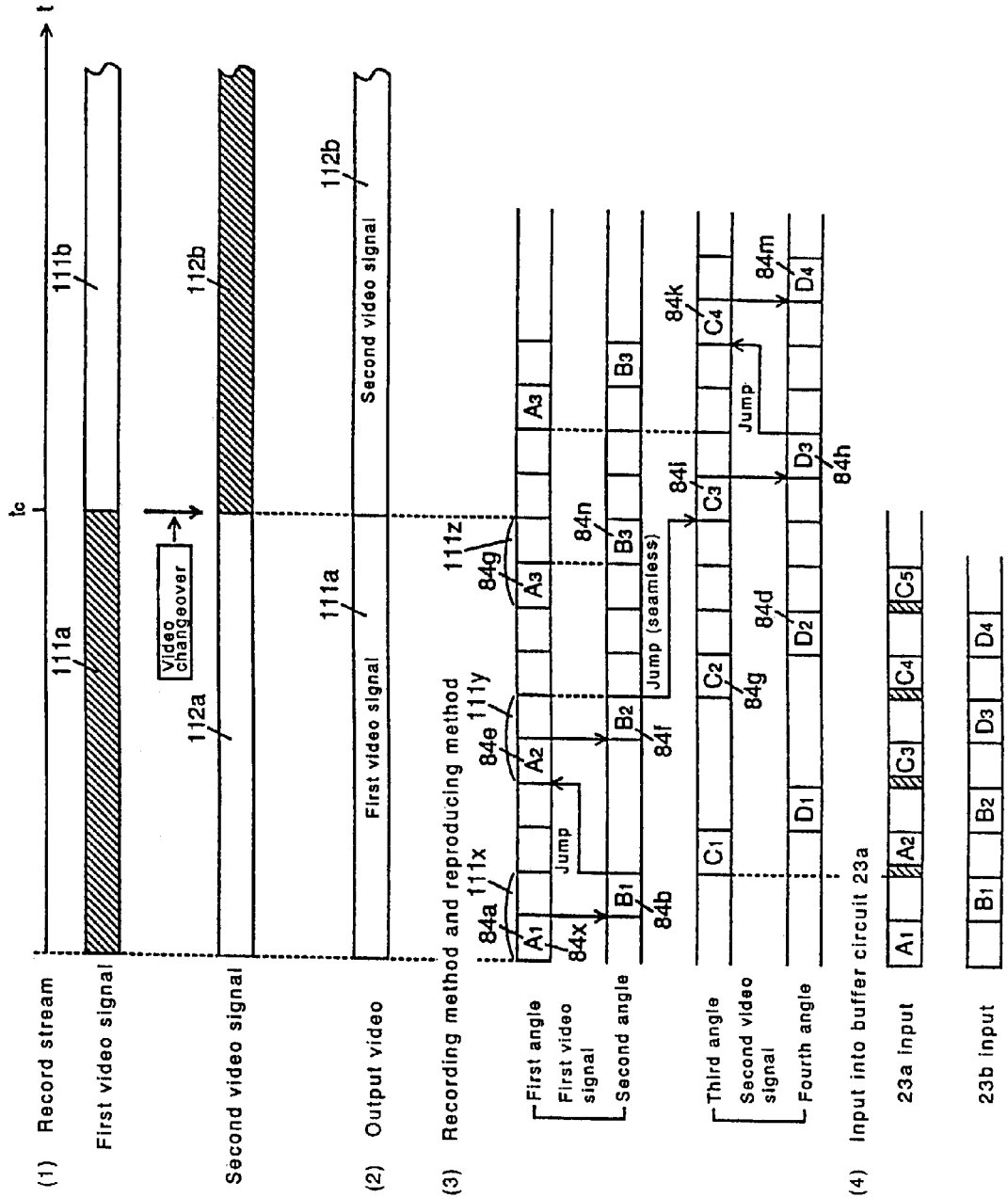
FIG. 35 is a time chart showing reproduction of interleaved block at the time of video stream changeover in the embodiment of the invention.

Referring to FIG. 35, when the contents have plural stories, that is, streams are multiplexed, a method of changing over from a specific stream to other stream smoothly without interruption is described. As shown in FIG. 35(1), two different stories are recorded in an optical disk 106, as two streams of first video signal and second video signal, that is, first stream 111 and second stream 112, basically on the same radius, approximately.

In this case, since only the first video signal as basic story is reproduced usually, after the first stream 111a, a next first stream 11b is reproduced and issued consecutively. However, at the moment of t=tc, when the user commands to change over to the second video signal from the command input unit 19 in FIG. 5, at t=tc, the track at other radius position is accessed by using the tracking control circuit 22 in FIG. 5 from the first stream 111a to the second stream 112b, and the output signal is changed over to the second stream 112b of the second video signal.

Thus, when the first video signal is at the time of t=tc in FIG. 35(2), the picture, sound and sub-picture of the second video signal are changed over smoothly without interruption.

A method of seamless reproduction by synchronizing the picture, sound and sub-picture is described below.

Referring to the timing chart in FIGS. 35(3), (4), the data reproducing procedure is more specifically described below. As explained in the block diagram of the recording device in FIG. 22, the progressive video of the first video signal is separated into main interlace video signals A1 to An of Odd-line First, and sub-interlace video signals B1 to Bn of Even-line First, and recorded separately in first angle and second angle sub-channels, respectively. Although omitted in FIG. 22, the progressive video of the second video signal is similarly separated into main interlace video signals C1 to Cn and sub-interlace video signals D1 to Dn, and recorded separately in third angle and fourth angle as shown in FIG. 35(3). FIG. 35(3) is an explanation of the principle of FIG. 36 in time chart, and the operation is the same.

Figure 36:
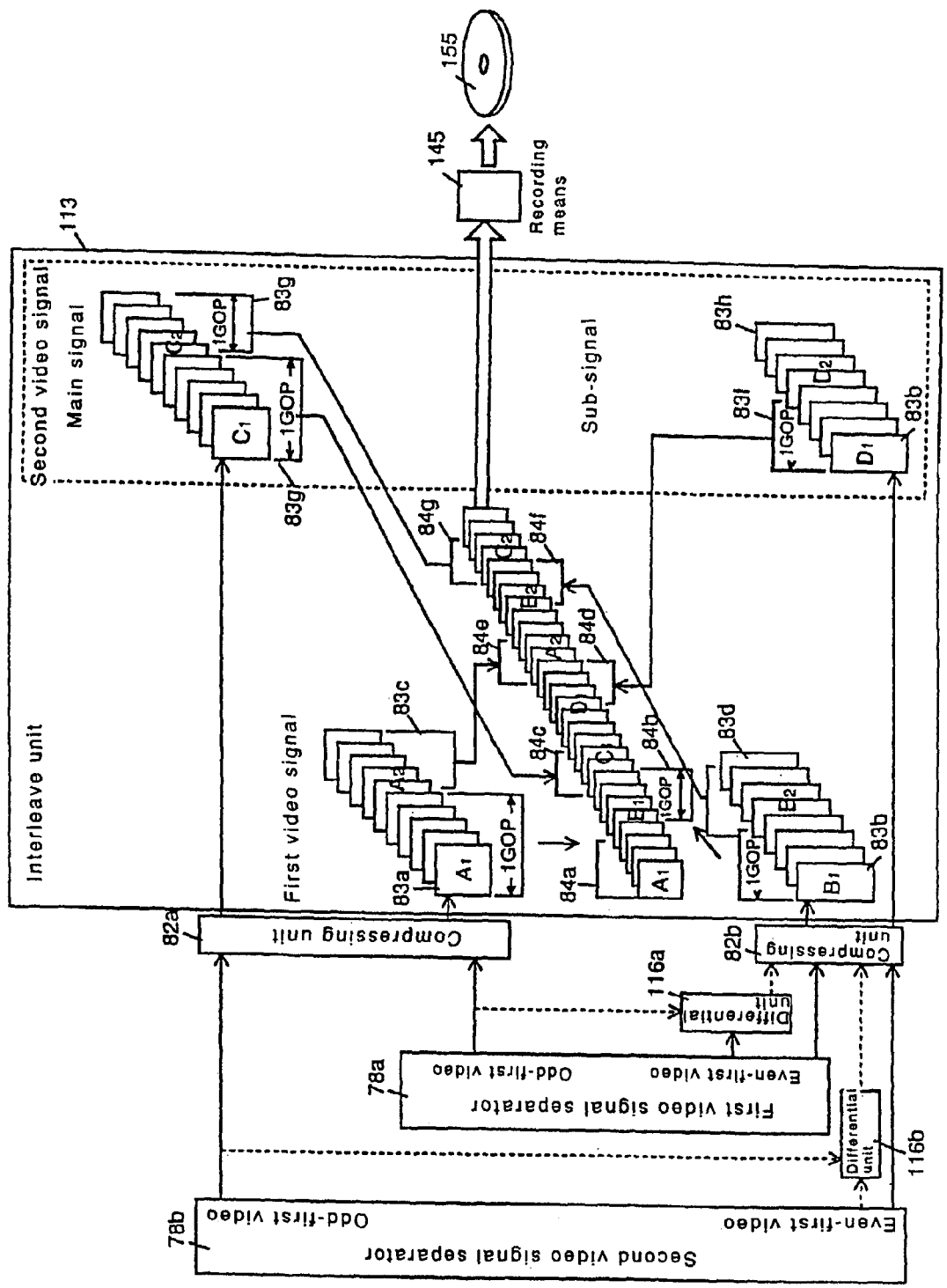
FIG. 36 is a principle diagram for recording two progressive video signals by dividing into interleaved blocks in the embodiment of the invention.

FIG. 36 explains the recording device in FIG. 22, limiting only to the interleave unit. The progressive signals of the first video signal are separated into two interlace signals, that is, odd-first main signal and even-first sub-signal, in the first video signal separator 78a. In this case, in order to decrease the quantity of information, a differential signal of main signal and sub-signal is determined in a differential unit 116a, and the main signal and differential signal are compressed and recorded in the disk, so that the recording information quantity can be decreased. In the case of progressive video, since the correlation of adjacent odd line and even line is very close, the information quantity of differential signal between the two is small. By calculating the difference, it is effective to reduce the information quantity substantially.

In the divided recording method of the invention using this differential unit 116a, as shown in FIG. 44, a 720P or 720-line progress signal 182 or 1050P progressive video 182a are separated into 525. basic information 187, progressive video 183, 525 interlace video 184 and complementary information 186 by the image separator 115. By the differential unit 116a, basic information 187 and differential information 185 of complementary information 186 are determined, and this differential information 185 can be separated into four streams 188c, 188d, 188e, 188f in total by the second video signal separator 78c and third video signal separator 78d. Sending them to the compressing unit 103, and interleaving with the interleave 113a, six streams are recorded in each angle of the optical disk 187.

At this time, since the streams 188c, 188d, 188e, 188f are differential information or complementary information, if decoded in the reproducing device, when issued to the TV screen, since it is not a normal TV picture, it gives an impression of discomfort to the viewer. In the invention, accordingly, in order that the angle of the streams 188c, 188d, 188e, 188f including the complementary information may not be issued in the past non-applicable reproducing device, the limiting information is generated in a video output limiting information generating unit 179, and recorded in the optical disk 187. More specifically, in the DVD standard, it is designated so as not to open the specific stream without password. By protecting the streams 188dc, 188d, 188e, 188f with password, it cannot be opened easily in the conventional reproducing device, thereby avoiding presentation of abnormal picture decoding the complementary information 186 by mistake to the viewer.

Back to FIG. 36, the first video signal is thus compressed, and the main signal becomes interleaved blocks 83a, 83c of A1, A2 in the unit of one GOP or more. On the other hand, the main signal of the second video signal is the interleaved block 83g of C1, C2, the sub-signal is the interleaved blocks 83b, 83d of B1, B2, and the sub-signal is the interleaved blocks 83f, 83h of D1, D2. From these four sets of data, as shown in FIG. 36, a recording stream 117 is generated. In the recording stream 117, the data are arranged in the sequence of A1, B1, C1, D1, A2, B2, C2, D2, and recorded on an optical disk 155 by recording means 118. Seeing at the progressive signal level, A1, B1, A2, B2 are first video signals, and hence the data are recorded in the sequence of the first video signal, second video signal, first video signal, second video signal and so forth. Seamless interruption of AV synchronous control unit is described later.

In the above explanation, MPEG signals of one GOP or more are recorded in each interleaved block, and strictly speaking, since one interleaved block is limited to about 0.5 sec or less, the video signals can be recorded for the portion of 30 fields at maximum. Therefore, at maximum, 30 GOPs can be recorded in one interleaved block. That is, one interleaved block of the invention is limited to recording of one GOP or more and up to 30 GOPs or less.

Figure 33:
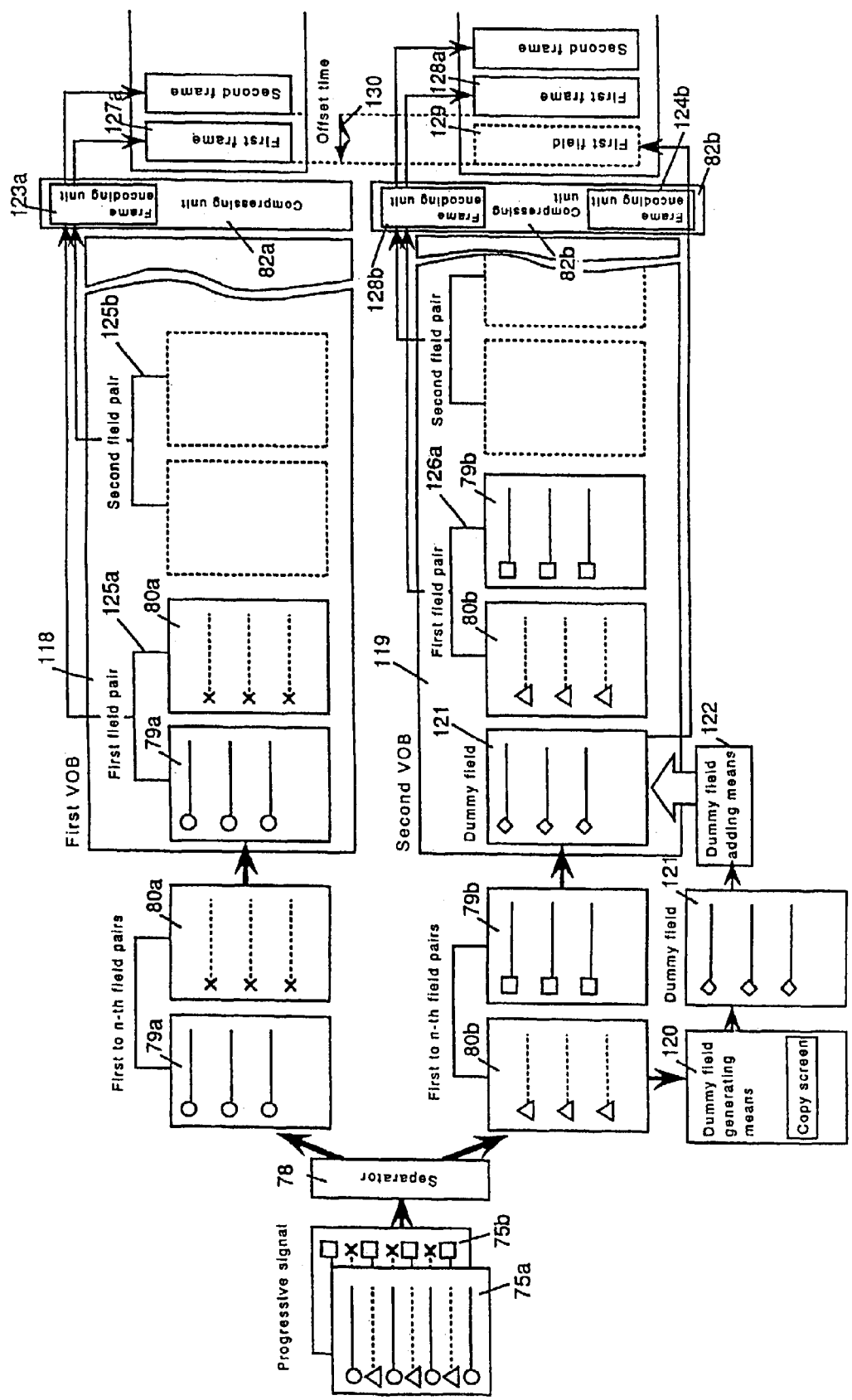
FIG. 33 is a diagram showing a recording method for adjusting the format when recording into a DVD in the embodiment of the invention.

When recording on a DVD, normal reproduction is not obtained unless the DVD standard is satisfied. In the DVD standard, each chapter, that is, each VOB must start with Odd-line First. When the progressive signal of the invention is separated, as shown in FIG. 22, the interlace signal is main, and the signal is an odd line, that is, Odd-line First, but the sub-signal is an even line, that is, Even-line First. Accordingly, in the invention, as shown in FIG. 33, the progressive videos 75a, 75b are separated by the separator 78, into a field pair of odd interlace signal 79a and even interlace signal 80a as the main signal, and into even interlace signal 80b and odd interlace signal 79b as the sub signal. The first VOB 118 composed of main signal starts with the odd interlace signal 79a of odd line field, and hence no problem is caused. However, the sub-signal starts with even interlace signal 80b composed of even line, and it is not normally reproduced in this state. In the invention, by dummy field generating means 120, at least one dummy field 121 is created, and the dummy field 121 is added to the beginning of the second VOB 119 by dummy field adding means 122. The dummy field 121 is reproduced continuously later. Unnatural feeling may be eliminated when reproducing by copying the image of the even interlace signal 80b or field picture of odd interlace signal 79b.

A compressing method is described below. Interlace signals 79a, 80a of the first VOB 118 are assembled into a field pair 125a, and coded in a frame encoder 123a, and a frame coded signal 127a is produced.

On the other hand, the dummy field 121 of the second VOB 119 is coded in a field unit in a field encoder 124b in a compressing unit 82b, and first the field coded signal 129 is coded. Next, the sub-signals, that is, the even interlace signal 80b and odd interlace signal 79b are assembled into a first field pair 126a, and coded in frame in a frame encoder 123b in the compressing unit 82b, and a frame coded signal 128a is obtained.

In this way, an odd-first dummy field is added to the second VOB 119, and hence it starts from an odd interlace signal. Being recorded in the sequence of odd number and even number, it is effective to reproduce smoothly in a DVD player. In this case, one progressive signal corresponds to frame coded signal 127a and frame coded signal 128a. However, owing to the presence of the field coded signal 129 which is a dummy field, there is an offset time 130 of td between the frame coded signal 127a of the main signal and frame coded signal 128a of the sub-signal. When reproducing progressive video, the output timing of the sub-signal musts be advanced by the portion of this offset time 130.

Figure 34:
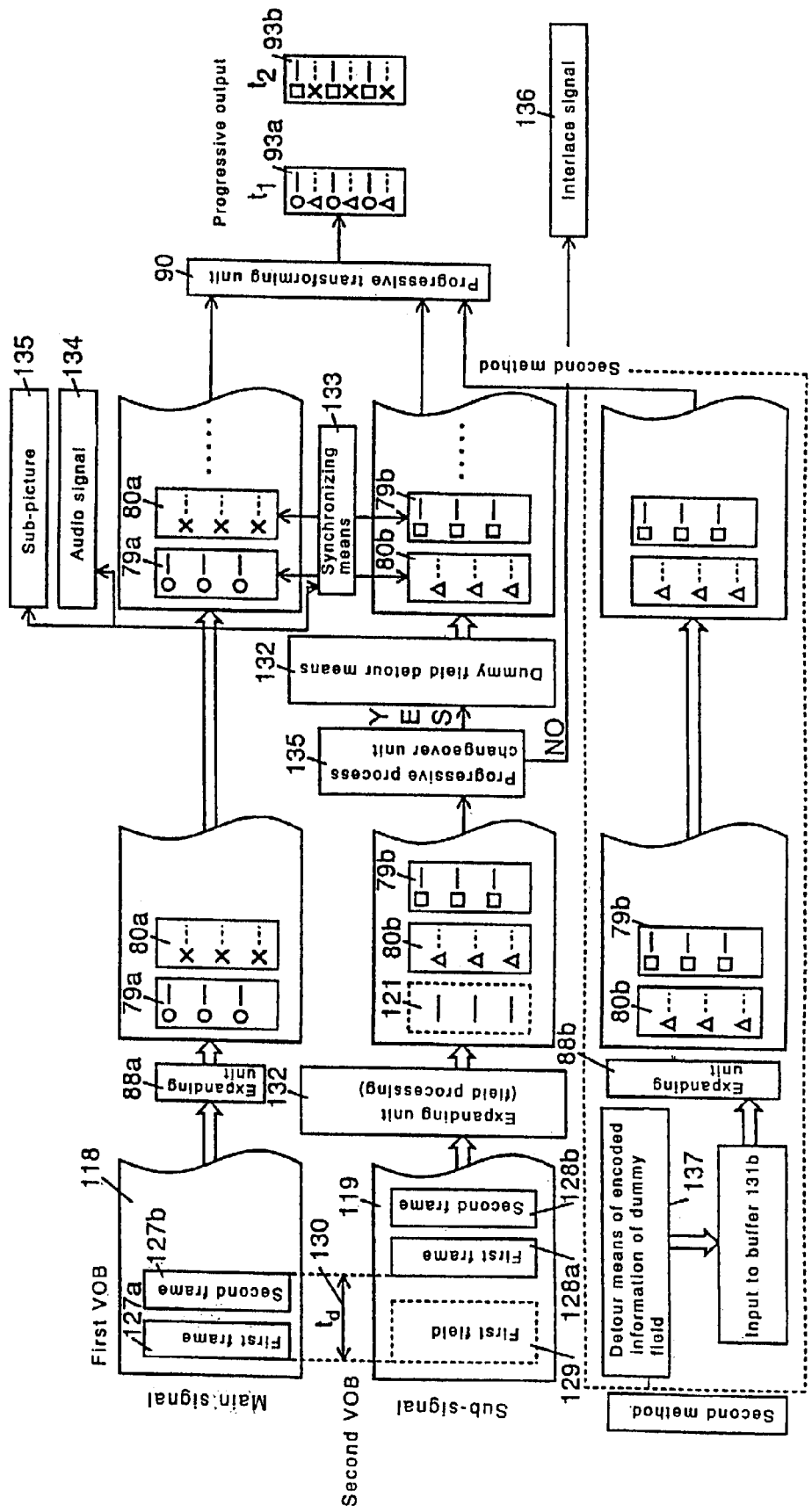
FIG. 34 is a diagram showing a timing control method in the case of reproducing from a DVD in an embodiment of the invention.

Referring now to FIG. 34, the operation of the reproducing device 86 in FIG. 21 is more specifically described below. The signal from the reproducing unit 95 is separated into first VOB 118 of main signal and second VOB 119 of sub-signal. Since the first VOB 118 starts with an odd line, it may be expanded directly. However, at the beginning of the second VOB 119, the dummy field 129 is inserted as mentioned in FIG. 33. Accordingly, when reproduced directly, synchronism between the main signal and sub-signal is deviated by the portion of offset time 119 of td, and it takes time to combine the first progressive video, and the screen is not consecutive when changing over from VOB to next VOB. In this invention, therefore, the dummy field 121 is skipped by two methods.

In a first method, the field coded signal 129 at the beginning of the second VOB 119 is once put into an expanding unit 132, and if progressive identification information is entered in the process of expanding by field expanding process or after expanding, the progressive process changeover unit 135 is changed to yes, and the dummy field 121 is skipped by dummy field detour means 132, and the even interlace signal 80b is issued first, which is followed by the even interlace signal 79b. This signal is synchronized, by synchronizing means 133, with an audio signal 134 recorded in the main signal and sub-title or sub-picture 135, and progressive images 93a, 93b are issued from the progress transforming unit 90. Thus, by detour of dummy field 121, the odd field and even field are synchronized and combined, and the progressive signal, audio signal and sub-picture matched on the time axis are issued. Incidentally, if progressive identification information is not provided, the progressive changeover unit 135 is changed over to No, and dummy field 121 is not removed, and hence the progressive video is not transformed, and the interlace signal 136 is issued. This interlace signal 136 is issued in a conventional DVD player without progressive function. Thus, turning on the dummy field detour means 132 in the case of progressive process, and off otherwise, the interlace signal of ordinary field coding can be normally reproduced without dropping the first field.

A second method is described below. This is employed when the dummy field 129 is a field coded GOP, and it can be separated from the GOP of frame of sub-signal. Before decoding, the field coded signal 129 which is coded information of the dummy field is skipped by one GOP in coded information detour means 137 of dummy field. Skipped information may be entered in the buffer 131b, or it may be skipped at the time of output of the buffer 131b. In the expanding unit 88b, only the frame or field information of the sub-signal making a pair with the main signal is entered. Thus, by the ordinary means shown in FIG. 21, the even interlace signal 80 and odd interlace signal 79b are expanded and interlace transformed, and synchronized with the main signal in the synchronizing means 133, and transformed into progressive signals 93a, 93b in the progressive transforming unit 90.

In the second method, since the dummy field is removed in the stage of coded information, it is not necessary to change the processing of the buffer 131b or processing of the expanding unit 88. It is suited when inserting the dummy field coded into one GOP at the beginning of the second VOB 119.

In the first method, the dummy field 129 and field signals in each frame 127a are field coded in batch to create one GOP, and therefore, same as the seamless multi-angle method of high recording efficiency, it is efficient when the dummy field is inserted at the beginning of one interleaved block, and hence it gives an effect of increasing the recording time.

Thus, by skipping the dummy field 121 only in the case of progressive process, it is effective to reproduce the progressive video without seam in the boundary of one VOB and next VOB, or in the interleaved block of seamless multi-angle.

Figure 37:
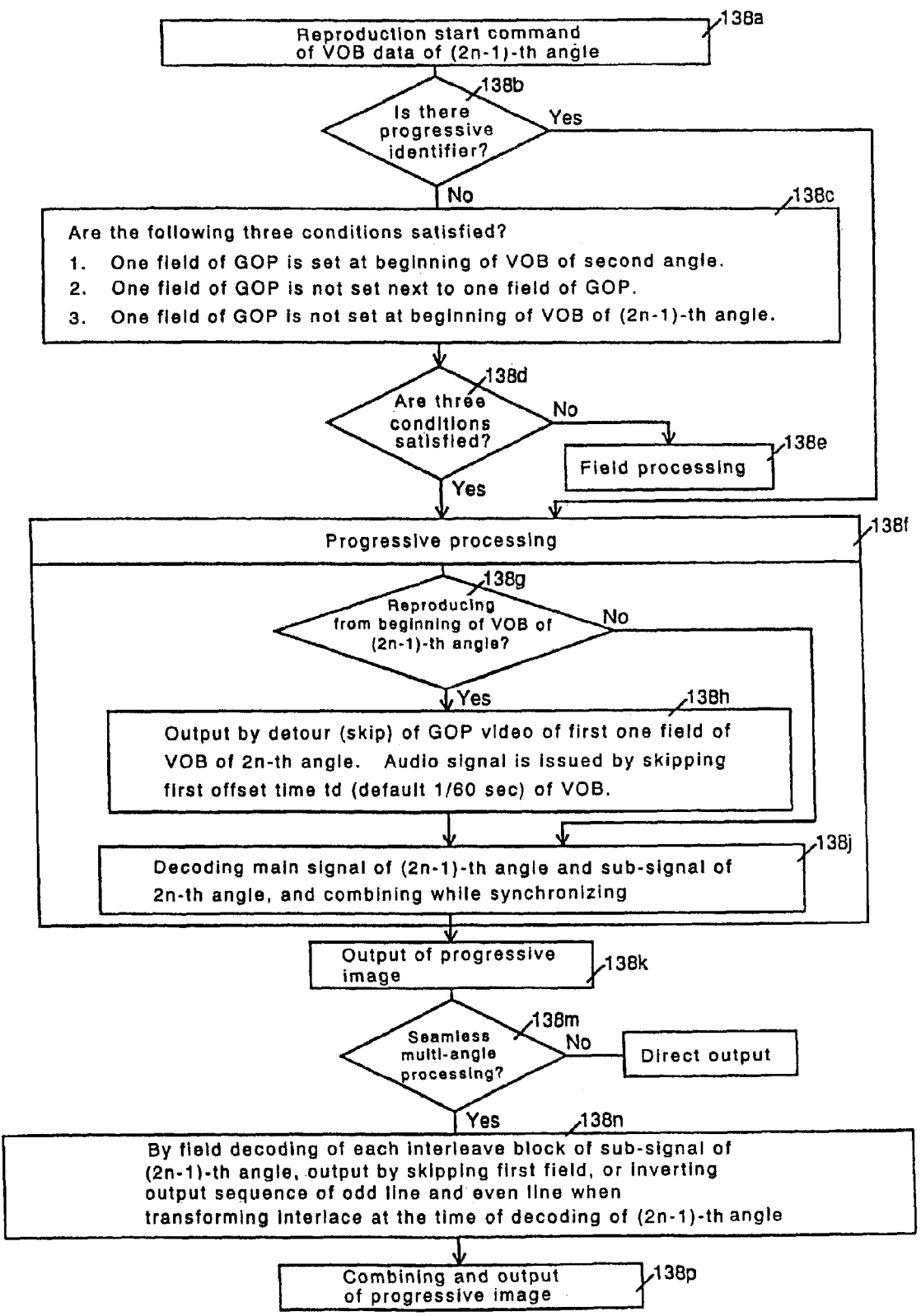
FIG. 37 is a flowchart for skipping an initial dummy field of VOB (VIDEO OBJECT) in an embodiment of the invention.

Referring to the flowchart in FIG. 37, the procedure is described. At step 138a, a reproduction start command of (2n−1)-th angle data is received. At step 138b, checking if there is progressive identifier or not, and if Yes, the process jumps to step 138f, and if No, at step 138c, it is checked if the following three conditions are satisfied or not. Condition 1, there is a GOP of one field (or an odd number of fields) at the beginning of VOB of n-th angle. Condition 2, there is no GOP of one field consecutively to this GOP of one field. Condition 3, the beginning GOP of (2n−1)-th angle is not one field. At step 138d, checking if these conditions are satisfied or not, and if No, interlace is processed at step 138e, and only (2n−1)-th angle is issued. If Yes, changing over to progressive process at step 138f, it is checked at step 138g whether or not to reproduce from the beginning of the VOB of (2n−1)-th angle, and if No, the process jumps to step 138j, and if Yes, at step 138h, the video of the first one field of n-th angle VOB or GOP for the portion of one field is skipped to produce output. If there is an audio signal in (2n−1)-th angle, the output is produced by skipping the first offset time td (default: 1/60 sec) of VOB. At step 138j, the main signal of (2n−1)-th angle and sub-signal of 2n-th angle are decoded and synchronized, and combined into a progressive signal. At step 138k, issuing a progressive image, when issuing seamless multi-angle at step 138m, advancing to step 138n, each interleaved block of (2n−1)-th angle (sub-signal) is field decoded, and issued by skipping the first one. Or, at the time of interlace transformation, the output sequence of odd line and even line fields is reversed. At step 138p, the progressive image is combined and issued.

Figure 48:
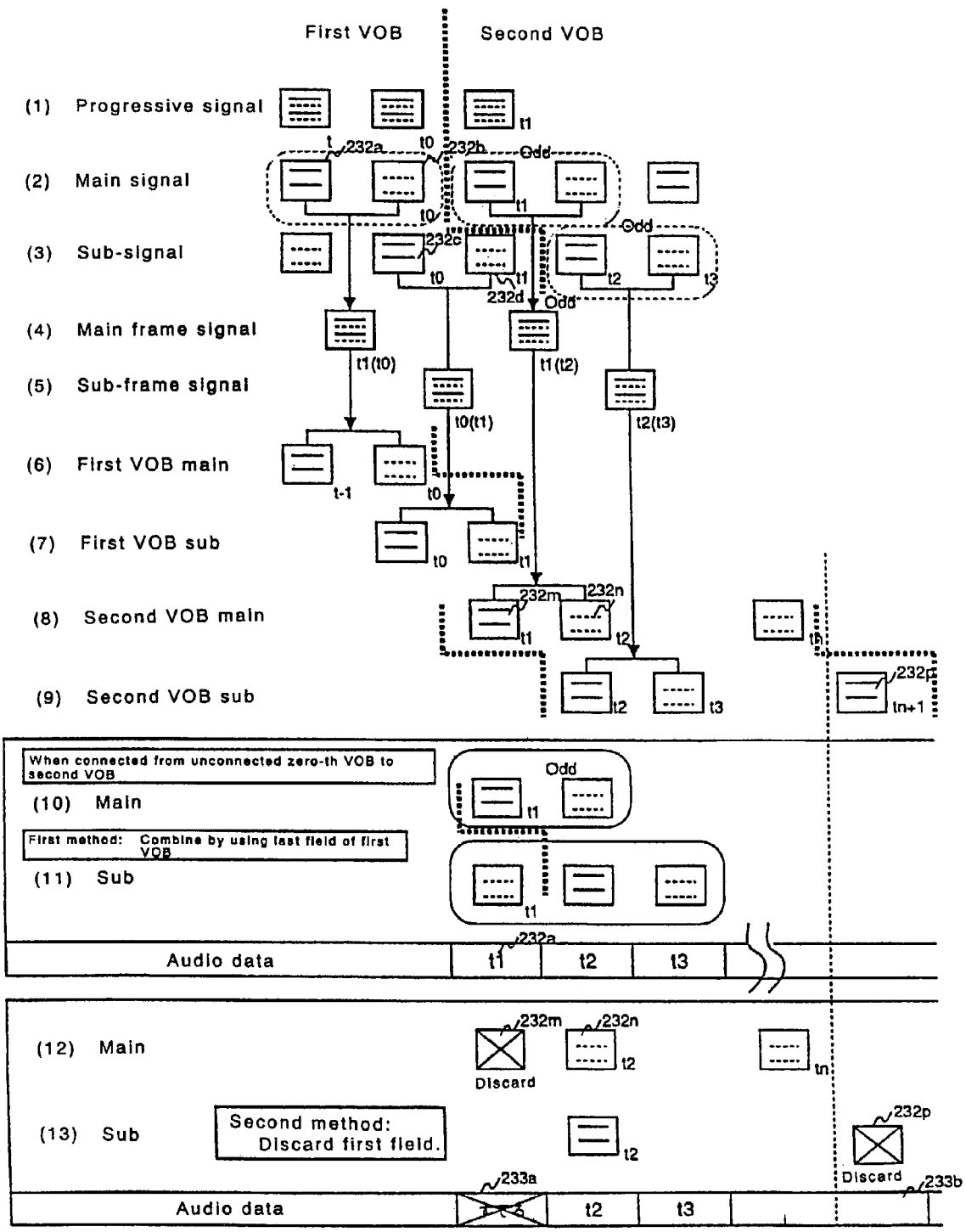
FIG. 48 is a time chart of encoding progressive signals by using an existing encoder in the embodiment of the invention.
Figure 49:
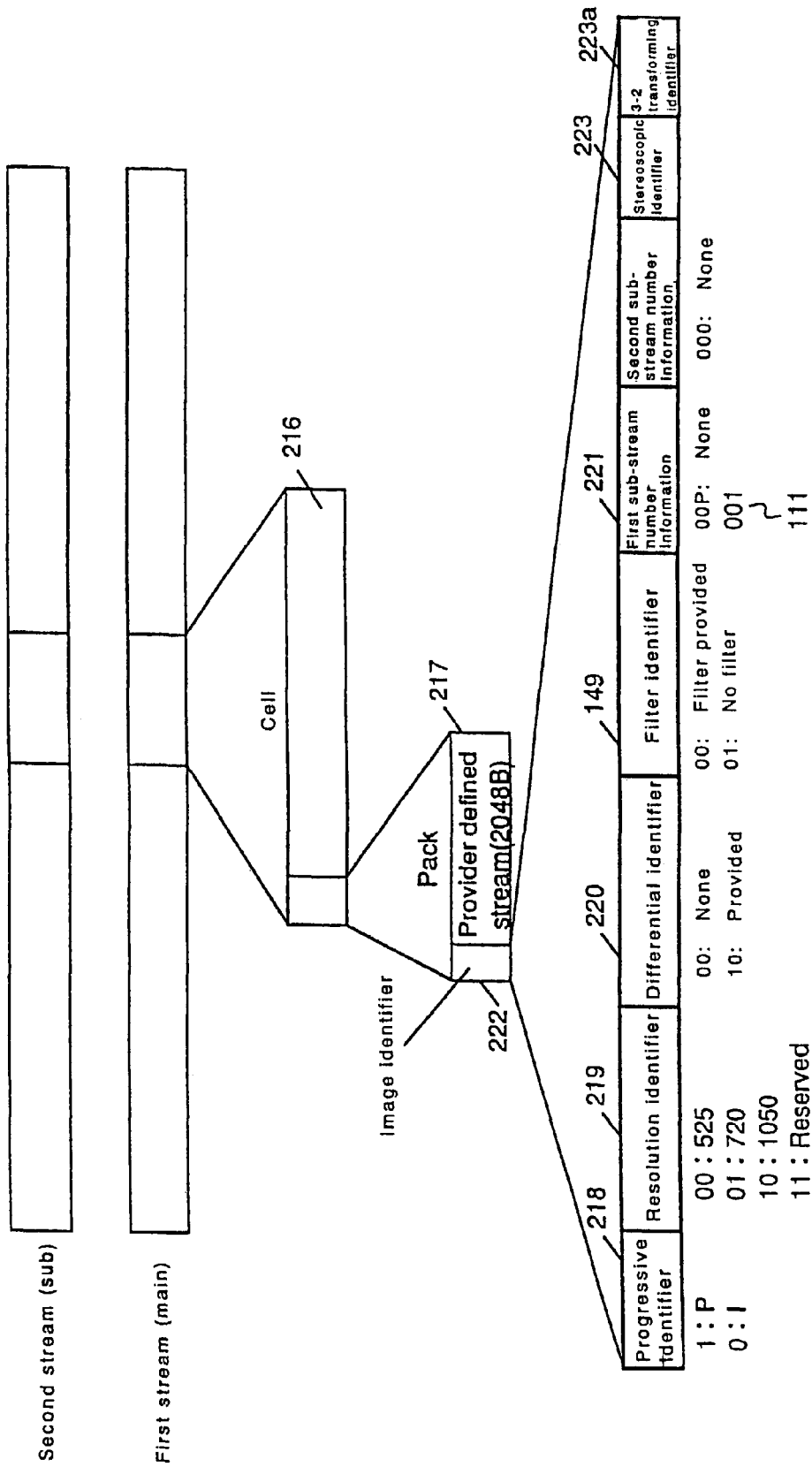
FIG. 49 is a signal format of video identifier in the embodiment of the invention.

FIG. 48 is a time chart when using the encoder of MPEG2 generally used at the present. Most of the existing encoders can process only the interlace signals of which first image begins with odd-first line. On the other hand, as shown in FIG. 48(2) in which the progressive signal in FIG. 48(1) is divided, the main signal by dividing the progressive signal is odd-first, and is hence encoded from the first field. However, the sub-signal shown in FIG. 48(3) has an even-first beginning image, and the signal of t=t−1 in the first field is not encoded, and encoding starts from t=t0. That is, only a pair of images 232c, 232d can be encoded. In this case, the boundary of the first VOB and second VOB is deviated by one field in the sub-signal as compared with the main signal. Therefore, when reproducing consecutive VOBs, VOBs are smoothly connected, but when jumping from a certain VOB to other specific nonconsecutive VOB, as shown in FIG. 48(12), only one main signal can be obtained in the beginning field of the VOB. Accordingly, in the invention, discarding the image 232m of the first field, by reproducing from the image 232n at t=t2, a perfect progressive signal is obtained. In this case, by discarding the audio data 233a for the portion of one field at the same time, it is effective that the sound is connected in synchronism.

Figure 47:
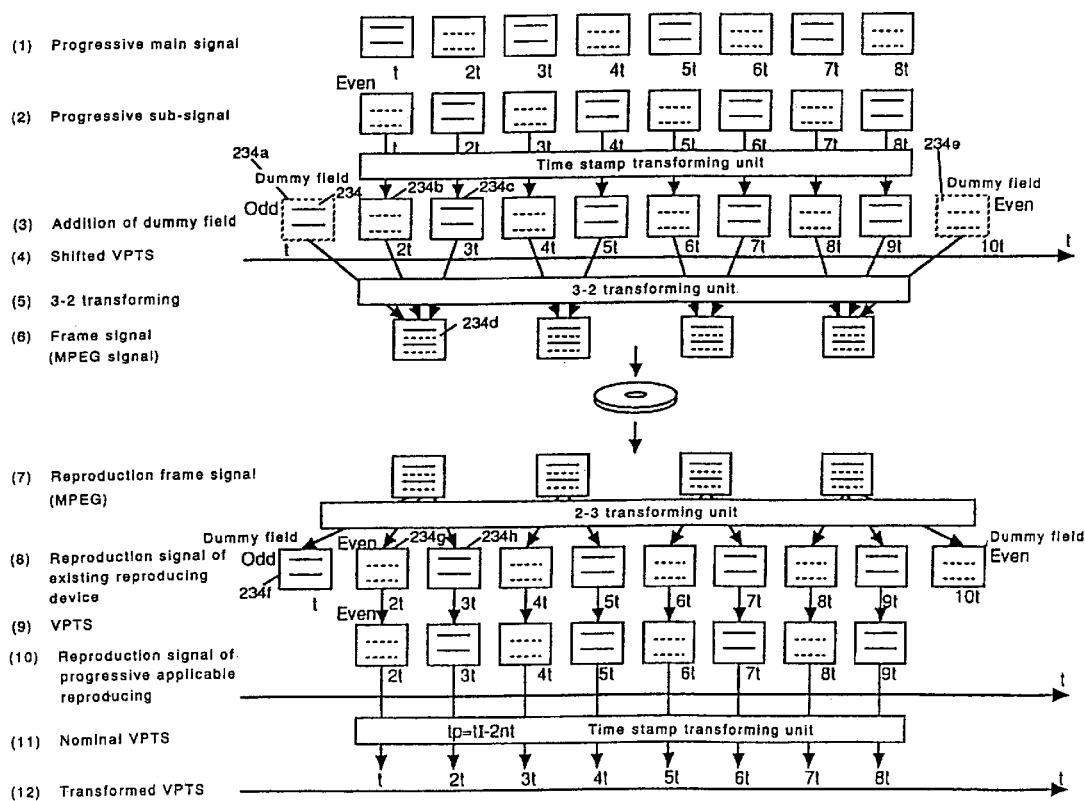
FIG. 47 is a signal arrangement diagram for inserting dummy fields in an embodiment of the invention.

Referring to FIG. 47, a method of inserting dummy field of odd field without dropping the recording efficiency by using odd field repeat identifier is described. In the sub-signal of progressive signal shown in FIG. 47(2), imaginary dummy fields 234a, 234b are set as shown in FIG. 47(3). The time stamp is advanced by one field. In the 3-2 transforming unit in FIG. 47(5), three fields, 234a, 234b, 234c, are virtually combined into one frame 234d. In this case, even-first identifier should be provided by nature, but since odd-first repeat identifier for repeating odd-first is added, as shown in FIG. 47(8), when reproducing, odd field 234f, even field 234g, and odd field 234h are reproduced in the 2-3 transforming unit. In this way, the odd-first DVD standard is satisfied, and the compatibility is assured. Of course, in the progressive applicable type reproducing device, skipping the dummy field 234h, seamless progressive signal is reproduced by correcting the time stamp by the portion of one field. In the dummy field, only the same field is repeated twice, the recording efficiency is not lowered at all.

Herein, by reference to FIG. 26 and FIG. 35(3), the procedure of reproducing this optical disk 155 and changing over from first video signal to second video signal at t=tc is described below. In this example of optical disk 155, as shown in FIG. 26, streams of four channels are interleaved and recorded in the interleaved block unit of one GOP unit in the sequence of A1, B1, C1, D1, A2, B2, C2, D2, A3, B3, C3, D3. First is the output of the first video signal, interleaved blocks (ILB) of A and B, 84a and 84b, that is, A1 and B1 are reproduced continuously, and by jumping tracks 156, ILB 84e and 84f, that is, A2 and B2 are reproduced. At t=tc, changing over to the second video signal, jumping tracks 157, ILB 84i and 84h, that is, C3 and D3 are reproduced. Thus, A1, A2, C3 are reproduced as main signals, and B1, B2, D3 as sub-signals, and they are expanded and combined in the expanding unit, and sent into the output unit 10b from the combining unit 101b, and together with the sub-picture from the sub-picture decoder 158 and sound from the audio signal reproducing unit 160, the three signals are matched in phase in the AV synchronism control unit 158, and issued as being matched in timing. Accordingly, the progressive signal of the first stream and progressive signal of the second stream are reproduced continuously without seam together with sound and sub-picture. The seamless synchronizing method is described later.

Figure 45:
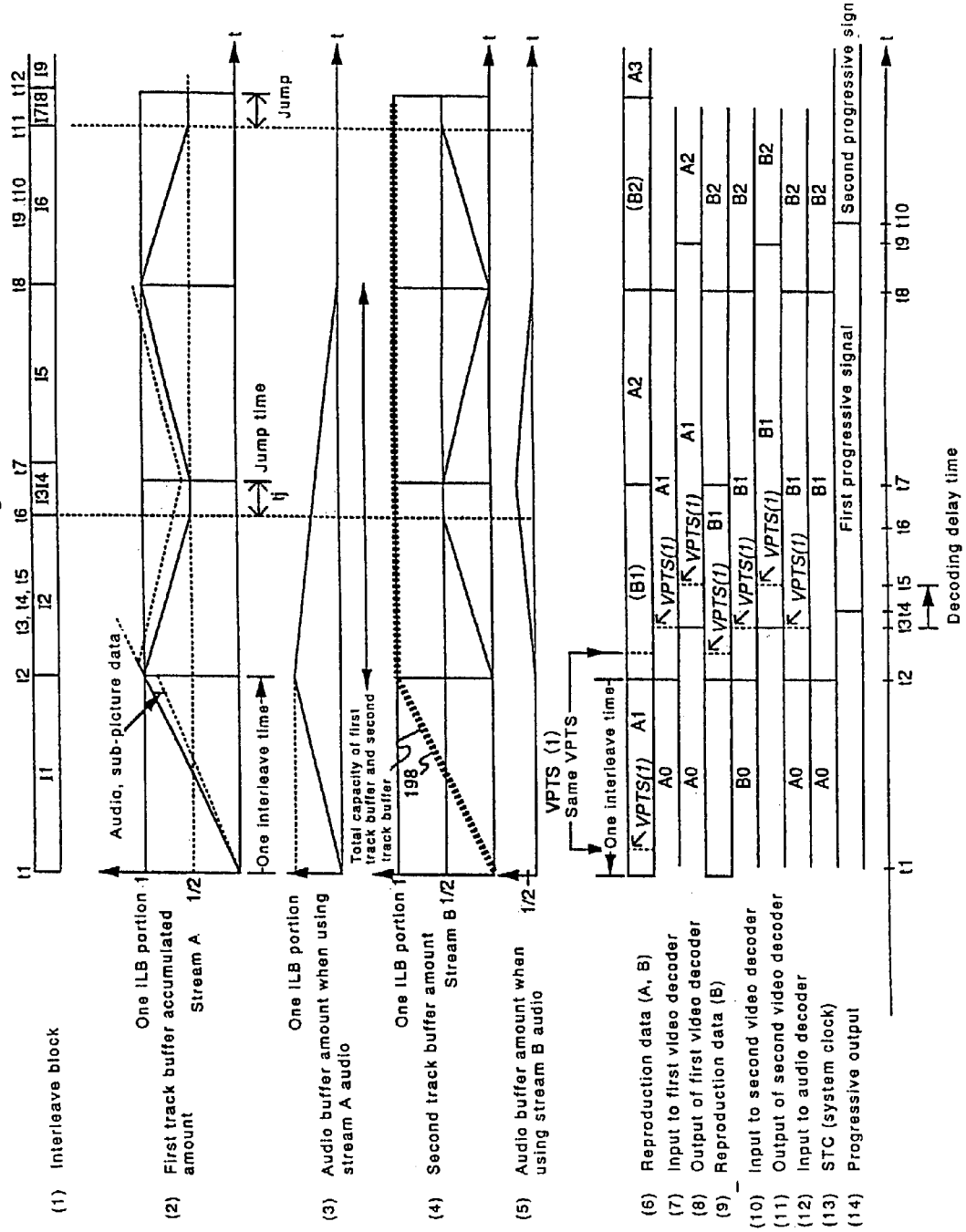
FIG. 45 is a timing chart of progressive, stereoscopic and wide signals and data quantity of buffer at the time of reproduction thereof in the embodiment of the invention.

Referring to FIG. 45, the procedure of synchronizing two videos and sound when reproducing two streams simultaneously, such as progressive videos, stereoscopic videos or scope videos, is described below. Reproduction of three or four streams such as 720P signals can be similarly realized, and description is omitted herein.

Figure 39:
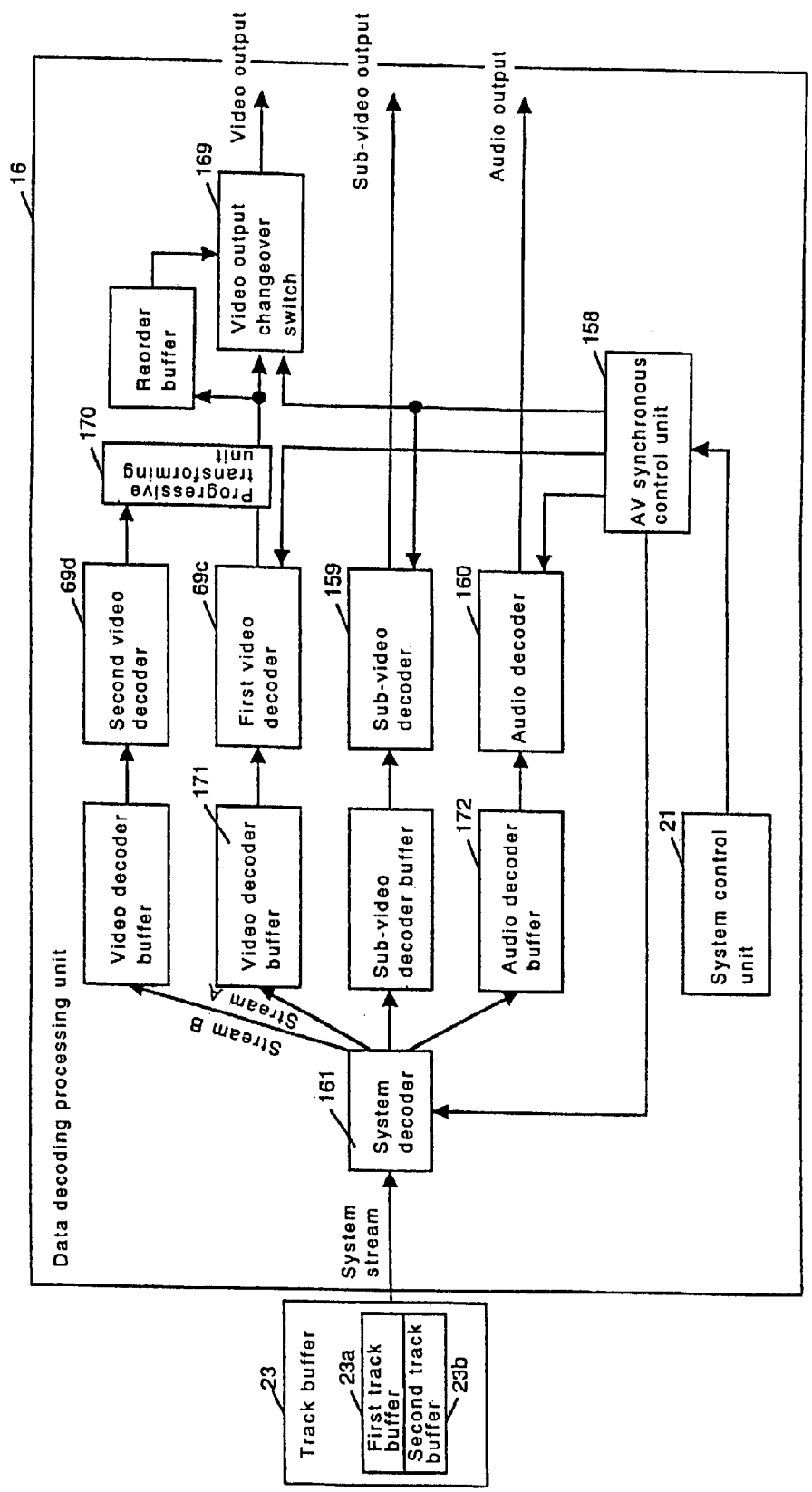
FIG. 39 is a block diagram of data compound processing unit in the embodiment of the invention.

First is mentioned a method of synchronizing two video streams in the invention. As shown in FIG. 39, in the first place, a system stream reproduced from the optical head is once accumulated in a track buffer 23, and sent into a first video decoder 69d and a second video decoder 69c. In the tracks of the optical disk, two streams of progressive signals, that is, first stream A and second stream B are recorded alternately in the interleaved block unit.

First, the stream A is reproduced by double speed rotation, and accumulation of data in the first track buffer 23a in the track buffer 23 is started. This state is shown in FIG. 45(1), in which at t=t1 to t2, data is accumulated in the portion of one interleaved block (ILB) I1 of first video signal in the period of one interleave time T1. The data quantity in the first track buffer increases, and at t=t2, it increases to the data quantity of one ILB, and accumulation of data for the portion of one ILB of the first video signal is complete. At t=t2, after finishing accumulation of the portion of one ILB over one GOP of the first video signal, this time, the second video signal of the stream B is reproduced from a next interleaved block I2 of the optical disk, and as indicated by a solid line in FIG. 45(4), at t=t2, accumulation of data of second video signal is stated in a second track buffer 23b, and data is accumulated in the second track buffer 23b up to t=t6. At the same time, from t=t2 to t8, as shown in FIGS. 45(7), (10), the first video signal and second video signal are fed into the first video decoder 69c and second video decoder 69d from the track buffer 23a and track buffer 23b by synchronizing the video presentation time stamp, that is, the time of VPTS. These input signals are, as shown in FIGS. 45(8), (11), are issued as two sets of expanded video data from the first video decoder 69c and second video decoder 69d, from time t=t3 delayed by the video delay time twd as the MPEG expansion process time. From t=t4 to t10, the two video data of stream A and stream B are combined into a progressive signal in the progressive transforming unit 170, and the progressive signal for the portion of one interleaved block is issued.

Thus, from t=t2 to t8, data of one interleaved block is put into the decoder. Therefore, nearly at a same rate, data in the first track buffer 23a and second track buffer 23b are consumed and decreased. Hence, as shown in FIG. 45(2), the data quantity in the first track buffer is decreased from t2 to t7, and at t=t7, it is decreased to ½ of one ILB. At t=t7, data reproduction of interleaved block I5 starts, and increment and decrement are canceled, the quantity continues to increase up to t=t8, reaching one ILB at t=t8, but same as at t=t2, input into the first decoder 69c begins at t=t8, and hence the quantity continues to decrease up to t=t11, and finally the buffer memory quantity is worth a half ILB.

In FIG. 45(4), transition of memory quantity in the second track buffer 23a as the buffer quantity of the stream B is described. At t=t2, input of data B1 of stream B in the interleaved block I2 into the second track buffer 23b begins, and at the same time transfer of data B1 into the second video decoder 69d starts, thereby canceling to ½, the buffer quantity at t=t6 is half ILB. In the case of multi-angle recording of two angles of progressive signal in the invention, since there are four streams, that is, four interleaved blocks, from t=t6 to t7, tracks must be jumped from interleaved blocks I3, I4 to I5. During this tj jump time 197, reproduction input of data from the optical disk is interrupted, and the buffer quantity in the stream B continues to decrease up to t=t8, and becomes nearly zero at t=t8.

At t=t8, reproduction data of data B2 of the interleaved block I6 is entered, and it begins to increase again, and at t=t11, the memory quantity of the second track buffer is half ILB. At t=t11, jumping tracks, interleaved blocks I7, I8 are skipped, and interleaved block I9 of A3 is accessed.

This operation is repeated.

The minimum required memory capacity for the track buffer 23 summing up the first track buffer 23a and second track buffer 23b of the system of the invention is described below. The track buffer capacity 198 indicated by dotted line in FIG. 45(4) shows the data quantity summing up the track buffer 23a and track buffer 23b. By thus setting the capacity of at least one ILB in total in the track buffer, seamless reproduction is realized.

Figure 31:
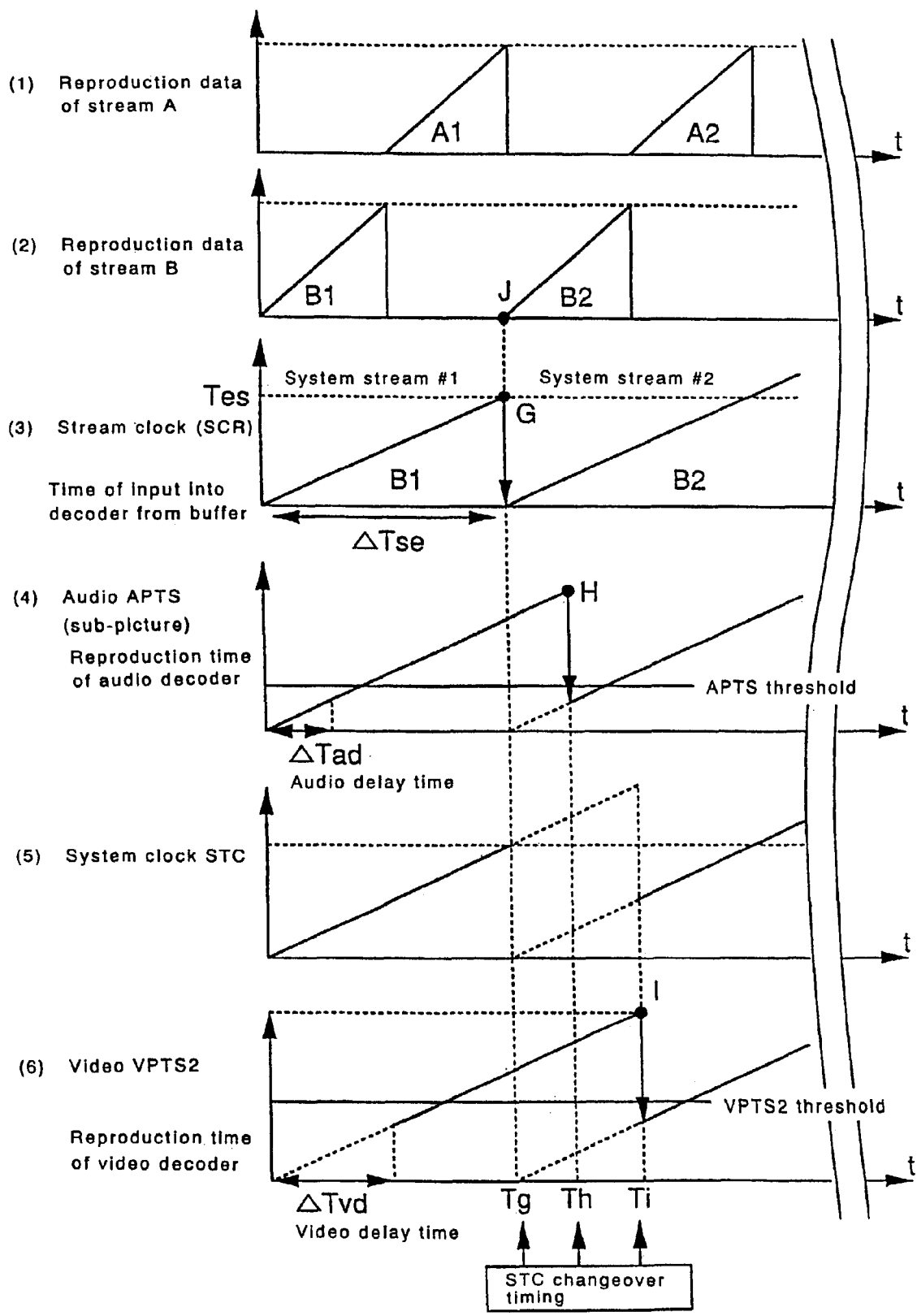
FIG. 31 is a timing chart of reproduction output through buffer and decoding processing of decoder of data stream in an embodiment of the invention.

In the invention, it is effective to prevent overflow or underflow of track buffer by setting the total capacity of the track buffer 23 comprising track buffers 23a and 23b at one interleaved block or more in progressive reproduction of the invention. As the changeover method of system clock STC in the case of two streams is described later in FIG. 31, there are two streams A and B in the case of progressive reproduction. In this case, supposing the two streams of two interlace signals for composing progressive signals of one ILB to be A1 and B1, the data of the first stream A1 is reproduced in a period of half ILB as shown in FIG. 31(1), and all data is accumulated in the buffer. Next, the data of the next stream B is reproduced as B1 after completion of reproduction of A1 as shown in FIG. 31(2), and is accumulated in the buffer. In this case, as mentioned above, since the reproduction data from the optical disk is controlled by the stream B in FIG. 31(2), the track buffer will not overflow. The SCR or stream clock from the track buffer of stream A or stream B shown in FIG. 31(3) is nearly synchronized with the reproduction start point J of the stream B shown in FIG. 31(2), and the counter is reset. Since the stream B is issued at double speed, the stream clock is counted by the buffer at a single speed as shown in FIG. 31(3), that is, at ½ speed. At point G, the stream clock is reset. The time VPTS2 of output of video signal of stream B from the video decoder must be synchronized in consideration of the delay time Tvd such as MPEG decoding time. In this case, at point I, that is, when the increase of VPTs is interrupted, or t=Ti, the AV synchronism control is restarted. In this case, checking VPTS2 of the stream B, by synchronizing the VPTS1 of the stream A with this VPTS2, synchronism is realized in a simple control of one system. In this case, the VPTS1 may be employed at the same time.

The audio data of synchronous stream B of audio is reproduced, and the STC is changed over at point H by using APTS of stream B as shown in FIG. 31(4). The sub-video signal of stream B is also changed over in the STC as shown in FIG. 31(4).

Thus, by Av synchronism by using the data of stream B by priority, AV synchronism is realized by a simple control.

In this case, the streams A1, A2 will not overflow as all video data is accumulated in the buffer memory. The stream B has a possibility of overflow. In the invention, however, by synchronous control at stream B, as shown in FIG. 31(6), since the signal flow is controlled by changing over the STC so that the VPTS2 may not exceed the threshold of VPTS2, the buffer will not overflow.

Besides, by using the voice in the stream B in audio reproduction, as mentioned above, the buffer of the audio data can be reduced to half, and moreover, as shown in FIG. 31(4), by changing over the STC at point H at t=Th, the sound is reproduced smoothly without exceeding the APTS threshold. The sub-video information is also synchronized and reproduced smoothly. Therefore, the video, sound, and sub-video such as sub-title are synchronized, and the picture and sound are reproduced without seam. In this case, recording of sound and sub-video of stream A may be omitted. Or, by adding sound and sub-video in the stream B, the stream B2 is reproduced by the existing reproducing device, and by controlling reproduction of stream A by the second video signal output control information adding unit 179 shown in FIG. 22, the trouble of output of silent picture can be prevented. Thus, by omitting the data of sound and sub-video in the stream A, the software of progressive video, for example, a movie of 2 hours can be recorded in two layers of a disk according to the interleaved block recording method of the invention. This effect is described below. The movie software can be recorded for about 2 hours and 15 minutes in a 4.7 GB DVD of one layer. When the progressive video of the invention is directly recorded in two channels without differential process, it requires a double capacity, that is, 9.4 GB. However, for example, the video signal is 4 Mbps, and the sub-video and audio signal are nearly 1 Mbps. When 1 Mbps of audio signal is recorded in one stream only, the required total is 9 Mbps. That is, 90% of data quantity is enough, and 90% of 9.4 GB is 8.5 GB, so that one-layer disk and progressive signals can be recorded in a two-layer disk.

In the synchronizing method of the invention, of the signals in a set of two progressive signals, supposing the interleaved block of stream B is recorded next to the interleaved block of stream A, as seen from the beginning of video data on the optical disk, by putting the beginning data (A in this embodiment) in the track buffer, when reproducing other data (B in this embodiment), it is designed to synchronize by using mainly the synchronous information of stream B. More specifically, by changing over the system clock so that the video time stamp VPTS1 of stream B may not exceed the threshold of the VPTS1, the video and audio are reproduced synchronously without interrupting the screen. It is enough to read out the stream A from the buffer by synchronizing with the time information such as VPTS2 which is the time stamp of the stream B, so that the control is simple.

Thus, in the invention, it is enough to control the second stream synchronously by once accumulating the first stream in the buffer, and the control is secure and simple. In this case, when the size of the buffer memory is set at over one ILB, overflow or underflow does not occur.

In the case of the existing DVD optical disk reproducing device, a standard buffer memory of 100 to 300 kB, about ⅕ of ILB is used. In the case of the invention, however, by a standard buffer memory of one ILB unit, it is possible to reproduce smoothly. One ILB is worth 0.5 to 2 seconds, but in the case of multi-angle, since the waiting time is allowed by about one second, it is actually used in a range of 0.5 to 1 sec. Therefore, considering the stream of 8 Mbps at maximum of 1 sec, in the DVD optical disk reproducing device of the invention, it is enough to use a buffer memory of 1 MB or more.

Figure 30:
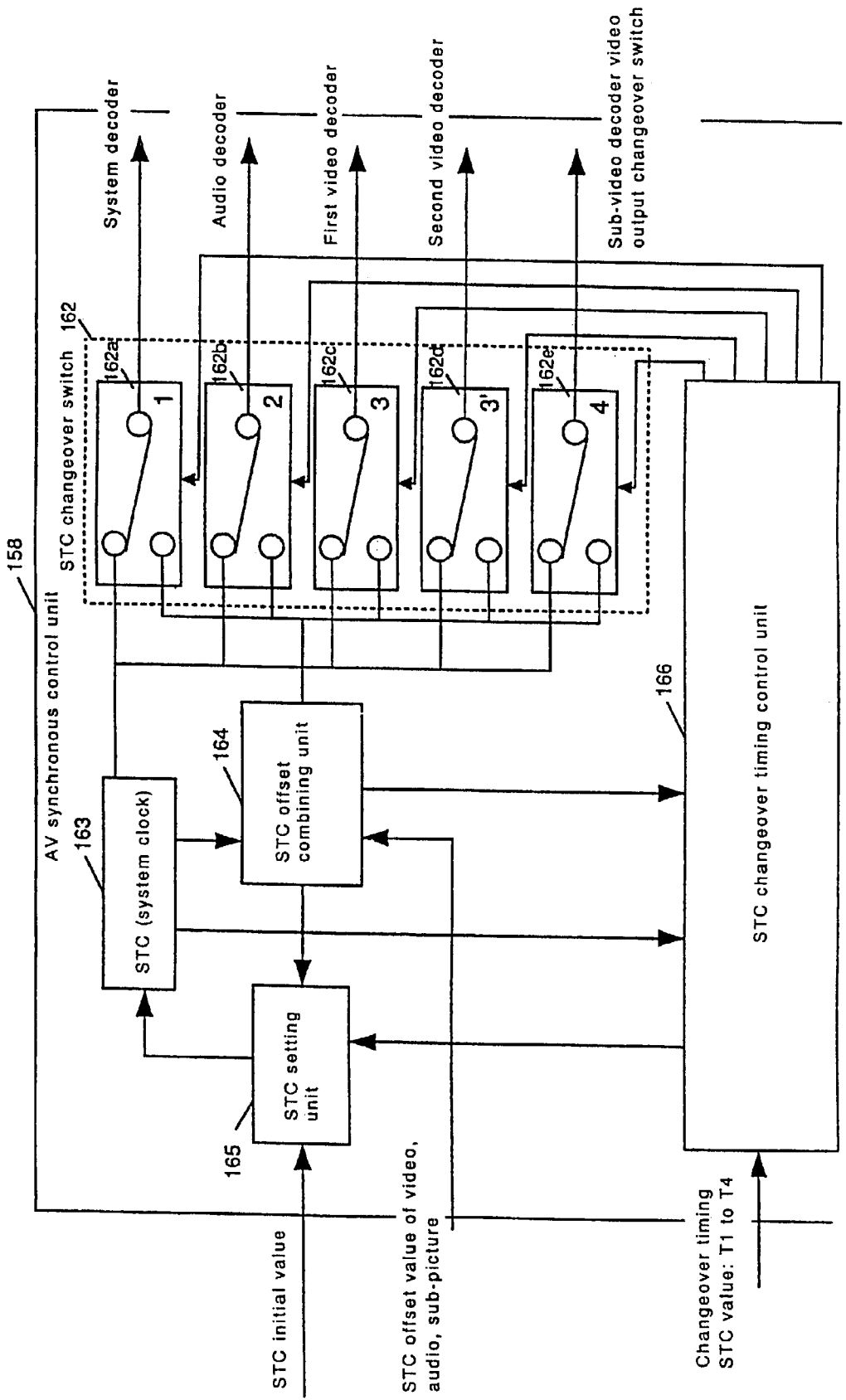
FIG. 30 is a block diagram showing a partial constitution for AV synchronization relating to AV synchronous control 12-10 in the embodiment of the invention.

In the above operation, the synchronous control unit 166 in FIG. 30 changes over the STC by using the synchronous data of the second video signal of interleaved blocks I2 and I6 in FIG. 45(1), and seamless reproduction between the interleaved blocks is realized. When reproducing data of interleaved blocks I2, I6, by controlling the motor rotating speed reproducing track while monitoring the buffer quantity of the stream B, it is optimized so that the memory quantity of the track buffers 23a, 23b may not overflow, and it is effective to decrease the memory quantity of the track buffer. The data in the interleaved blocks I1, I5 of the stream A are put entirely in the track buffer 23a, and it is not suited for optimizing the buffer size by controlling the reproduction by the signals of two streams A. When reproduced by using the audio data of the interleaved blocks I1, I5, in order to match with the time stamp of the outputs of video data in FIGS. 45(8), (11), it is necessary, as shown in FIG. 45(3), to accumulate audio data or sub-video data of one interleaved block or more in the track buffer 23 (FIG. 39) or audio decoder buffer 172 (FIG. 39), but by using the audio data of interleaved blocks I2, I6, as shown in FIG. 45(5), it is enough with ½, that is, half ILB data, so that the memory quantity of the track buffer 23 (FIG. 39) or audio decoder buffer 172 (FIG. 39) may be half.

Also, as shown in FIG. 45, when reproducing a set of I1, I2, and a set of I5, I6 containing main signals and complementary signals of progressive signals, by accumulating the interleaved blocks I1, I5 in the buffer, when the motor rotation is controlled on the basis of the reproduction data of next interleaved blocks I2, I6, the memory quantity of the buffer is decreased. As for the changeover timing of STC of the AV synchronous control unit 158 in FIG. 30, on the basis of the STC of the interleaved blocks I2, I6, it is effective to decode stably without overflow of buffer.

Moreover, as shown in FIG. 37, at the time of progressive signal reproduction, the method of skipping the first field of VOB is mentioned, but as a second realistic method, as shown in FIG. 22, in the recording device 99, of the two images of the image with interlace transformed odd-first identifier 199 and image with even-first identifier 200, only the even-first identifier 200 is transformed into an odd-first identifier 202 by an even/odd transforming unit 201, and by adding the odd-first identifier to each MPEG data, the beginning of all VOBs becomes odd-first.

At the reproducing device side, as shown in FIG. 21, the data of odd-first identifier 199 and odd-first identifier 202 by even-first transformation are reproduced. As shown at step 203, checking if progressive signal reproduction or not, if Yes, at step 204, the odd-first identifier of the second video signal is changed to an even-first identifier 200a, and is sent into an interlace transforming unit 71b of the MPEG decoder. If No, the identifier is not changed. In the interlace transforming unit 71b, since the field of the line is issued first from the frame image of the second video signal, the even-first image is issued. In the combining unit 90, the even-first image of the second video signal and the odd-first image of the first video signal are combined, and a normal progressive image is issued. In this method, the beginning of all interleaved blocks becomes odd-first, and the seamless multi-angle video is reproduced normally in the DVD standard reproducing device. In the case of seamless multi-angle reproduction, since the beginning of each interleaved block is limited to odd-first, dummy field is not required in this method, and hence the recording efficiency is not lowered.

In this second method of aligning the odd-first lines, the first video signal can be reproduced normally also in the existing reproducing device. However, when interlace transformed according to the odd-first identifier of the second video signal in the existing reproducing device, odd and even fields are inverted, and videos of poor quality lowered in resolution are issued. To avoid this, by the second video signal output limiting information adding unit explained in FIG. 40, when reproducing with the conventional reproducing device, by recording the information for limiting the reproduction of the second video signal within the DVD standard in the optical disk 85, the second video signal is not reproduced in the existing reproducing device, and presentation of uncomfortable video to the user can be avoided.

In this recording device, when compressing a pair of field images of odd-first image and transformed odd-first image by variable coding in compressing units 81a, 82b, if motion detection and compensation are done separately, block distortion appears separately when encoding hard-to-compress images, and the decoded image is dirty when combined into progressive signal. To avoid this, in the invention, by employing the same motion vector and encoding the motion compensation by the same motion detection compensating unit 205, when two fields are decoded, the block distortions are aligned and are hence less obvious. At the same time, the encoding load decreases.

The operation of the AV synchronous control unit 158 is described. Since the AV synchronous control unit is one of the most important units in the invention, and is hence described in particular detail.

The operation of the system control unit 21 in FIG. 5 is described. First, the system control unit 21 judges if the optical disk is set (inserted) in the DVD reproducing device or not. When setting is detected, by controlling the mechanical control unit and signal control unit, the disk rotation is controlled until stable reading is achieved, and the optical pickup is moved when stabilized, and the volume information file shown in FIG. 28 is read out.

Furthermore, the system control unit 21 reproduces the program chain group for volume menu according to the volume menu management information in the volume information file in FIG. 28. When reproducing this program chain group for volume menu, the user can designate the numbers of desired audio data and sub-video data. Reproduction of program chain for volume menu in reproduction time of optical disk may be omitted if not necessary depending on the application of multimedia data.

The system control unit 21 reproduces and displays the program chain group for title menu according to the tile group management information in the volume information file, reads out the file management information of the video file including the title selected according to the selection by the user, and branches into program chains of the title beginning. Further, this program chain group is reproduced.

Figure 29:
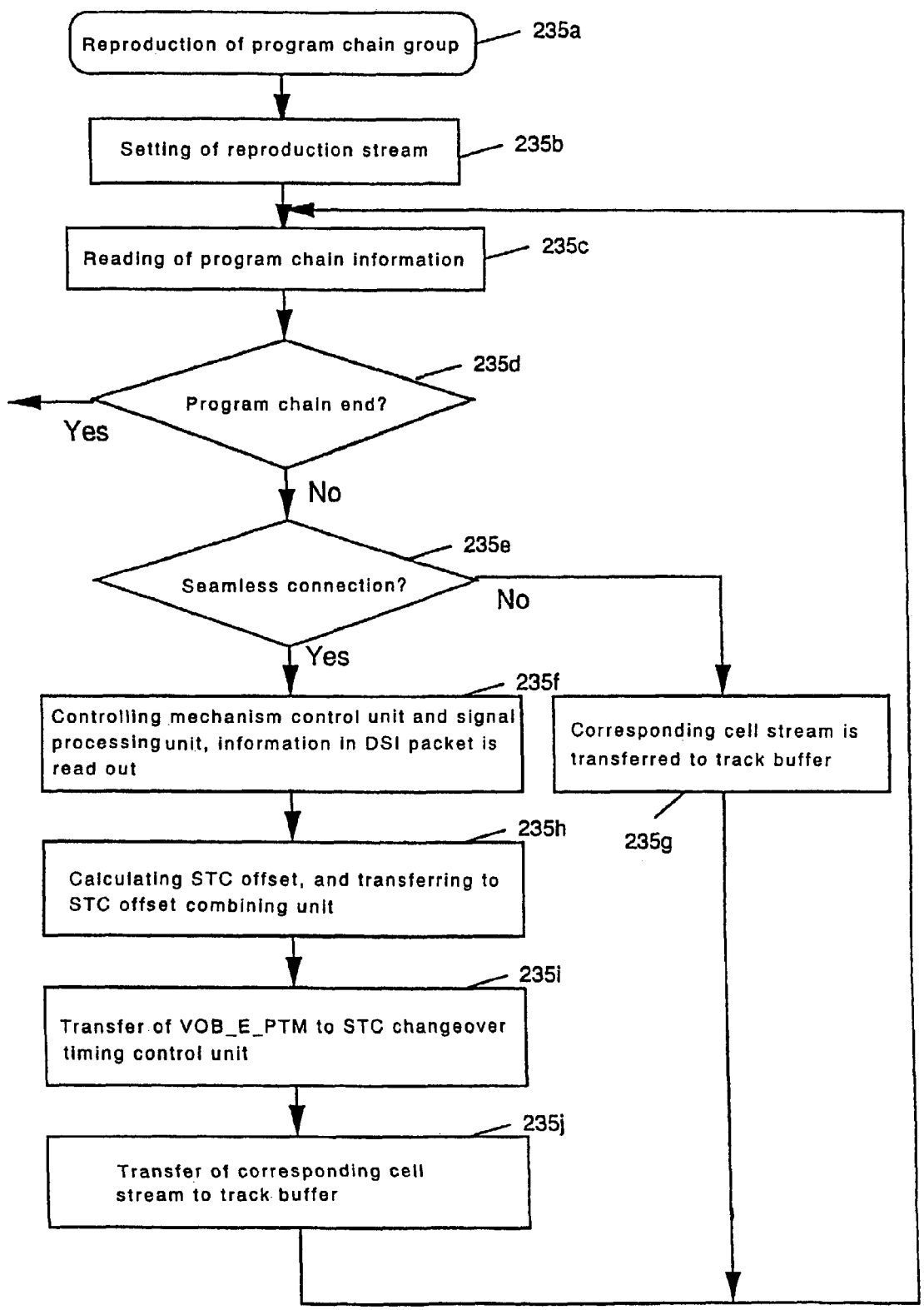
FIG. 29 is a flowchart showing a detailed procedure of reproducing process of program chain group by a system control unit M1-9 in the embodiment of the invention.

FIG. 29 is a flowchart showing the detailed procedure of reproducing process of the program chain group by the system control unit 21. In FIG. 29, at steps 235a, 235b, 235c, first, the system control unit 21 reads out the corresponding program chain information from the program chain information table of volume information file or video file. At step 235d, if program chain is not finished, the process advances to step 235e.

Consequently, at step 235e, referring to the seamless connection instruction information of the cell to be transferred next in the program chain information, it is judged whether the connection between the present cell and the immediately preceding cell is for seamless connection or not, and if seamless connection is judged necessary, the process advances to step 235f for seamless connection process, and if seamless connection is not necessary, the process advances to ordinary connection process.

At step, 235f, reading the DSI packet by controlling the mechanical control unit and signal processing unit, the VOB reproduction end time (VOB$_{13}$ E$_{13}$ PTM) existing in the DSI packet of the cell transferred first, and the VOB reproduction start time (VOB_S_PTM) existing in the DSI packet of the cell to be transferred next are read out.

At the next step 235h, calculating "VOB reproduction end time (VOB_E_PTM)—VOB reproduction start time (VOB_S_PTM), it is transferred as the STC offset of this cell and the cell transferred immediately before, to the STC offset combining unit 164 in the AV synchronous control unit 158 in FIG. 30.

At the same time, at step 235*i*, the VOB reproduction end time (VOB_E_PTM) is transferred to the STC changeover timing control unit 166 as changeover time T4 of the STC changeover switch 162*e*.

It is instructed to the mechanical control unit so as to read out the data until the final position of the cell. As a result, the data of the corresponding cell is transferred to the track buffer 23 at step 235*j*, and as soon as the transfer is over, the program chain information at step 235*c* is read out.

At step 235*e*, if judged not to be seamless connection, transfer to the track buffer 23 is effected up tot he end of the system stream, and the program chain information at step 235*c* is read out.

Next are explained two embodiments relating to AV synchronous control method of the seamless connection control for seamless reproduction in the invention. These are detailed explanation about the AV synchronous control unit 158 in FIG. 26 and FIG. 39.

The system decoder 161, audio decoder 160, video decoders 69*c*, 69*d*, and sub-video decoder 159 in FIG. 39 are all synchronized with the system time clock given from the AV synchronous control unit in FIG. 30, and the data in the system stream is processed.

In a first method, referring to FIG. 30, the AV synchronous control unit 158 is explained.

In FIG. 30, the AV synchronous control unit is composed of STC changeover switches 162*a*, 162*b*, 162*c*, 162*d*, STC 163, STC offset combining unit 164, STC setting unit 165, and STC changeover timing control unit 166.

The STC changeover switches 162*a*, 162*b*, 162*c*, 162*d*, 162*e* change over the output value of the STC 163 and output value of the STC offset combining unit 164 as reference clock to be given respectively to the system decoder 161, audio decoder 160, main video decoder 69*c*, sub-video decoder 69*d*, and sub-video decoder 159.

The STC 163 is a reference clock for the entire MPEG decoder in FIG. 39 in ordinary reproduction.

The STC offset combining unit 164 continues to issue the value of subtracting the STC offset value given from the system control, from the value of the STC 163.

The STC setting unit 165 sets STC initial value given from the system control unit or the STC offset combined value given from the STC offset combining unit 164, to the STC 163 at the timing given from the STC changeover timing control unit 166.

The STC changeover timing control unit 166 controls the STC changeover switches 162*a* to 162*e* and STC setting 165 on the basis of the STC changeover timing information given from the system control unit and the STC offset combined value given from the STC offset combining unit 164.

The STC offset value is an offset value used when changing the STC value when continuously reproducing by connecting system stream #1 and system stream #2 having different STC initial values.

More specifically, it is obtained by subtracting the "VOB reproduction start time (VOB_S_PTM)" described in the DSI of the system stream #2 to be reproduced next, from the "VOB reproduction end time (VOB_E_PTM)" described in the DSI packet of the system stream #1 reproduced in the first place. Such information of display time is calculated preliminarily by reading out by the system control unit 167 when the data being readout from the optical disk in FIG. 5 is put into the track buffer 23.

The calculated offset value is given to the STC offset combining unit 164 until the final pack of the system stream #1 is fed into the system decoder 161.

The data decoding processing unit 165 in FIG. 5 operates as an MPEG decoder except when controlling seamless connection. The STC offset given from the system control unit 167 at this time is 0 or an arbitrary value, and the STC changeover switches 162*a* to 162*e* in FIG. 30 are always selected at the STC 163 side.

Referring to the flowchart in FIG. 38, changeover of STC changeover switches 162*a* to 162*e* and operation of STC 163 at the junction of the system streams are explained below in the case two system streams not continuous in the STC value, system stream #1 and system stream #2, are entered continuously in the system decoder 161.

Explanations of SCR, APTS, VPTS, VDTS of the system stream #1 and system stream #2 to be entered are omitted.

Suppose the STC initial value corresponding to the system stream #1 during reproduction is preliminarily set in the STC 163 from the STC setting unit 165 and is being counted up sequentially along the reproduction operation. First, the system control unit 167 (FIG. 5) calculates the STC offset value by the method mentioned above, and sets this value in the STC offset combining unit 164 until the final pack of system stream #1 is put in the decoder buffer. The STC offset combining unit 164 continues to issue the subtraction value of the STC offset value from the value of the STC 163 (step 168*a*).

The STC changeover timing control unit 166 obtains the time T1 when the final pack in the system stream #1 reproduced first is put into the decoder buffer, and changes over the STC changeover switch 162*a* to the output side of the STC offset combining unit 164 at time T1 (step 168*b*).

Thereafter the output of the STC offset combining unit 164 is given to the STC value the system decoder 161 refers to, and the transfer timing of the system stream #2 to the system decoder 161 is determined by the SCR described in the pack header of system stream #2.

The STC changeover timing control unit 166 obtains the time T2 when reproduction of final audio frame of system stream #1 reproduced first is terminated, and changes over the STC changeover switch 162*b* to the output side of the STC offset combining unit 164 at time T2 (step 168*c*). The method of obtaining time T2 is described below.

Thereafter the output of the STC offset combining unit 164 is given to the STC value the audio decoder 160 refers to, and the audio output timing of the system stream #2 is determined by the APTS described in the audio packet of system stream #2.

The STC changeover timing control unit 166 obtains the time T3, T'3 when decoding of final video frame of main signal and sub-signal of system stream #1 reproduced first is terminated, and changes over the STC changeover switches 162*c*, 162*d* to the output side of the STC offset combining unit 164 at time T3, T'3 (step 168*d*). The method of obtaining time T3 is described below. Thereafter the output of the STC offset combining unit 164 is given to the STC value the system decoders 69*c*, 69*d* refer to, and the timing of video decoding of the system stream #2 is determined by the VPTS described in the video packet of system stream #2. The STC changeover timing control unit 166 obtains the time T4 when reproduction output of final video frame of system stream #1 reproduced first is terminated, and changes over the STC changeover switch 162*e* to the output side of the STC offset combining unit 164 at time T4 (step 168*e*). The method of obtaining time T4 is described below.

Thereafter the output of the STC offset combining unit 164 is given to the STC value the video output changeover switch 169 and sub-video decoder 159 refer to, and the timing of video output and sub-video output of system stream #2 is determined by VPTS and SPTS described in the video packet and sub-video packet of system stream #2.

When changeover of these STC changeover switches 162a to 162e is over, the STC setting unit 165 sets the value given from the STC offset combining unit 164 in the STC 162 (step 168f) (which is called reloading of STC 163), and all switches at steps 162a to 162e are changed over to the STC 163 side (step 168 g).

Thereafter the output of the STC 163 is given to the STC value the audio decoder 160, video decoders 69d, 69c, video output changeover switch 169, and sub-video decoder 159 refer to, and the operation returns to the normal state.

Herein, two means are mentioned as the method of obtaining the time T1 to T4 as the STC changeover timing.

In the first means, since the time T1 to T4 can be easily calculated when creating the stream, the information expressing the time T1 to T4 is described in the disk preliminarily, and the system control unit 21 reads it out and transmits to the STC changeover timing control unit 166.

In particular, as for T4, the "VOB reproduction end time (VOB_E_PTM)" recorded in the DSI used when determining the STC offset can be directly used.

The value to be recorded at this time is described on the basis of the STC value used in the system stream #1 reproduced first, and the moment the count-up value of STC 163 becomes the time T1 to T4, the STC changeover timing control unit 166 changes over the STC changeover switches 162a to 162e.

In the second means, the timing for reading out is obtained from the timing of writing beginning data of system stream #2 into the track buffer 23, video decoder buffers 171, 171a, and audio decoder buffer 172.

Assuming the track buffer 23 to be a ring buffer composed of write pointer, read pointer, and data memory, more specifically, the system control unit 21 is designed to read out the address indicated by the write pointer and the address indicated by the read pointer in the track buffer 23, and the moment when the pack written immediately before is read out is detected from the address indicated by the write pointer and the address indicated by the read pointer when the target pack is written in.

The system control unit 21 designates and reads out the beginning address of the system stream #2 on the optical disk when transferring from system stream #1 to reproduction of system stream #2, so that the moment when the beginning data of the system stream #2 is stored in the track buffer 23 is known. Consequently, by marking the address where the beginning pack of the system stream #2 is written, the moment when one pack before is read out completely is supposed to be T1, and the time T1 is obtained.

The system control unit 21, the moment T1 is obtained, notices it to the video decoders 69c, 69d and audio decoder 160, and therefore the video decoders 69c, 69d and audio decoder 160 can know that the beginning packet of system stream #2 is transferred to the video buffer 171 and audio buffer 172 in the subsequent transfer.

Thus, by managing each decoder buffer same as the buffer management of the track buffer 21, the two video decoders 69c, 69d and audio decoder 160 obtain T2, T3 the moment the final packet of system stream #1 is transferred In detection of T1, however, if all data are read out from the video decoder buffer 171 or audio decoder buffer 172 (right after decoding of final frame of system stream #1) and data to be written in has not reached yet (the transfer time between packs is vacant), since there is no data to be written in, the address cannot be managed. In this case, too, since the packet of the frame to be decoded next is securely transferred until the next decoding timing (the decoding timing of the beginning frame of system stream #2), the changeover timing is known by defining the packet transfer moment to be T2 or T3.

As for T4, as mentioned above, the "display end time (VOB_E_PTM) of final frame of video of system stream #1" described in the DSI packet may be used directly.

A second seamless reproduction method is described below.

Figure 38:
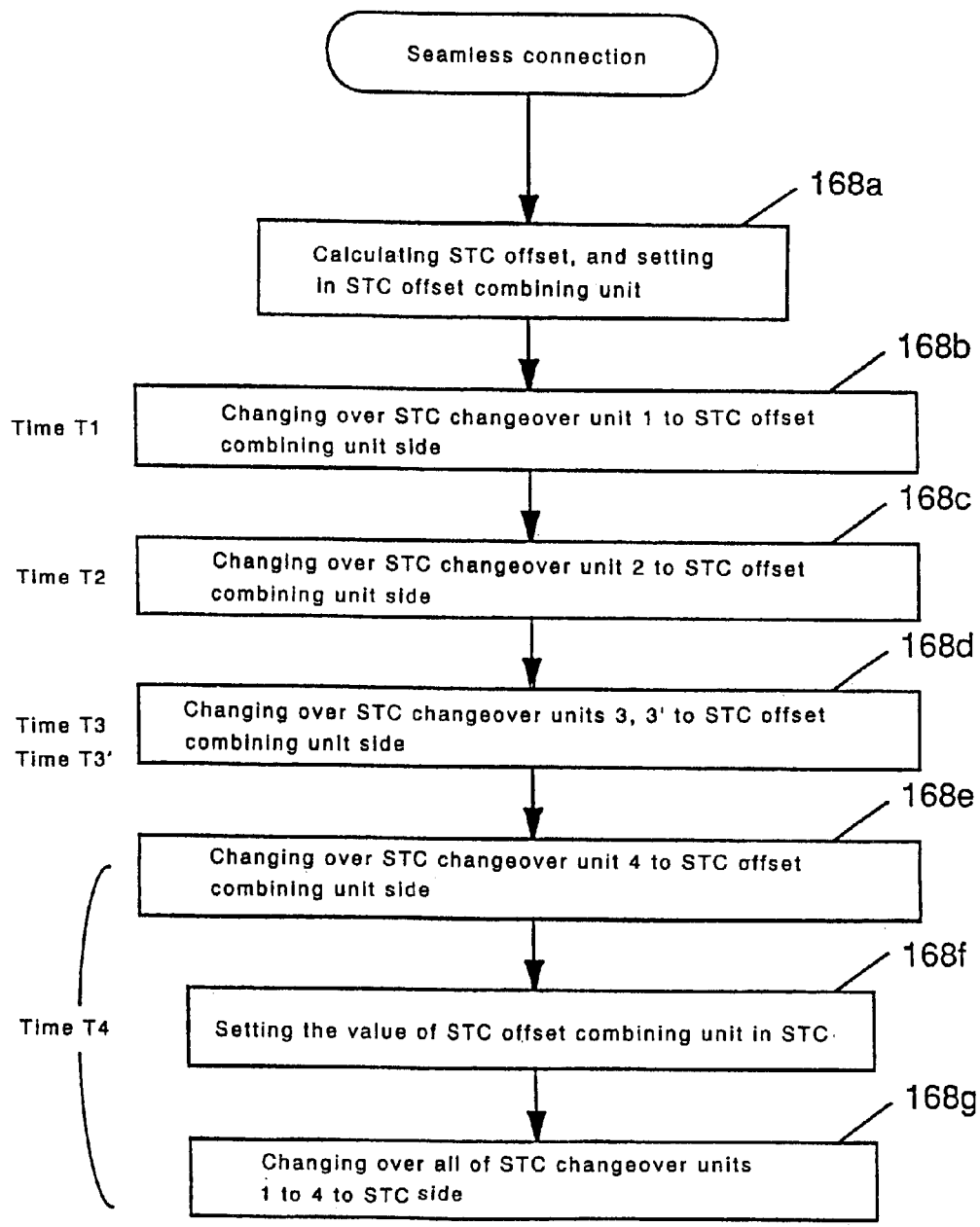
FIG. 38 is a flowchart of STC changeover in the case of seamless connection in the embodiment of the invention.

FIG. 31 is a diagram showing the timing of reproduction output of the system stream from input in the data decoding processing unit in FIG. 38 through decoder buffer and decoding process. Referring to FIG. 31, changes of values of APTS and VPTS in the portion for connecting system stream #1 and system stream #2 are explained, and the method of AV synchronous control in the seamless connection portion in the operation for actually processing the stream is described.

Next, referring to the graph in FIG. 31, the method of seamless connection control according to the flow in the flowchart in FIG. 43 is described.

Start timing of seamless connection control is obtained in the SCR graph in FIG. 31(3). The period of continuous increase of SCR value in this graph corresponds to the period of transfer of system stream #1 from the track buffer 23 (FIG. 5) to the data decoding processing unit 16 (FIG. 5), and the value of SCR is 0 only at piont G when transfer of system steam #1 is over and transfer of system stream #2 is started. Therefore, by judging point G when SCR value becomes 0, it is known that a new system stream #2 is put into the data decoding processing unit 16, and at this point (time Tg), the synchronous mechanism control unit can cancel (turn off) the AV synchronous mechanism of the reproduction output unit.

Detection of SCR value of 0 is also possible after processing of the signal read out from the optical disk, or when writing into the track buffer 23. The AV synchronous mechanism may be turned off on the basis of detection at this point.

As for the timing for starting (turning on) the AV synchronous mechanism once turned off, to prevent mismatched reproduction of audio and video, it is necessary to know that both audio output and video output included in system stream #1 are changed to a new system stream #2. The moment of change of audio output to a new system stream #2 is known by detecting point H when increase of APTS value is suspended. Similarly, the moment of change of video output to a new system stream #2 is known by detecting point I when increase of VPTS value is suspended. Therefore, the synchronous mechanism control unit can resume AV synchronism immediately (at time Ti) after detection of appearance of both point H and point I.

When the value of SCR is not set in the STC in the period from time Tg to time Ti, or when the value of APTS and value of VPTS are compared directly, the off period of AV synchronous mechanism may be further shortened.

For this purpose, by monitoring both values of APTS of audio output data and VPTS of video output data issued from the data decoding processing unit 16, when either value begins to decrease first, it is detected, and the AV synchronism mechanism is turned off immediately, that is, at time Th in FIG. 31.

However, as explained herein, when judging the timing by detecting if increase of the value of APTS and value of VPTS is continuing or not, it is evident that the value of APTS and value of VPTS are sure to decrease when the system stream is connected. In other words, it is enough when the final values of APTS and VPTS in the system stream are larger than the initial maximum values of APTS and VPTS in the system stream.

The maximum values of initial values of APTS and VPTS (ΔTad ΔTvd in the diagram) are determined as follows.

The initial values of APTS and VPTS are the sums of the time for storing video data and audio data in the video buffer and audio buffer, and the video reorder (in the MPEG video, the decoding sequence and display sequence of picture are not matched, and display is delayed by one picture at maximum as compared with decoding). Therefore, the sums of the time required for the video buffer and audio buffer until filled up, and the display delay (time of one frame) due to video reorder are the maximum values of initial values of APTS and VPTS.

To create the system stream, hence, it may be composed so that the final values of APTS and VPTS in the system stream may exceed these values.

In the embodiment, so far, as for the judging standard of turn-on timing of AV synchronous mechanism after system stream connection, the method of judging if the values of APTS and VPTS are increasing or not is mentioned, but it is also possible to realize by the following judgement of threshold. First, at the reproducing device side, the audio threshold and video threshold shown in the graphs in FIGS. 31(4) and (5) are determined. These values are equal to maximum values of initial values of APTS and VPTS in the system stream, and same as the maximum values mentioned above.

The values of APTS and VPTS read by the APTS reading means and VPTS reading means are judged to be less than the audio threshold and video threshold or not. If the values APTS and VPTS are larger than the audio threshold and video threshold, data are not changed to the output data of new system stream, and if smaller, output data of a new system stream is started, so that OFF or ON timing of AV synchronous mechanism is known.

By such on/off control of the AV synchronous mechanism, seamless reproduction without disturbance in reproduction state is realized at the junction of system streams.

INDUSTRIAL APPLICABILITY

By dividing basic video signal and interpolating video signal in frame groups of one GOP or more each, and recording on an optical disk as interleaved blocks 54, 55 by interleaving alternately, in a progressive (stereoscopic) applicable type reproducing device, progressive (stereoscopic) videos can be obtained by reproducing information of both right and left interleaved blocks of odd fields (for the right eye) and even fields (for the left eye). In the progressive (stereoscopic) non-applicable type reproducing device, when a disk recording progressive (stereoscopic) videos is reproduced, by reproducing the interleaved block of only odd fields (for the right eye) or even fields (for the left eye) either by jumping tracks, a perfect ordinary two-dimensional video can be obtained. Thus, mutual compatibility is realized.

In particular, by using an arrangement information file of progressive (stereoscopic) video, progressive (stereoscopic) video identifiers are recorded in the optical disk. It is therefore easy to judge where the progressive (stereoscopic) video is present, and it is effective to avoid progressive reproduction of two ordinary interlace signals, or outputs of images of two difference contents by mistake into the right eye and left eye of the stereoscopic television.

In the stereoscopic video applicable reproducing device, using the pointer used in two dimensions, the method of the invention for changing the access procedure is employed only when the stereoscopic video identifier is present, so that the stereoscopic videos can be reproduced continuously. Hence the stereoscopic video applicable reproducing device can be realized without changing the two-dimensional format.

The invention claimed is:

1. An optical disk comprising:
   a plurality of first blocks of a first video stream which are interleaved with a plurality of second blocks of a second video stream and which are recorded on tracks of said optical disk, wherein a) the first video stream and the second video stream comprise digital data for producing and displaying stereoscopic moving pictures and the first video stream comprises digital data for producing and displaying non-stereoscopic moving pictures; and
   b) a third video stream comprises digital data for producing and displaying non-stereoscopic moving pictures, the third video stream is different than the first video stream, the third video stream is different than the second video stream; and
   stereoscopic video identifiable information corresponding to reproduction periods, wherein whether or not the stereoscopic video identifiable information is present indicates whether:
   a) a reproduction period of the reproduction periods is a stereoscopic reproduction period of the first video stream and the second video stream; and
   b) the reproduction period of the reproduction periods is a non-stereoscopic reproduction period of the third video stream.

2. A reproducing device for reproducing an optical disk comprising:
   a decoder for decoding:
   a plurality of first blocks of a first video stream which are interleaved with a plurality of second blocks of a second video stream wherein a) the first video stream and the second video stream comprise digital data for producing and displaying stereoscopic moving pictures and the first video stream comprises digital data for producing and displaying non-stereoscopic moving pictures; and
   b) a third video stream comprises digital data for producing and displaying non-stereoscopic moving pictures, the third video stream is different than the first video stream, the third video stream is different than the second video stream; and
   stereoscopic video identifiable information corresponding to reproduction periods, wherein whether or not the stereoscopic video identifiable information is present indicates whether:
   a) a reproduction period of the reproduction periods is a stereoscopic reproduction period of the first video stream and the second video stream ; and
   b) the reproduction period of the reproduction periods is a non-stereoscopic reproduction periods of the third video stream.

3. The device of claim 2, further comprising an information detecting unit for detecting the stereoscopic video identifiable information from said disk.

* * * * *

UNITED STATES PATENT AND TRADEMARK OFFICE
CERTIFICATE OF CORRECTION

| | | |
|---|---|---|
| PATENT NO. | : 7,747,145 B2 | Page 1 of 1 |
| APPLICATION NO. | : 10/284727 | |
| DATED | : June 29, 2010 | |
| INVENTOR(S) | : Mitsuaki Oshima et al. | |

It is certified that error appears in the above-identified patent and that said Letters Patent is hereby corrected as shown below:

Page 2

At item (56), OTHER PUBLICATIONS, please insert -- European Search Report for Application No. EP 09 16 4211 dated October 7, 2009 --.

Signed and Sealed this

Twenty-sixth Day of October, 2010

David J. Kappos
*Director of the United States Patent and Trademark Office*